US012729211B2

(12) United States Patent
Awuah et al.

(10) Patent No.: US 12,729,211 B2

(45) Date of Patent: *Sep. 8, 2026

(54) GOLD(III) COMPOUNDS AND CANCER CELL-SELECTIVE MODULATION OF MITOCHONDRIAL RESPIRATION AND METABOLISM

(71) Applicant: University of Kentucky Research Foundation, Lexington, KY (US)

(72) Inventors: Samuel Awuah, Lexington, KY (US); Randall Tyler Mertens, Madisonville, KY (US)

(73) Assignee: University of Kentucky Research Foundation, Lexington, KY (US)

( * ) Notice: Subject to any disclaimer, the term of this patent is extended or adjusted under 35 U.S.C. 154(b) by 735 days.

This patent is subject to a terminal disclaimer.

(21) Appl. No.: 18/006,895

(22) PCT Filed: Jul. 29, 2021

(86) PCT No.: PCT/US2021/043766

§ 371 (c)(1),
(2) Date: Jan. 26, 2023

(87) PCT Pub. No.: WO2022/026753

PCT Pub. Date: Feb. 3, 2022

(65) Prior Publication Data

US 2023/0265108 A1 Aug. 24, 2023

Related U.S. Application Data

(60) Provisional application No. 63/058,129, filed on Jul. 29, 2020.

(51) Int. Cl.

| | |
|---|---|
| ***C07F 1/00*** | (2006.01) |
| ***A61P 35/00*** | (2006.01) |
| ***A61P 35/02*** | (2006.01) |

(52) U.S. Cl.
CPC .................................... *C07F 1/00* (2013.01)

(58) Field of Classification Search
CPC ................................ C07F 1/00; C07F 9/6596
See application file for complete search history.

(56) References Cited

U.S. PATENT DOCUMENTS

| | | | |
|---|---|---|---|
| 2015/0315211 | A1 | 11/2015 | Walensky et al. |
| 2016/0310490 | A1 | 10/2016 | Blomgren et al. |
| 2018/0161430 | A1 | 6/2018 | Wood et al. |
| 2019/0151331 | A1 | 5/2019 | Beardsley et al. |

OTHER PUBLICATIONS

Zhang et al. Deubiquitinases as potential anti-cancer targets for gold(iii) complexes Chemical Communications, 2013, 45, 5153-5155 (Year: 2013).*

Cecil Textbook of Medicine, 1997, 20th Ed, vol. 1, pp. 1004-1010 (Year: 1997).*

We et al. Journal of Hematology & Oncology 2022, 15, 143 (Year: 2022).*

Zhang et al. Deubiquitinases as potential anti-cancer targets for gold(III) complexes, Chem Commun. 2013, 49, 5153 (Year: 2013).*

* cited by examiner

*Primary Examiner* — Bruck Kifle
*Assistant Examiner* — Kevin S Martin
(74) *Attorney, Agent, or Firm* — Stites & Harbison PLLC; Mandy Wilson Decker

(57) ABSTRACT

A compound of formula (I) is provided. Useful compounds and compositions, and methods of making and methods of using such compounds and compositions. The subject matter also relates to methods of treating cancer using compounds and compositions provided.

20 Claims, 52 Drawing Sheets

2a

L-Glutathione reduced

[Au(C^N)(DTC)-GSH]
m/z = 791.12

[Au(C^N)(DTC)]
m/z = 486.05

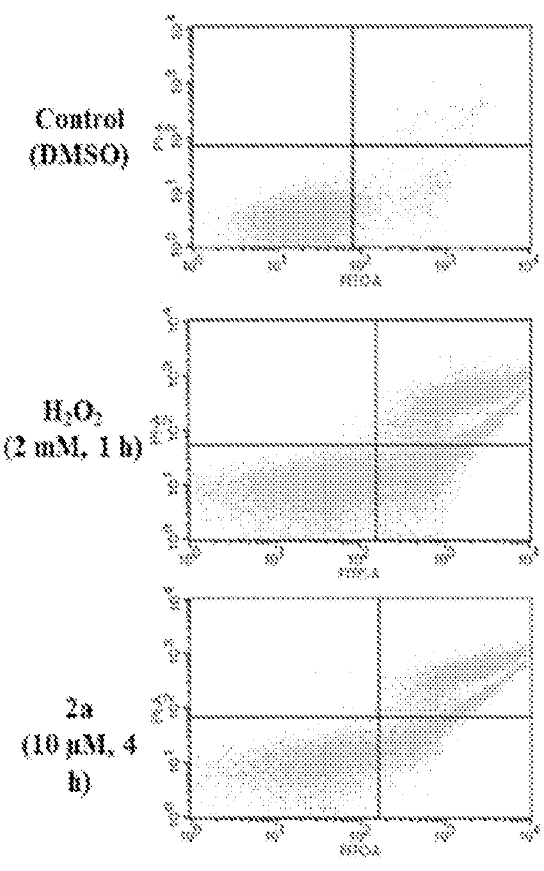
FIG. 10A
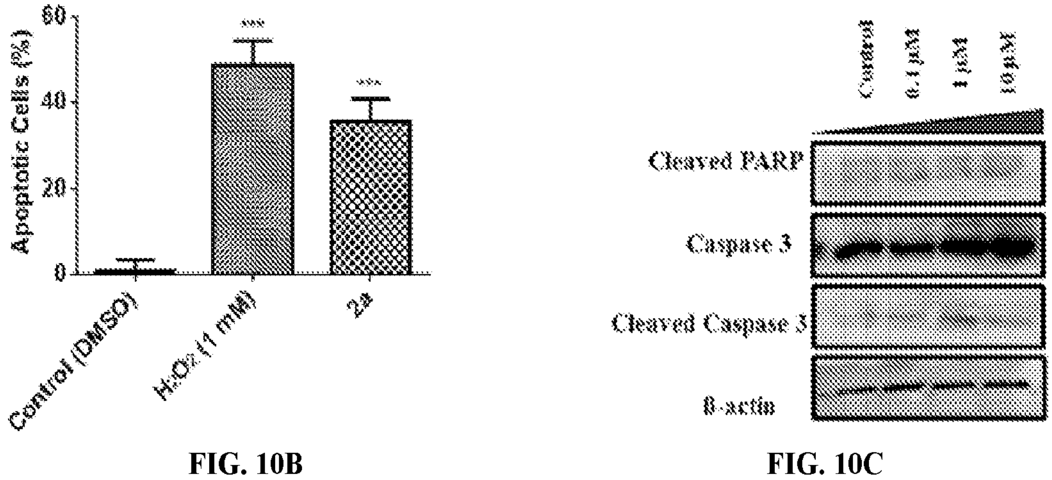
FIG. 10B
FIG. 10C

Cell Viability of 1a + GSH in MDA-MB-231:

Cell Viability of 1a-1e and 2b-2e:

Mitochondrial Membrane Potential FOV:

No Pre-treatment
MitoTempo

GOLD(III) COMPOUNDS AND CANCER CELL-SELECTIVE MODULATION OF MITOCHONDRIAL RESPIRATION AND METABOLISM

RELATED APPLICATIONS

This application claims priority from U.S. Provisional Application Ser. No. 63/058,129, filed Jul. 29, 2020, the entire disclosure of which is incorporated herein by this reference.

TECHNICAL FIELD

The presently-disclosed subject matter relates to useful compounds and compositions, and methods of making and methods of using such compounds and compositions. The presently-disclosed subject matter also relates to methods of treating cancer using compounds and compositions disclosed herein.

INTRODUCTION

Tumors harbor inherent complexities that present therapeutic challenges.[1] For example, biological hallmarks of cancer, which define alterations in cell physiology to promote tumor growth include: (i) insensitivity to growth-inhibitory (antigrowth) signals, (ii) evasion of programmed cell death (apoptosis), (iii) limitless replicative potential, (iv) sustained angiogenesis, (v) tissue invasion & metastasis, (vi) avoiding immune destruction, (vii) evading immune destruction, and (viii) reprogramming of energy metabolism[2-3] with genetic instability and tumor-promoting inflammation as primary drivers. However, such complexities present opportunities for targeted therapy.

The redox properties of transition metal constructs can influence metabolic reprogramming of cancer cells,[4-5] given the inherent redox activity associated with bioenergetics and mitochondrial processes such as the electron transport chain (ETC).[6] Metabolically active tumors are addicted to glycolysis (known as the Warburg effect)[7-8] and this has been exploited therapeutically through inhibition of glucose metabolism and the use of 2-deoxy-2-fluoro-D-glucose (FDG-PET) to detect tumors.[9-10] Additionally, many tumor types depend on oxidative phosphorylation (OXPHOS) to coordinate their bioenergetic states and promote proliferation.[11-12]

Over 50% of cancer patients receive platinum agents worldwide.[13] Platinum agents are particularly effective in bladder and testicular cancers.[14-15] Although widely used in other cancer types, such as colon and ovarian, their response rate is stymied by recurrence due to acquired and innate mechanisms.[16-18] The discovery of new transition metal complexes with new biological targets and mechanism of action have become alternate strategies to improve treatment outcomes.[19-20]

Gold (Au) is a third-row transition metal, just like platinum, which can be tolerated in humans as displayed in the FDA approved drug, auranofin.[21-23] Both Au(I) and (III) complexes have gained considerable interest over the years as anticancer agents with preferential targeting of mitochondria,[24] thioredoxin proteasome, and inducing endoplasmic reticulum stress.[24-32] Gold complexes with multifaceted target mechanisms to evade resistance pathways are attractive.

Renewed interest in Au(III) complexes as antitumor agents is reflected by reports attesting to their high cytotoxicity, reduced cross-resistance with cisplatin, and tolerance in tumor-bearing mice.[27,33-36] Among such complexes are Au(III)-2-pyridylmethanol,[37] Au(III)dichloro(N-ethylsalicylaldiminate,[38] Au(III)-phosphine,[39-41] cyclometalated Au(III),[27,34,42-46] and Au(III)-dithiocarbamates (DTC).[45,47-52] While different classes of Au(III)-dithiocarbamate display promising anticancer activity, the mechanism of action is not well elucidated in vitro or in vivo.[45,53] Developing metal-based drugs that exploit cancer cell vulnerabilities will offer more effective therapies and tools to study the disease. Accordingly, there is a need in the art for unique Au-complexes, including complexes having improved utility as anti-cancer agents.

SUMMARY

The presently-disclosed subject matter meets some or all of the above-identified needs, as will become evident to those of ordinary skill in the art after a study of information provided in this document.

This Summary describes several embodiments of the presently-disclosed subject matter, and in many cases lists variations and permutations of these embodiments. This Summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently-disclosed subject matter, whether listed in this Summary or not. To avoid excessive repetition, this Summary does not list or suggest all possible combinations of such features.

The presently-disclosed subject matter includes a compound having the formula (I) or a pharmaceutically acceptable salt thereof:

(I)

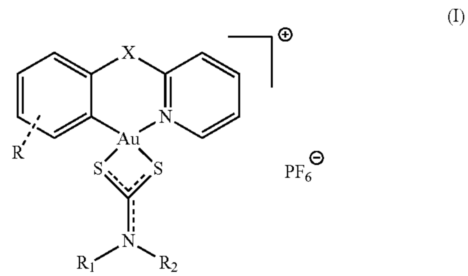

wherein X is selected from the group consisting of CH, C═O, C═NO-alkynyl, NH, O, S, or aryl; R is selected from the group consisting of H, aryl, alkyl, electron withdrawing group (EWG), or electron donating group (EDG); $R_1$ and $R_2$ are independently selected the group consisting of alkyl and substituted alkyl, or, $R_1$ and $R_2$, taken together with the N to which they are bound, form a piperidine or piperazine that is optionally substituted with Z; and Z is selected from the group consisting of haloaryl and alkoxyaryl.

In some embodiments, the compound has the following formula:

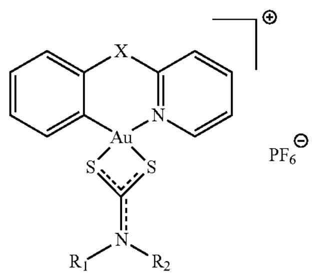

wherein X is selected from the group consisting of CH, C═O, C═NO-alkynyl, NH, O, S, or aryl; $R_1$ and $R_2$ are independently selected the group consisting of alkyl and substituted alkyl, or, $R_1$ and $R_2$, taken together with the N to which they are bound, form a piperidine or piperazine that is optionally substituted with Z; and Z is selected from the group consisting of haloaryl and alkoxyaryl.

In some embodiments, the compound has the following formula:

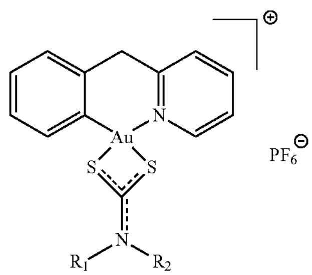

wherein $R_1$ and $R_2$ are independently selected the group consisting of alkyl and substituted alkyl, or, $R_1$ and $R_2$, taken together with the N to which they are bound, form a piperidine or piperazine that is optionally substituted with Z; and Z is selected from the group consisting of haloaryl and alkoxyaryl.

In some embodiments, the compound has the following formula:

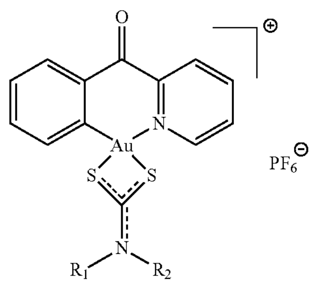

wherein $R_1$ and $R_2$ are independently selected the group consisting of alkyl and substituted alkyl, or, $R_1$ and $R_2$, taken together with the N to which they are bound, form a piperidine or piperazine that is optionally substituted with Z; and Z is selected from the group consisting of haloaryl and alkoxyaryl.

In some embodiments, the compound has the following formula:

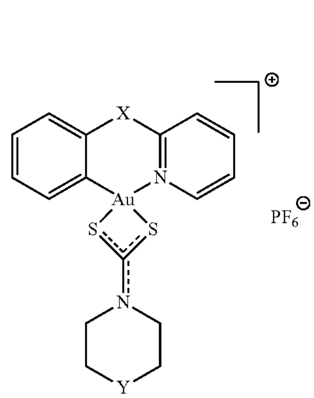

wherein X is selected from the group consisting of CH, C═O, C═NO-alkynyl, NH, O, S, or aryl; and Y is $CH_2$ or NH.

In some embodiments, the compound has the following formula:

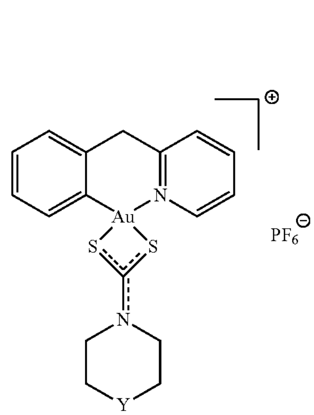

wherein Y is $CH_2$ or NH.

In some embodiments, the compound has the following formula:

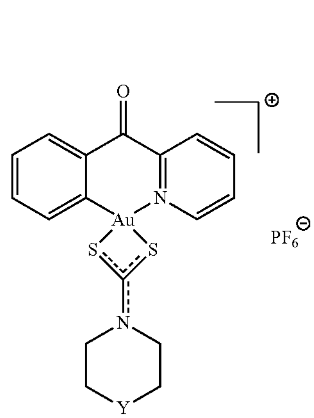

wherein Y is $CH_2$ or NH.

In some embodiments, the compound has the following formula:

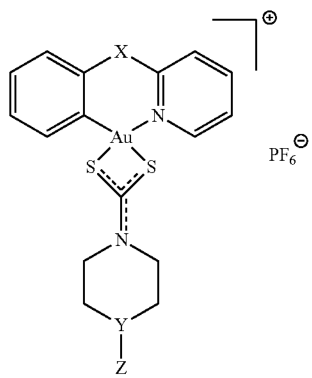

wherein X is selected from the group consisting of CH, C═O, C═NO-alkynyl, NH, O, S, or aryl; Y is CH or N; and Z is haloaryl or alkoxyaryl.

In some embodiments, the compound has the following formula:

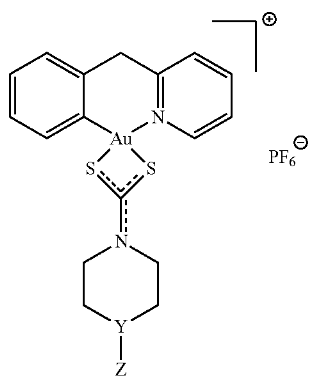

wherein Y is CH or N, and Z is haloaryl or alkoxyaryl.

In some embodiments, the compound has the following formula:

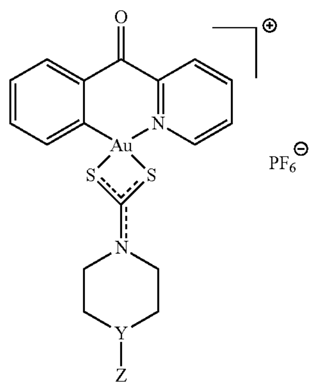

wherein Y is CH or N, and Z is haloaryl or alkoxyaryl.

In some embodiments, the compound has the following formula:

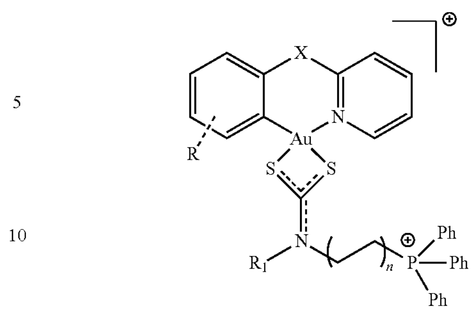

wherein X is selected from the group consisting of CH, C═O, C═NO-alkynyl, NH, O, S, or aryl; R is selected from the group consisting of H, aryl, alkyl, electron withdrawing group (EWG), or electron donating group (EDG); $R_1$ is selected the group consisting of alkyl and substituted alkyl; and n is 2, 4, 6, 8, 10, 12, or 16.

In some embodiments, the compound has the following formula:

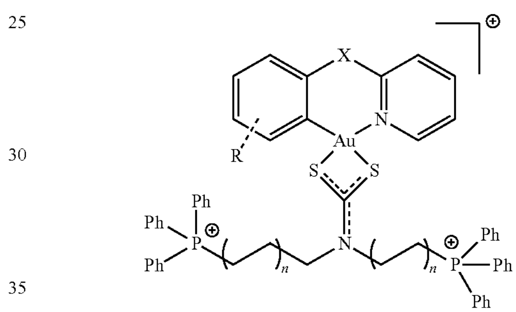

wherein X is selected from the group consisting of CH, C═O, C═NO-alkynyl, NH, O, S, or aryl; R is selected from the group consisting of H, aryl, alkyl, electron withdrawing group (EWG), or electron donating group (EDG); and each n is independently selected from 2, 4, 6, 8, 10, 12, or 16.

In some embodiments of the compounds of formula (I) as disclosed herein, X is selected from the group consisting of C—Y, N—Y, O—Y, or S—Y, where Y is a substituent such as H, $=OR_3$, $=NR_3$, $=NOR_3$, $-R_3$, where $R_3$ is alkyl, aryl, or alkynyl. In some embodiments, X is selected from the group consisting of CH, C═O, C═NO-alkynyl, NH, O, S, or aryl. In some embodiments, X is selected from the group consisting of CH and C═O. In some embodiments, X is aryl, selected from the group consisting of phenyl (Ph), benzyl (Bz), thiophenyl, furyl, and pyridyl. In some embodiments, X is selected from the group consisting of

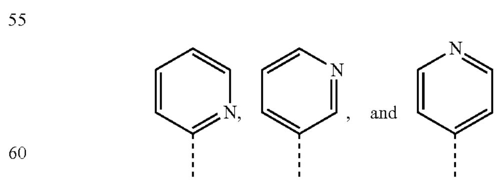

In some embodiments, X is C═NO-alkynyl.

In some embodiments of the compounds of formula (I) as disclosed herein, R is selected from the group consisting of H, aryl, alkyl, electron withdrawing group (EWG), or electron donating group (EDG). In some embodiments, R is in ortho, para, or meta position to Au. In some embodiments, R is aryl, selected from the group consisting of Ph, Bz, thiophenyl, furyl, and pyridyl. In some embodiments, R is alkyl including 1, 2, 3, 4, 5, 6, 7, or 8 carbon atoms. In some embodiments, R is EWG, selected from the group consisting of —$CF_3$, $NO_2$, —F, —Br, —Cl, Aldehyde —COH, —COOH, and —CN. In some embodiments, R is EDG, selected from the group consisting of —$OCH_3$, —OH, $CH_3$, —C═C, -alkynyl group, and —$NH_2$.

In some embodiments of the compounds of formula (I) as disclosed herein, $R_1$ and $R_2$ are independently selected the group consisting of alkyl and substituted alkyl.

In some embodiments of the compounds of formula (I) as disclosed herein, $R_1$ is alkyl including 1-33 carbon atoms. In some embodiments, $R_1$ is

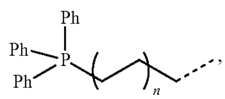

wherein n is 2, 4, 6, 8, 10, 12, or 16. In some embodiments, $R_1$ is selected from the group consisting of methyl and ethyl.

In some embodiments of the compounds of formula (I) as disclosed herein, $R_2$ is alkyl including 1-32 carbon atoms. In some embodiments, $R_2$ is

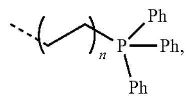

wherein n is 2, 4, 6, 8, 10, 12, or 16. In some embodiments, $R_2$ is selected from the group consisting of methyl and ethyl.

In some embodiments of the compounds of formula (I) as disclosed herein, $R_1$ and $R_2$, taken together with the N to which they are bound, form a piperidine or piperazine that not substituted. In some embodiments, $R_1$ and $R_2$, taken together with the N to which they are bound, form a piperidine or piperazine that is substituted with Z.

In some embodiments of the compounds of formula (I) as disclosed herein, Z is selected from the group consisting of haloaryl and alkoxyaryl.

In some embodiments of the compounds of formula (I) as disclosed herein, the compound is selected from the following formulae:

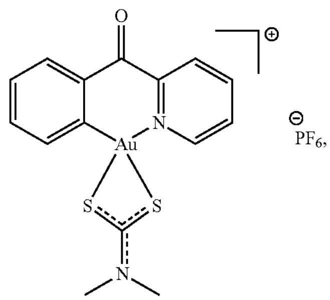

-continued

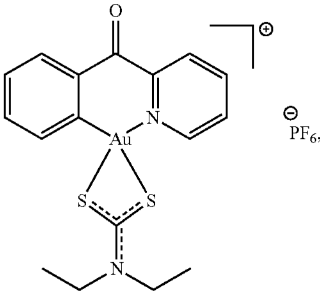

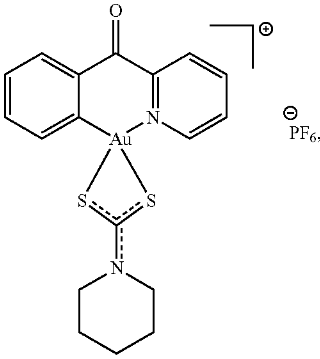

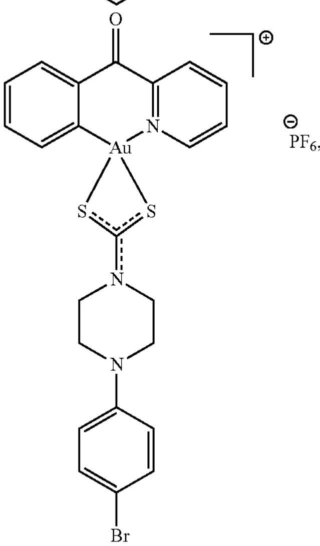

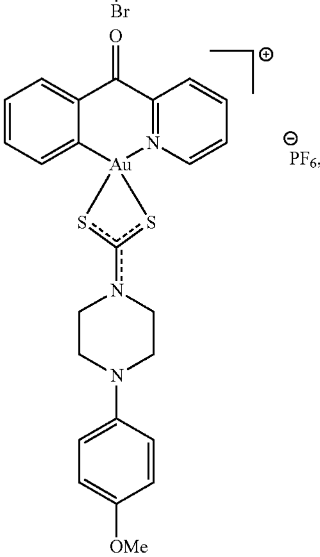

-continued

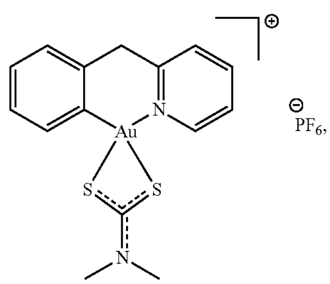

,

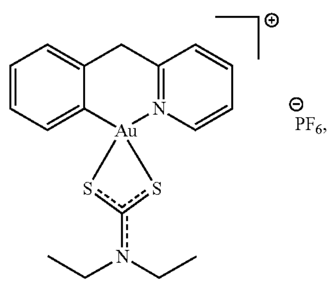

,

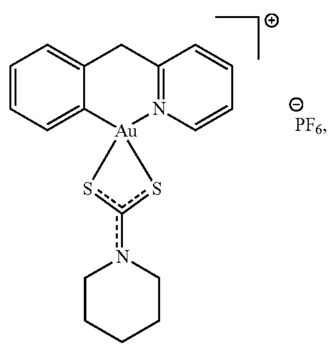

,

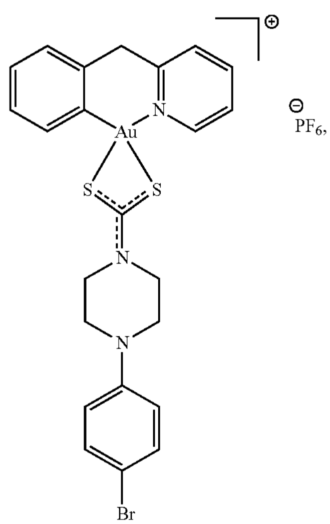

,

-continued

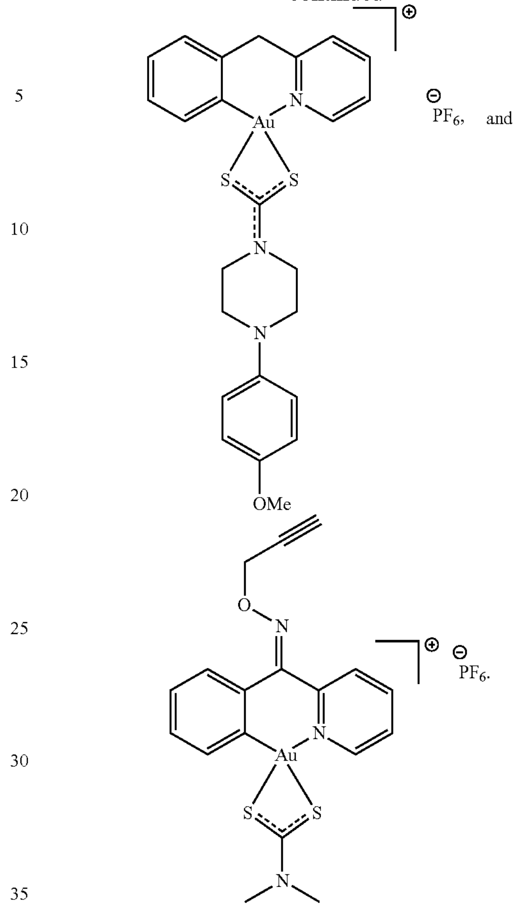

and

In some embodiments, the presently-disclosed subject matter is related to a pharmaceutical composition. Pharmaceutical compositions as disclosed herein comprise one or more compounds as disclosed herein and a pharmaceutically-acceptable carrier.

In some embodiments, the presently-disclosed subject matter is related to a method of killing a cancer cell, which involves contacting the cancer cell with an effective amount of one or more compounds or compositions as disclosed herein. In some embodiments, the effective amount is from about 10 nM to about 100 uM. In some embodiments, the cell is a cultured cell. In some embodiments, the cell is in a subject. In some aspects of the disclosed method, the subject has been diagnosed with a need for treatment of cancer. In some embodiments, the subject is a mammal.

In some embodiments, the presently-disclosed subject matter is related to a method of increasing reactive oxygen species (ROS) in a cell, which involves contacting the cancer cell with an effective amount of one or more compounds or compositions as disclosed herein. In some embodiments, the effective amount is from about 10 nM to about 100 uM. In some embodiments, the cell is a cancer cell. In some embodiments, the cell is a cultured cell. In some embodiments, the cell is in a subject. In some embodiments, the subject is a mammal.

In some embodiments, the presently-disclosed subject matter is related to use of one or more compounds or compositions as disclosed herein in a medicament for the treatment of a cancer.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are used, and the accompanying drawings of which:

FIG. 4A illustrates the reactivity of gold dithiocarbamate with a model thiol (L-GSH) with a proposed reaction scheme of compound 2a and GSH in an equimolar ratio. FIG. 4B includes HPLC chromatograms of 2a, GSH, and the reaction of 2a+GSH adduct (λ=240 nm) and FIG. 4C includes $^1$H NMR spectra of the same mixtures in DMSO.

FIG. 6A includes a $IC_{50}$ plot for complexes 1a-e in MDA-MB-231 (72 hours), FIG. 6B includes a $IC_{50}$ plot for complexes 2a-e in MDA-MB-231 (72 hours), FIG. 6C includes an extended panel of cell lines for complex 2a, and FIG. 6D includes a representative bar graph illustrating the $IC_{50}$ values of 2a across a panel of cancer cell lines. The dotted line indicates a threshold of 1 μM. % Cell survival was determined with MTT (adherent cells) and CellTiter-Glo (suspended cells). Data are plotted as the mean±s.e.m (n=3).

FIG. 10A includes a series of quadrants displaying apoptotic population of MDA-MB-231 within 4 h of treatment with 2a. Cells were seeded at a density of 5×105 per well. Data is representative of three individual experiments. H2O2 was used a positive control. FIG. 10B includes a bar graph illustrating the early-stage apoptotic cell population. Data are plotted as the mean±s.e.m (n=3), * $p<0.001$. FIG. 10**C includes immunoblots of MDA-MB-231 treated in a concentration dependent manner.

FIGS. 12A-12D illustrate the cell-cycle effect by 2a. FIG. 12A includes DEGs associated with cell cycle in response to 2a. FIG. 12B includes representative histograms of the cycle; control (DMSO vehicle) vs. 2a, MDA-MB-231 cells were seeded at a density of $2\times10^5$ cells/well and treated with 2a at 0.1 μM for 24, 48, and 72 h. FIG. 12C includes a bar graph detailing the change in G1, G2/M, and S phase over 24, 48, and 72 h, data are plotted as the mean±s.e.m (n=3). FIG. 12D includes a bar graph illustrating the % increase in G1 over 72 h after treatment with 2a, data are plotted as the mean±s.e.m (n=3) * $p<0.05$.

FIG. 16A includes results of pneumatic injection of 2a (also referred to herein as AuDTC) in TNBC cell lines MDA-MB-468 and 4T1. OCR was normalized per 1,000 cells, FIG. 16B includes results of pneumatic injection of AuDTC in normal breast epithelial cells HMEC and MCF-10A. OCR was normalized per 1,000 cells. Data are plotted as the mean±s.e.m., n=8.

FIG. 18A includes results of a bioenergetic stress test using pneumatic injection of 2a in a dose dependent manner. FIG. 18B includes calculated bioenergetic parameters using OCR data from panel A. Data are plotted as the mean±s.e.m., n=8, * $p<0.05$,  $p<0.01$, * $p<0.001$, **** $p<0.0005$, by an ordinary one way ANOVA with Dunett's multiple comparison test.

FIG. 19A includes dot plots showing loss of PE at both 5 and 10 μM after treatment with AuDTC (90 minutes). Each plots is representative of 5 samples. In FIG. 19B CCCP (5 μM, 1 hour) was used as a positive control. The plot is representative of 5 samples. FIG. 19C includes a dot plot showing loss of PE (J-aggregates) as a percentage in comparison to the control (set as 100%). Data are plotted as the mean±s.d., n=5. * $p<0.05$, ** $p<0.01$, by an ordinary two way ANOVA for comparison between cancer cell groups (4T1, MDA-MB-231, and MDA-MB-468) compared to normal cell groups (HMEC and MCF-10A) and an ordinary one way ANOVA concentrations for each respective cancer cell line.

In FIG. 26A ROS measured by DCF-DA after 2 hours treatment (FITC channel). Gated events were kept at 30,000 for each sample. In FIG. 26B mtROS measured by MitoSOX after 2 hours treatment (PE channel). Gated events were kept at 30,000 events.

FIGS. 30A and 30B include results of analysis of mTOR levels after treatment with 2a. FIG. 30A includes results of confocal microscopy of MDA-MB-468 after treatment with compound 2a (1 μM, 12 hours). Top row; merged images of Hoechst (nuclear counterstain), MTG (MitoTracker Green FM), and mTOR (primary mTOR antibody with secondary fluorescent antibody). Bottom row; mTOR only. Images show loss of fluorescence suggesting loss in mTOR levels. FIG. 30B includes Western blots of 4T1 after treatment with 2a. Treatment time was for 6 hours at varying concentrations. B-actin was used as a protein control.

FIG. 35A includes treatment of cells at 10 μM for 12 and 24 hours. Plots labelled with MT indicate pretreatment with MitoTEMPO (1 μM, 2 hours). $H_2O_2$ (200 μM, 24 hours) was used a positive control. Plots are representative of 5 replicates. FIG. 35B includes apoptotic % calculated from FACS analysis. Data are plotted as the mean±s.d. (n=5), * p<0.05, *** p<0.001, by an ordinary one way ANOVA with Dunett's multiple comparison test. Gates were kept at 30,000 for each sample.

FIG. 36A includes results of a bioenergetic stress test using Seahorse XF96 in MDA-MB-468 with pneumatic injection of AuDTC. Solid lines represent normal experimental conditions with no pretreatment. Dashed lines represent injection of AuDTC after pretreatment with MitoTEMPO (1 μM, 2 hours). OCR was normalized per 1,000 cells. Data are plotted as the mean±s.d., (n=8). FIGS. 36B-36D include bioenergetic parameters calculated from changes in OCR. Data are plotted as the mean±s.e.m., (n=8), * p<0.05,  p<0.01, ** p<0.0001, by a Student's two-sided t test.

FIG. 40A includes representative confocal image showing a merge of both channels (4-alkyne and MTR). The orange fluorescence color is a result of overlap "colocalization" of both green and red fluorescence. FIG. 40B includes a Pearson's correlation (PC=0.886) plot between the green and red fluorescent channels. 4-alkyne is represented as the x-axis (GFP channel) and MTR is represented as the y-axis (RFP channel).

DESCRIPTION OF EXEMPLARY EMBODIMENTS

Figure 1A:
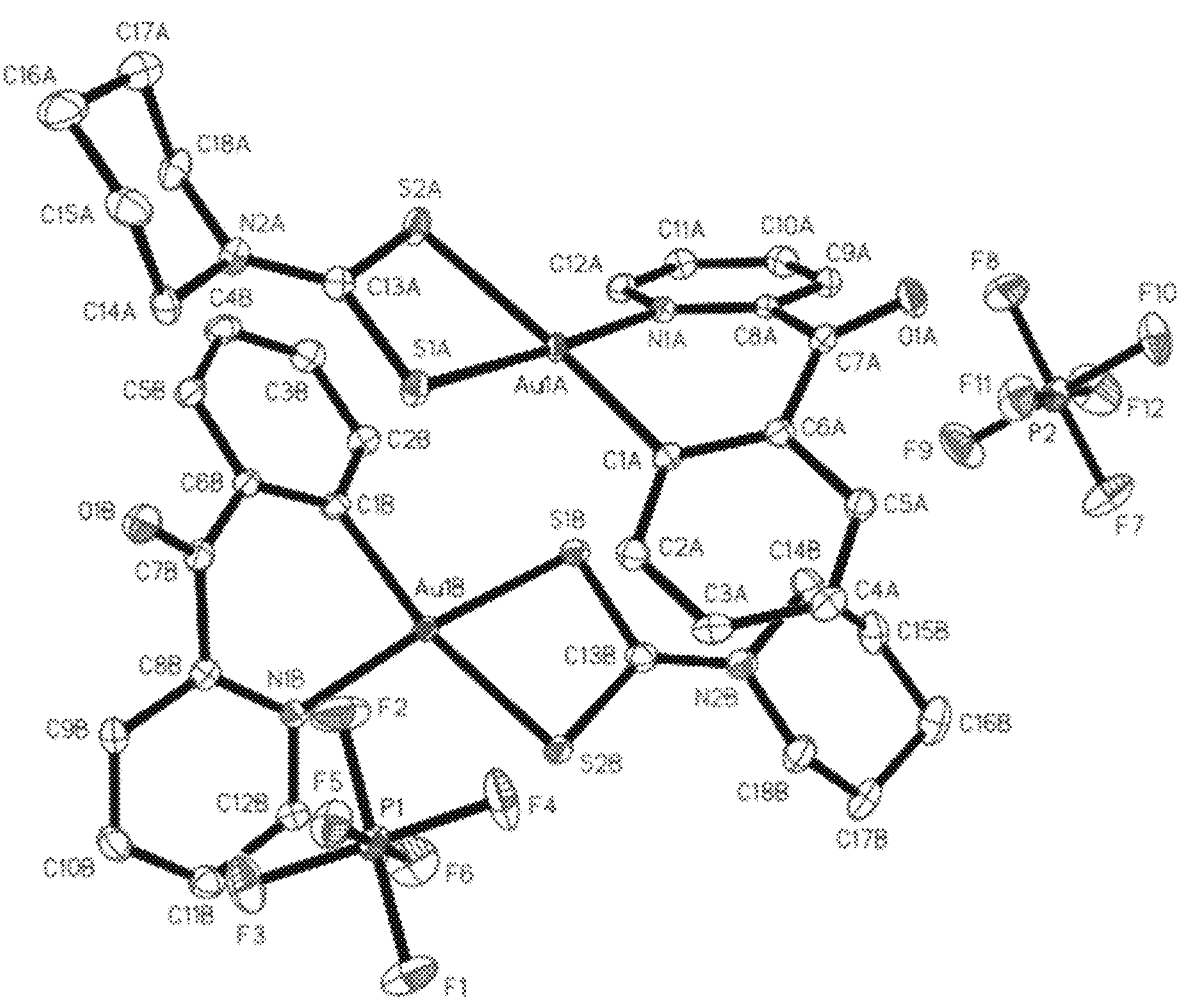
FIGS. 1A-1E includes single crystal X-ray diffraction of complexes 1c, 2a, 2b, 2c, and 2e.
Figure 1B:
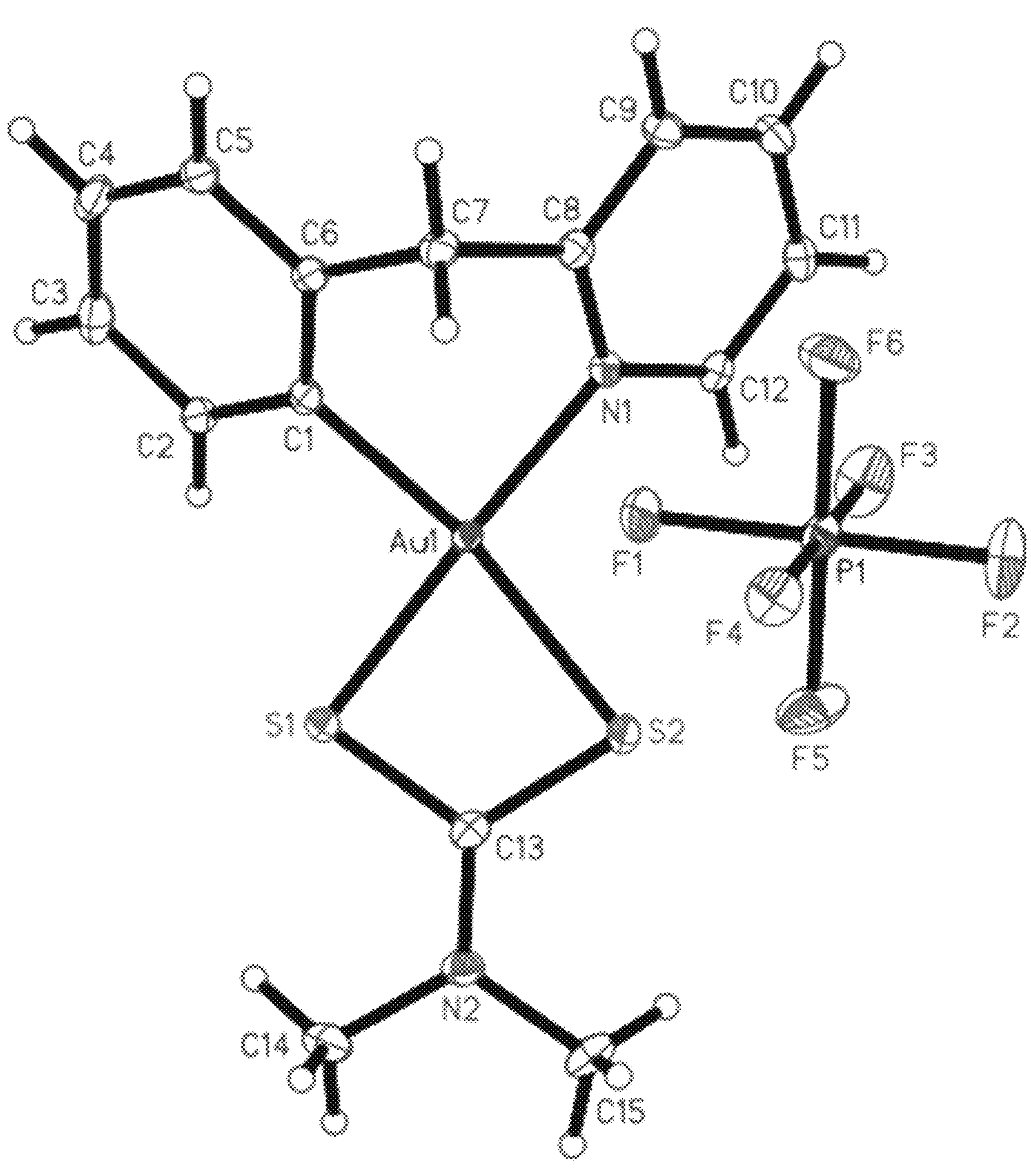
Figure 1C:
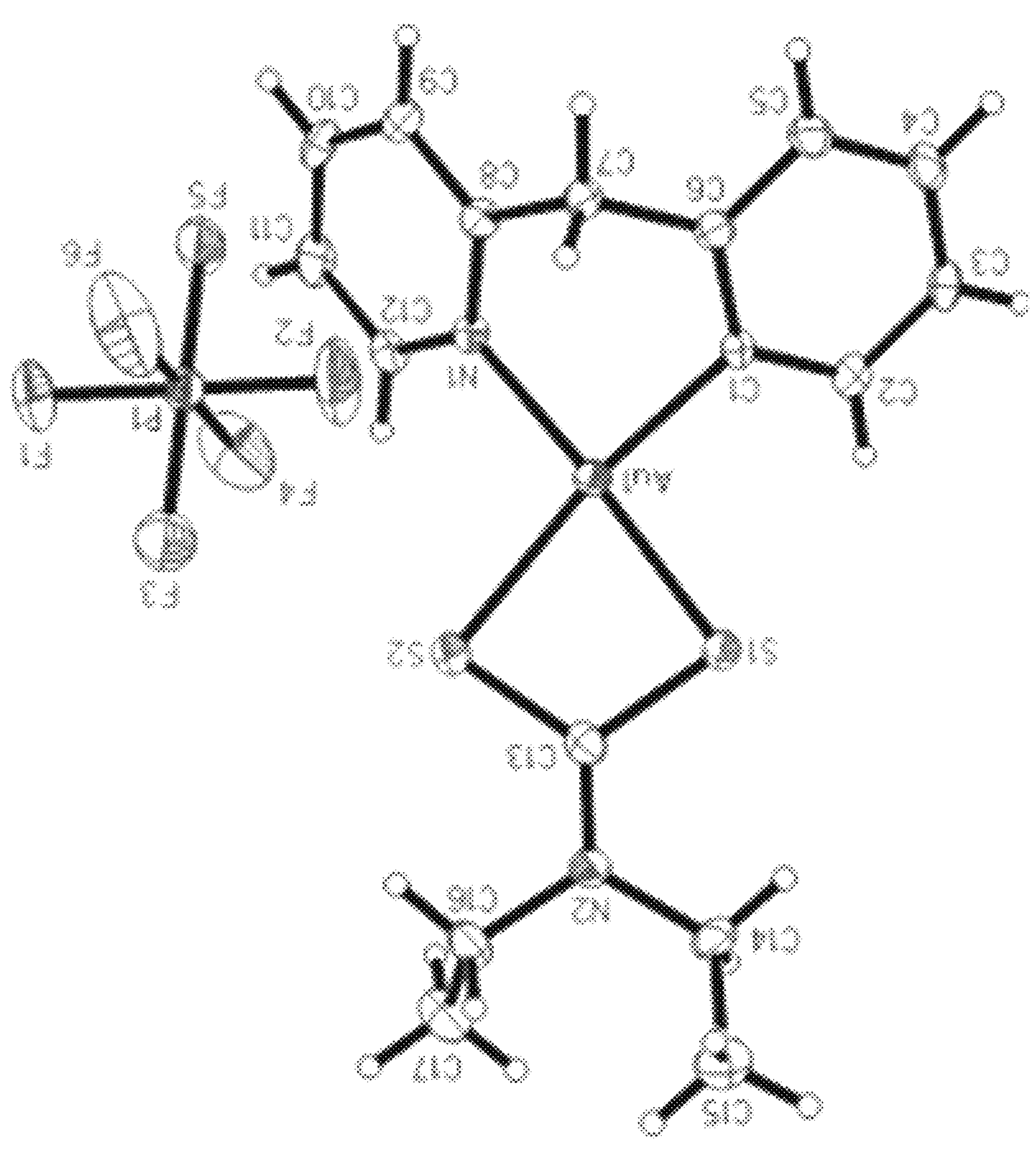
Figures 1D, 1E:
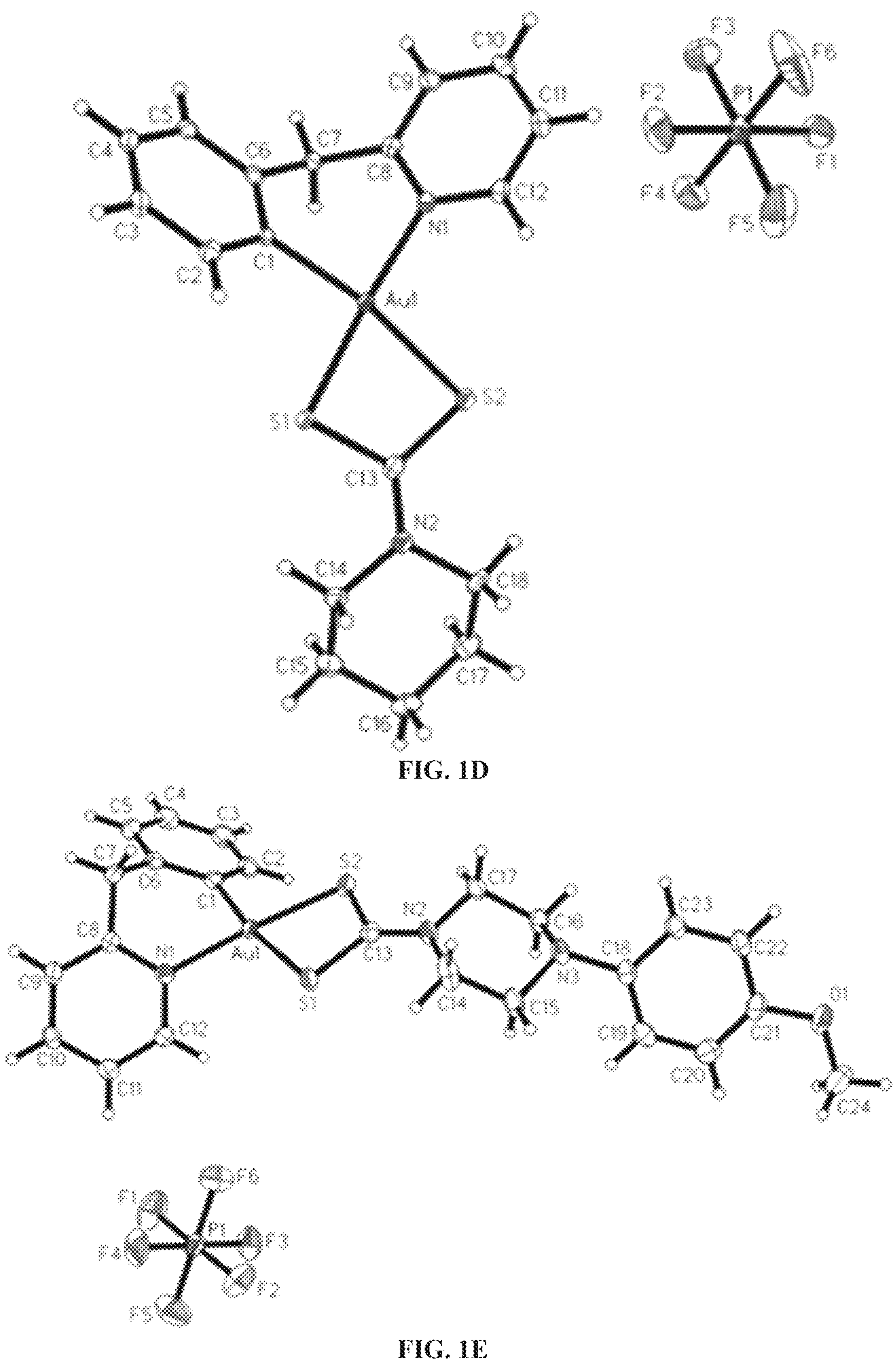

The details of one or more embodiments of the presently-disclosed subject matter are set forth in this document. Modifications to embodiments described in this document, and other embodiments, will be evident to those of ordinary skill in the art after a study of the information provided in this document. The information provided in this document, and particularly the specific details of the described exemplary embodiments, is provided primarily for clearness of understanding and no unnecessary limitations are to be understood therefrom. In case of conflict, the specification of this document, including definitions, will control.

Before the present compounds, compositions, articles, systems, devices, and/or methods are disclosed and described, it is to be understood that they are not limited to specific synthetic methods unless otherwise specified, or to particular reagents unless otherwise specified, as such may, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which need to be independently confirmed.

The presently-disclosed subject matter includes unique Au(III) compounds and compositions. The presently-disclosed subject matter further includes methods of increasing reactive oxygen species in a cell. The presently-disclosed subject matter further includes methods of killing a cancer cell. The syntheses of Au(III) compounds is disclosed herein, which incorporate [C^N] to improve complex stability and to provide unique ligands for structure activity relationship (SAR). As disclosed herein, the compounds display high potency in cancer cells.

In some embodiments, the presently-disclosed subject matter relates to compounds, or pharmaceutically acceptable derivatives thereof, useful inhibitors for the treatment of cancer. It is also understood that the disclosed compounds can all be employed as corresponding pharmaceutical compositions.

In some embodiments, the presently disclosed subject matter includes a compound having the following formula (I):

(I)

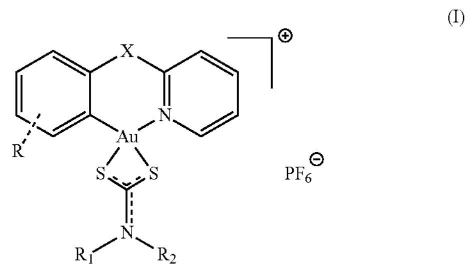

The compounds disclosed herein can include all salt forms, for example, salts of both basic groups, inter alia, amines, as well as salts of acidic groups, inter alia, carboxylic acids. The following are non-limiting examples of anions that can form salts with protonated basic groups: chloride, bromide, iodide, sulfate, bisulfate, carbonate, bicarbonate, phosphate, formate, acetate, propionate, butyrate, pyruvate, lactate, oxalate, malonate, maleate, succinate, tartrate, fumarate, citrate, and the like. The following are non-limiting examples of cations that can form salts of acidic groups: ammonium, sodium, lithium, potassium, calcium, magnesium, bismuth, lysine, and the like.

The analogs (compounds) of the present disclosure are arranged into several categories to assist the formulator in applying a rational synthetic strategy for the preparation of analogs which are not expressly exampled herein. The arrangement into categories does not imply increased or decreased efficacy for any of the compositions of matter described herein.

In some embodiments of the compounds of formula (I) as disclosed herein, X is selected from the group consisting of C—Y, N—Y, O—Y, or S—Y, where Y is a substituent such as H, $=OR_3$, $=NR_3$, $=NOR_3$, $-R_3$, where $R_3$ is alkyl, aryl, or alkynyl. In some embodiments, X is selected from the group consisting of CH, C═O, C═NO-alkynyl, NH, O, S, or aryl. In some embodiments, X is selected from the group consisting of CH and C═O. In some embodiments, X is aryl, selected from the group consisting of phenyl (Ph), benzyl (Bz), thiophenyl, furyl, and pyridyl. In some embodiments, X is selected from the group consisting of

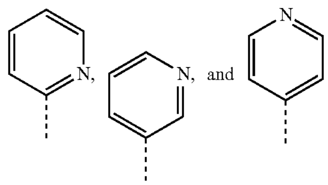

In some embodiments, X is C═NO-alkynyl.

In some embodiments of the compounds of formula (I) as disclosed herein, R is selected from the group consisting of H, aryl, alkyl, electron withdrawing group (EWG), or electron donating group (EDG). In some embodiments, R is in ortho, para, or meta position to Au. In some embodiments, R is aryl, selected from the group consisting of Ph, Bz, thiophenyl, furyl, and pyridyl. In some embodiments, R is alkyl including 1, 2, 3, 4, 5, 6, 7, or 8 carbon atoms. In some embodiments, R is EWG, selected from the group consisting of $-CF_3$, $NO_2$, —F, —Br, —Cl, Aldehyde —COH, —COOH, and —CN. In some embodiments, R is EDG, selected from the group consisting of $-OCH_3$, —OH, $CH_3$, —C═C, -alkynyl group, and $-NH_2$.

In some embodiments of the compounds of formula (I) as disclosed herein, $R_1$ and $R_2$ are independently selected the group consisting of alkyl and substituted alkyl.

In some embodiments of the compounds of formula (I) as disclosed herein, $R_1$ is alkyl including 1-33 carbon atoms. In some embodiments, $R_1$ is

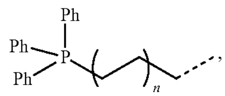

wherein n is 2, 4, 6, 8, 10, 12, or 16. In some embodiments, $R_1$ is selected from the group consisting of methyl and ethyl.

In some embodiments of the compounds of formula (I) as disclosed herein, $R_2$ is alkyl including 1-32 carbon atoms. In some embodiments, $R_2$ is

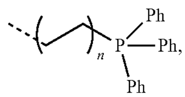

wherein n is 2, 4, 6, 8, 10, 12, or 16. In some embodiments, $R_2$ is selected from the group consisting of methyl and ethyl.

In some embodiments of the compounds of formula (I) as disclosed herein, $R_1$ and $R_2$, taken together with the N to which they are bound, form a piperidine or piperazine that not substituted. In some embodiments, $R_1$ and $R_2$, taken together with the N to which they are bound, form a piperidine or piperazine that is substituted with Z.

In some embodiments of the compounds of formula (I) as disclosed herein, Z is selected from the group consisting of haloaryl and alkoxyaryl.

In some embodiments of the compounds of formula (I) as disclosed herein, the compound has the following formula:

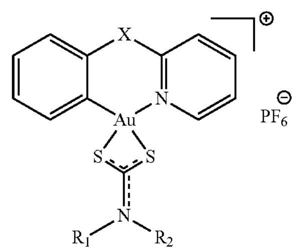

wherein X is selected from the group consisting of CH, C═O, C═NO-alkynyl, NH, O, S, or aryl; $R_1$ and $R_2$ are independently selected the group consisting of alkyl and substituted alkyl, or $R_1$ and $R_2$, taken together with the N to which they are bound, form a piperidine or piperazine that is optionally substituted with Z; and Z is selected from the group consisting of haloaryl and alkoxyaryl.

In some embodiments of the compounds of formula (I) as disclosed herein, the compound has the following formula:

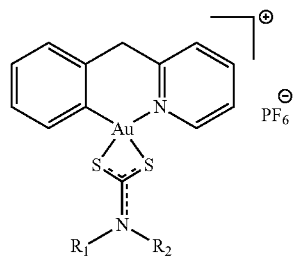

wherein $R_1$ and $R_2$ are independently selected the group consisting of alkyl and substituted alkyl, or, $R_1$ and $R_2$, taken together with the N to which they are bound, form a piperidine or piperazine that is optionally substituted with Z; and Z is selected from the group consisting of haloaryl and alkoxyaryl.

In some embodiments of the compounds of formula (I) as disclosed herein, the compound has the following formula:

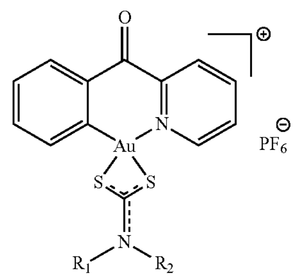

wherein $R_1$ and $R_2$ are independently selected the group consisting of alkyl and substituted alkyl, or, $R_1$ and $R_2$, taken together with the N to which they are bound, form a piperidine or piperazine that is optionally substituted with Z; and Z is selected from the group consisting of haloaryl and alkoxyaryl.

In some embodiments of the compounds of formula (I) as disclosed herein, the compound has the following formula:

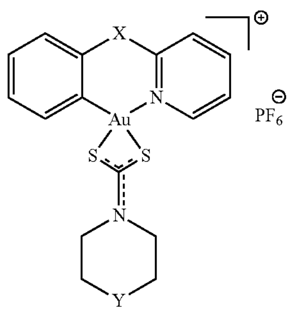

wherein X is selected from the group consisting of CH, C═O, C═NO-alkynyl, NH, O, S, or aryl; and Y is $CH_2$ or NH.

In some embodiments of the compounds of formula (I) as disclosed herein, the compound has the following formula:

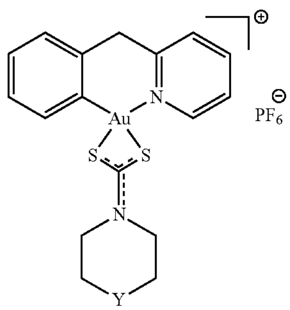

wherein Y is $CH_2$ or NH.

In some embodiments of the compounds of formula (I) as disclosed herein, the compound has the following formula: wherein Y is $CH_2$ or NH.

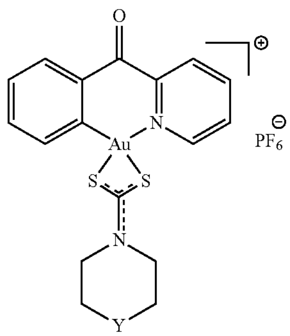

In some embodiments of the compounds of formula (I) as disclosed herein, the compound has the following formula:

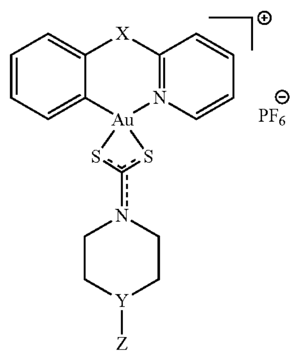

wherein X is selected from the group consisting of CH, C═O, C═NO-alkynyl, NH, O, S, or aryl; Y is CH or N; and Z is haloaryl or alkoxyaryl.

In some embodiments of the compounds of formula (I) as disclosed herein, the compound has the following formula:

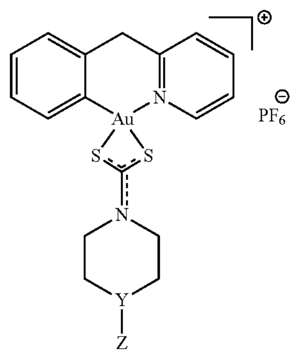

wherein Y is CH or N, and Z is haloaryl or alkoxyaryl.

In some embodiments of the compounds of formula (I) as disclosed herein, the compound has the following formula:

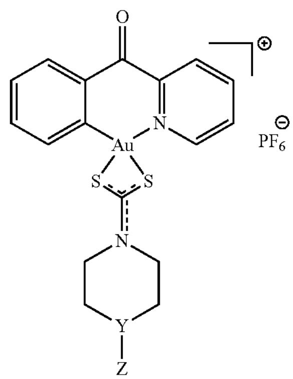

wherein Y is CH or N, and Z is haloaryl or alkoxyaryl.

In some embodiments of the compounds of formula (I) as disclosed herein, the compound has the following formula:

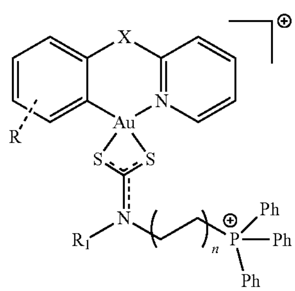

wherein X is selected from the group consisting of CH, C═O, C═NO-alkynyl, NH, O, S, or aryl R is selected from the group consisting of H, aryl, alkyl, electron withdrawing group (EWG), or electron donating group (EDG); $R_1$ is selected the group consisting of alkyl and substituted alkyl; and n is 2, 4, 6, 8, 10, 12, or 16.

In some embodiments of the compounds of formula (I) as disclosed herein, the compound has the following formula:

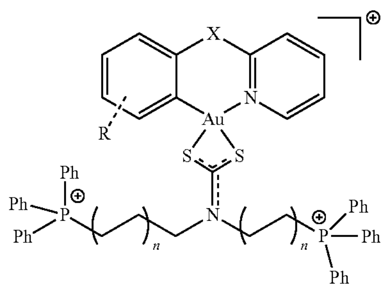

wherein X is selected from the group consisting of CH, C═O, C═NO-alkynyl, NH, O, S, or aryl; R is selected from the group consisting of H, aryl, alkyl, electron withdrawing group (EWG), or electron donating group (EDG); and each n is independently selected from 2, 4, 6, 8, 10, 12, or 16.

Some embodiments of the presently-disclosed subject matter includes a compound having the following formula:

(II)

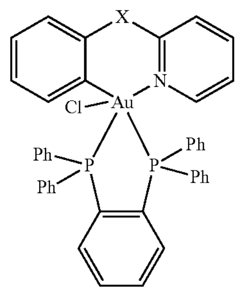

wherein X is selected from the group consisting of CH, C═O, C═NO-alkynyl, NH, O, S, or aryl. In some embodiments of the compound, X is CH or C═O.

In some embodiments of the compounds of formula (I) as disclosed herein, the compound is selected from the following formulae:

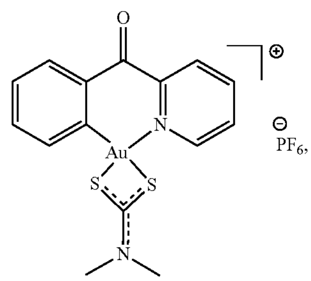

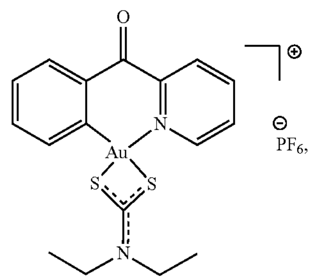

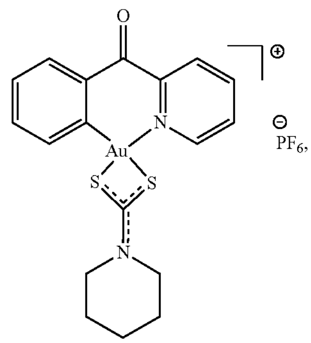

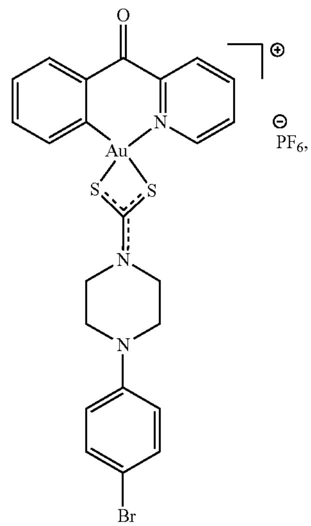

-continued

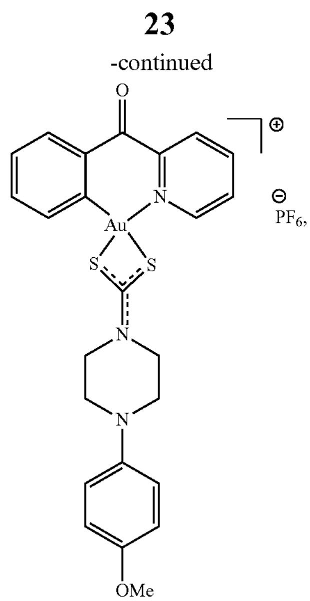

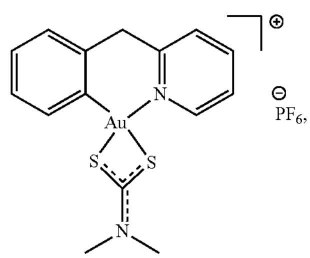

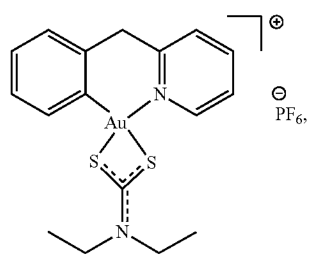

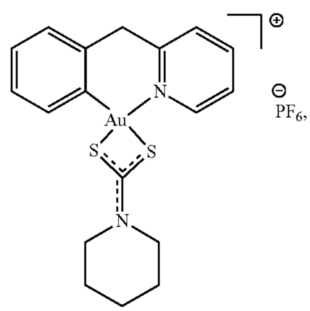

-continued

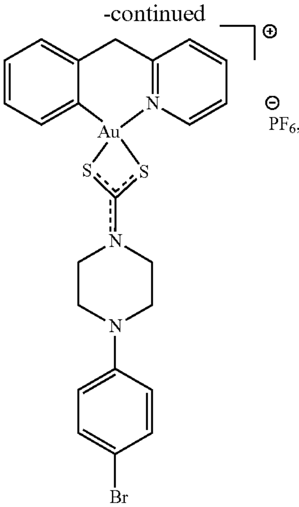

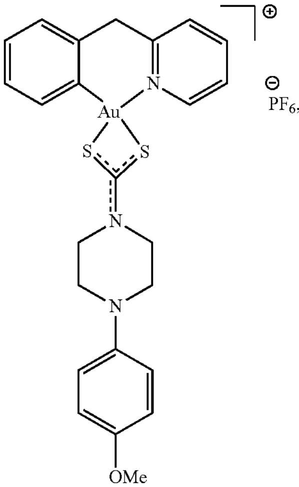

and

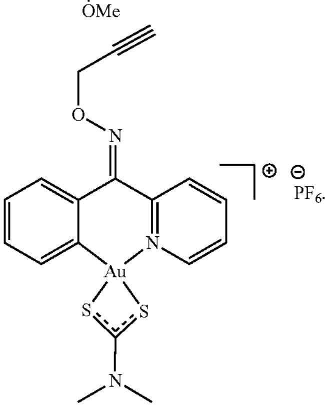

In some embodiments, the presently-disclosed subject matter is related to a pharmaceutical composition. Pharmaceutical compositions as disclosed herein comprise one or more compounds as disclosed herein and a pharmaceutically-acceptable carrier.

In some embodiments, the presently-disclosed subject matter is related to a method of killing a cancer cell, which involves contacting the cancer cell with an effective amount of one or more compounds or compositions as disclosed herein. In some embodiments, the effective amount is from about 10 nM to about 100 uM. In some embodiments, the cell is a cultured cell. In some embodiments, the cell is in a subject. In some aspects of the disclosed method, the subject has been diagnosed with a need for treatment of cancer. In some embodiments, the subject is a mammal.

In some embodiments, the presently-disclosed subject matter is related to a method of increasing reactive oxygen species (ROS) in a cell, which involves contacting the cancer cell with an effective amount of one or more compounds or compositions as disclosed herein. In some embodiments, the effective amount is from about 10 nM to about 100 uM. In some embodiments, the cell is a cancer cell. In some embodiments, the cell is a cultured cell. In some embodiments, the cell is in a subject. In some embodiments, the subject is a mammal.

In some embodiments, the presently-disclosed subject matter is related to use of one or more compounds or compositions as disclosed herein in a medicament for the treatment of a cancer.

While the terms used herein are believed to be well understood by those of ordinary skill in the art, certain definitions are set forth to facilitate explanation of the presently-disclosed subject matter.

Unless defined otherwise, all technical and scientific terms used herein have the same meaning as is commonly understood by one of skill in the art to which the invention(s) belong.

As used herein, the abbreviations for any protective groups, amino acids and other compounds, are, unless indicated otherwise, in accord with their common usage, recognized abbreviations, or the IUPAC-IUB Commission on Biochemical Nomenclature (see, Biochem. (1972) 11(9): 1726-1732).

A residue of a chemical species, as used in the specification and concluding claims, refers to the moiety that is the resulting product of the chemical species in a particular reaction scheme or subsequent formulation or chemical product, regardless of whether the moiety is actually obtained from the chemical species. Thus, an ethylene glycol residue in a polyester refers to one or more $—OCH_2CH_2O—$ units in the polyester, regardless of whether ethylene glycol was used to prepare the polyester. Similarly, a sebacic acid residue in a polyester refers to one or more $—CO(CH_2)_8CO—$ moieties in the polyester, regardless of whether the residue is obtained by reacting sebacic acid or an ester thereof to obtain the polyester.

As used herein, the term "substituted" is contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valences of the heteroatoms. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound, e.g., a compound that does not spontaneously undergo transformation such as by rearrangement, cyclization, elimination, etc.

In defining various terms, "$A^1$," "$A^2$," "$A^3$," and "$A^4$" are used herein as generic symbols to represent various specific substituents. These symbols can be any substituent, not limited to those disclosed herein, and when they are defined to be certain substituents in one instance, they can, in another instance, be defined as some other substituents.

The term "alkyl" as used herein is a branched or unbranched saturated hydrocarbon group of 1 to 33 carbon atoms, such as methyl, ethyl, n-propyl, isopropyl, n-butyl, isobutyl, s-butyl, t-butyl, n-pentyl, isopentyl, s-pentyl, neopentyl, hexyl, heptyl, octyl, nonyl, decyl, dodecyl, tetradecyl, hexadecyl, eicosyl, tetracosyl, and the like. The alkyl group can be cyclic or acyclic. The alkyl group can be branched or unbranched. The alkyl group can also be substituted or unsubstituted. For example, the alkyl group can be substituted with one or more groups including, but not limited to, optionally substituted alkyl, cycloalkyl, alkoxy, amino, ether, halide, hydroxy, nitro, silyl, sulfo-oxo, or thiol, as described herein. A "lower alkyl" group is an alkyl group containing from one to six carbon atoms.

Throughout the specification "alkyl" is generally used to refer to both unsubstituted alkyl groups and substituted alkyl groups; however, substituted alkyl groups are also specifically referred to herein by identifying the specific substituent(s) on the alkyl group. For example, the term "halogenated alkyl" specifically refers to an alkyl group that is substituted with one or more halide, e.g., fluorine, chlorine, bromine, or iodine. The term "alkoxyalkyl" specifically refers to an alkyl group that is substituted with one or more alkoxy groups, as described below. The term "alkylamino" specifically refers to an alkyl group that is substituted with one or more amino groups, as described below, and the like. When "alkyl" is used in one instance and a specific term such as "alkylalcohol" is used in another, it is not meant to imply that the term "alkyl" does not also refer to specific terms such as "alkylalcohol" and the like.

This practice is also used for other groups described herein. That is, while a term such as "cycloalkyl" refers to both unsubstituted and substituted cycloalkyl moieties, the substituted moieties can, in addition, be specifically identified herein; for example, a particular substituted cycloalkyl can be referred to as, e.g., an "alkylcycloalkyl." Similarly, a substituted alkoxy can be specifically referred to as, e.g., a "halogenated alkoxy," a particular substituted alkenyl can be, e.g., an "alkenylalcohol," and the like. Again, the practice of using a general term, such as "cycloalkyl," and a specific term, such as "alkylcycloalkyl," is not meant to imply that the general term does not also include the specific term.

The term "cycloalkyl" as used herein is a non-aromatic carbon-based ring composed of at least three carbon atoms. Examples of cycloalkyl groups include, but are not limited to, cyclopropyl, cyclobutyl, cyclopentyl, cyclohexyl, norbornyl, and the like. The term "heterocycloalkyl" is a type of cycloalkyl group as defined above, and is included within the meaning of the term "cycloalkyl," where at least one of the carbon atoms of the ring is replaced with a heteroatom such as, but not limited to, nitrogen, oxygen, sulfur, or phosphorus. The cycloalkyl group and heterocycloalkyl group can be substituted or unsubstituted. The cycloalkyl group and heterocycloalkyl group can be substituted with one or more groups including, but not limited to, optionally substituted alkyl, cycloalkyl, alkoxy, amino, ether, halide, hydroxy, nitro, silyl, sulfo-oxo, or thiol as described herein.

The term "polyalkylene group" as used herein is a group having two or more $CH_2$ groups linked to one another. The polyalkylene group can be represented by a formula $—(CH_2)_a—$, where "a" is an integer of from 2 to 500.

The terms "alkoxy" and "alkoxyl" as used herein to refer to an alkyl or cycloalkyl group bonded through an ether linkage; that is, an "alkoxy" group can be defined as —$OA^1$ where $A^1$ is alkyl or cycloalkyl as defined above. "Alkoxy" also includes polymers of alkoxy groups as just described; that is, an alkoxy can be a polyether such as —$OA^1$-$OA^2$ or —$OA^1$-$(OA^2)_a$-$OA^3$, where "a" is an integer of from 1 to 200 and $A^1$, $A^2$, and $A^3$ are alkyl and/or cycloalkyl groups.

The term "alkenyl" as used herein is a hydrocarbon group of from 2 to 24 carbon atoms with a structural formula containing at least one carbon-carbon double bond. Asymmetric structures such as $(A^1A^2)C{=}C(A^3A^4)$ are intended to include both the E and Z isomers. This can be presumed in structural formulae herein wherein an asymmetric alkene is present, or it can be explicitly indicated by the bond symbol C=C. The alkenyl group can be substituted with one or more groups including, but not limited to, optionally substituted alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol, as described herein.

The term "cycloalkenyl" as used herein is a non-aromatic carbon-based ring composed of at least three carbon atoms and containing at least one carbon-carbon double bound, i.e., C=C. Examples of cycloalkenyl groups include, but are not limited to, cyclopropenyl, cyclobutenyl, cyclopentenyl, cyclopentadienyl, cyclohexenyl, cyclohexadienyl, norbornenyl, and the like. The term "heterocycloalkenyl" is a type of cycloalkenyl group as defined above, and is included within the meaning of the term "cycloalkenyl," where at least one of the carbon atoms of the ring is replaced with a heteroatom such as, but not limited to, nitrogen, oxygen, sulfur, or phosphorus. The cycloalkenyl group and heterocycloalkenyl group can be substituted or unsubstituted. The cycloalkenyl group and heterocycloalkenyl group can be substituted with one or more groups including, but not limited to, optionally substituted alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol as described herein.

The term "alkynyl" as used herein is a hydrocarbon group of 2 to 24 carbon atoms with a structural formula containing at least one carbon-carbon triple bond. The alkynyl group can be unsubstituted or substituted with one or more groups including, but not limited to, optionally substituted alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol, as described herein.

The term "cycloalkynyl" as used herein is a non-aromatic carbon-based ring composed of at least seven carbon atoms and containing at least one carbon-carbon triple bound. Examples of cycloalkynyl groups include, but are not limited to, cycloheptynyl, cyclooctynyl, cyclononynyl, and the like. The term "heterocycloalkynyl" is a type of cycloalkenyl group as defined above, and is included within the meaning of the term "cycloalkynyl," where at least one of the carbon atoms of the ring is replaced with a heteroatom such as, but not limited to, nitrogen, oxygen, sulfur, or phosphorus. The cycloalkynyl group and heterocycloalkynyl group can be substituted or unsubstituted. The cycloalkynyl group and heterocycloalkynyl group can be substituted with one or more groups including, but not limited to, optionally substituted alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol as described herein.

The term "aryl" as used herein is a group that contains any carbon-based aromatic group including, but not limited to, benzene, naphthalene, phenyl, biphenyl, phenoxybenzene, and the like. The term "aryl" also includes "heteroaryl," which is defined as a group that contains an aromatic group that has at least one heteroatom incorporated within the ring of the aromatic group. Examples of heteroatoms include, but are not limited to, nitrogen, oxygen, sulfur, and phosphorus. Likewise, the term "non-heteroaryl," which is also included in the term "aryl," defines a group that contains an aromatic group that does not contain a heteroatom. The aryl group can be substituted or unsubstituted. The aryl group can be substituted with one or more groups including, but not limited to, optionally substituted alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol as described herein. The term "biaryl" is a specific type of aryl group and is included in the definition of "aryl." Biaryl refers to two aryl groups that are bound together via a fused ring structure, as in naphthalene, or are attached via one or more carbon-carbon bonds, as in biphenyl.

The term "aldehyde" as used herein is represented by a formula —C(O)H. Throughout this specification "C(O)" is a short hand notation for a carbonyl group, i.e., C=O.

The terms "amine" or "amino" as used herein are represented by a formula $NA'A^2A^3$, where $A^1$, $A^2$, and $A^3$ can be, independently, hydrogen or optionally substituted alkyl, cycloalkyl, alkenyl, cycloalkenyl, alkynyl, cycloalkynyl, aryl, or heteroaryl group as described herein.

The term "carboxylic acid" as used herein is represented by a formula —C(O)OH.

The term "ester" as used herein is represented by a formula —$OC(O)A^1$ or —$C(O)OA^1$, where $A^1$ can be an optionally substituted alkyl, cycloalkyl, alkenyl, cycloalkenyl, alkynyl, cycloalkynyl, aryl, or heteroaryl group as described herein. The term "polyester" as used herein is represented by a formula $-(A^1O(O)C\text{-}A^2\text{-}C(O)O)_a$— or $-(A^1O(O)C\text{-}A^2\text{-}OC(O))_a$—, where $A^1$ and $A^2$ can be, independently, an optionally substituted alkyl, cycloalkyl, alkenyl, cycloalkenyl, alkynyl, cycloalkynyl, aryl, or heteroaryl group described herein and "a" is an integer from 1 to 500. "Polyester" is as the term used to describe a group that is produced by the reaction between a compound having at least two carboxylic acid groups with a compound having at least two hydroxyl groups.

The term "ether" as used herein is represented by a formula $A^1OA^2$, where $A^1$ and $A^2$ can be, independently, an optionally substituted alkyl, cycloalkyl, alkenyl, cycloalkenyl, alkynyl, cycloalkynyl, aryl, or heteroaryl group described herein. The term "polyether" as used herein is represented by a formula $-(A^1O\text{-}A^2O)_a$—, where $A^1$ and $A^2$ can be, independently, an optionally substituted alkyl, cycloalkyl, alkenyl, cycloalkenyl, alkynyl, cycloalkynyl, aryl, or heteroaryl group described herein and "a" is an integer of from 1 to 500. Examples of polyether groups include polyethylene oxide, polypropylene oxide, and polybutylene oxide.

The term "halide" as used herein refers to the halogens fluorine, chlorine, bromine, and iodine.

The term "heterocycle," as used herein refers to single and multi-cyclic aromatic or non-aromatic ring systems in which at least one of the ring members is other than carbon. Heterocycle includes pyridinde, pyrimidine, furan, thiophene, pyrrole, isoxazole, isothiazole, pyrazole, oxazole, thiazole, imidazole, oxazole, including, 1,2,3-oxadiazole, 1,2,5-oxadiazole and 1,3,4-oxadiazole, thiadiazole, including, 1,2,3-thiadiazole, 1,2,5-thiadiazole, and 1,3,4-thiadiazole, triazole, including, 1,2,3-triazole, 1,3,4-triazole, tetrazole, including 1,2,3,4-tetrazole and 1,2,4,5-tetrazole, pyridine, pyridazine, pyrimidine, pyrazine, triazine, including 1,2,4-triazine and 1,3,5-triazine, tetrazine, including 1,2,4,5-tetrazine, pyrrolidine, piperidine, piperazine, morpholine, azetidine, tetrahydropyran, tetrahydrofuran, dioxane, and the like.

The term "hydroxyl" as used herein is represented by a formula —OH.

The term "ketone" as used herein is represented by a formula $A^1C(O)A^2$, where $A^1$ and $A^2$ can be, independently, an optionally substituted alkyl, cycloalkyl, alkenyl, cycloalkenyl, alkynyl, cycloalkynyl, aryl, or heteroaryl group as described herein.

The term "azide" as used herein is represented by a formula $—N_3$.

The term "nitro" as used herein is represented by a formula $—NO_2$.

The term "nitrile" as used herein is represented by a formula —CN.

The term "silyl" as used herein is represented by a formula $—SiA^1A^2A^3$, where $A^1$, $A^2$, and $A^3$ can be, independently, hydrogen or an optionally substituted alkyl, cycloalkyl, alkoxy, alkenyl, cycloalkenyl, alkynyl, cycloalkynyl, aryl, or heteroaryl group as described herein.

The term "sulfo-oxo" as used herein is represented by a formulas $—S(O)A^1$, $—S(O)_2A^1$, $—OS(O)_2A^1$, or $—OS(O)_2OA^1$, where $A^1$ can be hydrogen or an optionally substituted alkyl, cycloalkyl, alkenyl, cycloalkenyl, alkynyl, cycloalkynyl, aryl, or heteroaryl group as described herein. Throughout this specification "S(O)" is a short hand notation for S═O. The term "sulfonyl" is used herein to refer to the sulfo-oxo group represented by a formula $—S(O)_2A^1$, where $A^1$ can be hydrogen or an optionally substituted alkyl, cycloalkyl, alkenyl, cycloalkenyl, alkynyl, cycloalkynyl, aryl, or heteroaryl group as described herein. The term "sulfone" as used herein is represented by a formula $A^1S(O)_2A^2$, where $A^1$ and $A^2$ can be, independently, an optionally substituted alkyl, cycloalkyl, alkenyl, cycloalkenyl, alkynyl, cycloalkynyl, aryl, or heteroaryl group as described herein. The term "sulfoxide" as used herein is represented by a formula $A^1S(O)A^2$, where $A^1$ and $A^2$ can be, independently, an optionally substituted alkyl, cycloalkyl, alkenyl, cycloalkenyl, alkynyl, cycloalkynyl, aryl, or heteroaryl group as described herein.

The term "thiol" as used herein is represented by a formula —SH.

The term "organic residue" defines a carbon containing residue, i.e., a residue comprising at least one carbon atom, and includes but is not limited to the carbon-containing groups, residues, or radicals defined hereinabove. Organic residues can contain various heteroatoms, or be bonded to another molecule through a heteroatom, including oxygen, nitrogen, sulfur, phosphorus, or the like. Examples of organic residues include but are not limited alkyl or substituted alkyls, alkoxy or substituted alkoxy, mono or di-substituted amino, amide groups, etc. Organic residues can preferably comprise 1 to 18 carbon atoms, 1 to 15, carbon atoms, 1 to 12 carbon atoms, 1 to 8 carbon atoms, 1 to 6 carbon atoms, or 1 to 4 carbon atoms. In a further aspect, an organic residue can comprise 2 to 18 carbon atoms, 2 to 15, carbon atoms, 2 to 12 carbon atoms, 2 to 8 carbon atoms, 2 to 4 carbon atoms, or 2 to 4 carbon atoms.

As used herein, the term "derivative" refers to a compound having a structure derived from the structure of a parent compound (e.g., a compounds disclosed herein) and whose structure is sufficiently similar to those disclosed herein and based upon that similarity, would be expected by one skilled in the art to exhibit the same or similar activities and utilities as the claimed compounds, or to induce, as a precursor, the same or similar activities and utilities as the claimed compounds. Exemplary derivatives include salts, esters, amides, salts of esters or amides, and N-oxides of a parent compound.

Compounds described herein can contain one or more double bonds and, thus, potentially give rise to cis/trans (E/Z) isomers, as well as other conformational isomers. Unless stated to the contrary, the invention includes all such possible isomers, as well as mixtures of such isomers.

Unless stated to the contrary, a formula with chemical bonds shown only as solid lines and not as wedges or dashed lines contemplates each possible isomer, e.g., each enantiomer and diastereomer, and a mixture of isomers, such as a racemic or scalemic mixture. Compounds described herein can contain one or more asymmetric centers and, thus, potentially give rise to diastereomers and optical isomers. Unless stated to the contrary, the present invention includes all such possible diastereomers as well as their racemic mixtures, their substantially pure resolved enantiomers, all possible geometric isomers, and pharmaceutically acceptable salts thereof. Mixtures of stereoisomers, as well as isolated specific stereoisomers, are also included. During the course of the synthetic procedures used to prepare such compounds, or in using racemization or epimerization procedures known to those skilled in the art, the products of such procedures can be a mixture of stereoisomers. Additionally, unless expressly described as "unsubstituted", all substituents can be substituted or unsubstituted.

In some aspects, a structure of a compound can be represented by a formula:

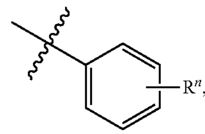

which is understood to be equivalent to a formula:

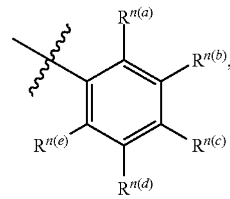

wherein n is typically an integer. That is, $R^n$ is understood to represent five independent substituents, $R^{n(a)}$, $R^{n(b)}$, $R^{n(c)}$, $R^{n(d)}$, $R^{n(e)}$. By "independent substituents," it is meant that each R substituent can be independently defined. For example, if in one instance $R^{n(a)}$ is halogen, then $R^{n(b)}$ is not necessarily halogen in that instance. Likewise, when a group R is defined as four substituents, R is understood to represent four independent substituents, $R^a$, $R^b$, $R^c$, and $R^d$. Unless indicated to the contrary, the substituents are not limited to any particular order or arrangement.

The following abbreviations are used herein. DMSO: dimethylsulfoxide. MeOH: methanol. EtOH: ethanol. TFA: trifluoroacetic acid. MeCN: acetonitrile.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific aspect or combination of aspects of the methods of the invention.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

As used herein, the term "subject" includes both human and animal subjects. In some embodiments, the subject is a mammal. In some embodiments, the subject is a human.

As used herein, the term "treatment" refers to the medical management of a patient with the intent to cure, ameliorate, stabilize, or prevent a disease, pathological condition, or disorder. This term includes active treatment, that is, treatment directed specifically toward the improvement of a disease, pathological condition, or disorder, and also includes causal treatment, that is, treatment directed toward removal of the cause of the associated disease, pathological condition, or disorder. In addition, this term includes palliative treatment, that is, treatment designed for the relief of symptoms rather than the curing of the disease, pathological condition, or disorder; preventative treatment, that is, treatment directed to minimizing or partially or completely inhibiting the development of the associated disease, pathological condition, or disorder; and supportive treatment, that is, treatment employed to supplement another specific therapy directed toward the improvement of the associated disease, pathological condition, or disorder.

As used herein, the term "prevent" or "preventing" refers to precluding, averting, obviating, forestalling, stopping, or hindering something from happening, especially by advance action. It is understood that where reduce, inhibit or prevent are used herein, unless specifically indicated otherwise, the use of the other two words is also expressly disclosed.

As used herein, the term "diagnosed" means having been subjected to a physical examination by a person of skill, for example, a physician, and found to have a condition that can be diagnosed or treated by the compounds, compositions, or methods disclosed herein. For example, "diagnosed with cancer" means having been subjected to a physical examination by a person of skill, for example, a physician, and found to have a condition that can be diagnosed or treated by a compound or composition that can favorably inhibit or kill cancer cells.

As used herein, the terms "administering" and "administration" refer to any method of providing a pharmaceutical preparation to a subject. Such methods are well known to those skilled in the art and include, but are not limited to, oral administration, transdermal administration, administration by inhalation, nasal administration, topical administration, intravaginal administration, ophthalmic administration, intraaural administration, intracerebral administration, rectal administration, and parenteral administration, including injectable such as intravenous administration, intra-arterial administration, intramuscular administration, and subcutaneous administration. Administration can be continuous or intermittent. In various aspects, a preparation can be administered therapeutically; that is, administered to treat an existing disease or condition.

As used herein, the term "effective amount" refers to an amount that is sufficient to achieve the desired result or to have an effect on an undesired condition. For example, a "therapeutically effective amount" refers to an amount that is sufficient to achieve the desired therapeutic result or to have an effect on undesired symptoms, but is generally insufficient to cause adverse side effects. The specific therapeutically effective dose level for any particular patient will depend upon a variety of factors including the disorder being treated and the severity of the disorder; the specific composition employed; the age, body weight, general health, sex and diet of the patient; the time of administration; the route of administration; the rate of excretion of the specific compound employed; the duration of the treatment; drugs used in combination or coincidental with the specific compound employed and like factors well known in the medical arts. For example, it is well within the skill of the art to start doses of a compound at levels lower than those required to achieve the desired therapeutic effect and to gradually increase the dosage until the desired effect is achieved. If desired, the effective daily dose can be divided into multiple doses for purposes of administration. Consequently, single dose compositions can contain such amounts or submultiples thereof to make up the daily dose. The dosage can be adjusted by the individual physician in the event of any contraindications. Dosage can vary, and can be administered in one or more dose administrations daily, for one or several days. Guidance can be found in the literature for appropriate dosages for given classes of pharmaceutical products. In further various aspects, a preparation can be administered in a "prophylactically effective amount"; that is, an amount effective for prevention of a disease or condition.

As used herein, the term "pharmaceutically acceptable carrier" refers to sterile aqueous or nonaqueous solutions, dispersions, suspensions or emulsions, as well as sterile powders for reconstitution into sterile injectable solutions or dispersions just prior to use. Examples of suitable aqueous and nonaqueous carriers, diluents, solvents or vehicles include water, ethanol, polyols (such as glycerol, propylene glycol, polyethylene glycol and the like), carboxymethylcellulose and suitable mixtures thereof, vegetable oils (such as olive oil) and injectable organic esters such as ethyl oleate. Proper fluidity can be maintained, for example, by the use of coating materials such as lecithin, by the maintenance of the required particle size in the case of dispersions and by the use of surfactants. These compositions can also contain adjuvants such as preservatives, wetting agents, emulsifying agents and dispersing agents. Prevention of the action of microorganisms can be ensured by the inclusion of various antibacterial and antifungal agents such as paraben, chlorobutanol, phenol, sorbic acid and the like. It can also be desirable to include isotonic agents such as sugars, sodium chloride and the like. Prolonged absorption of the injectable pharmaceutical form can be brought about by the inclusion of agents, such as aluminum monostearate and gelatin, which delay absorption. Injectable depot forms are made by forming microencapsule matrices of the drug in biodegradable polymers such as polylactide-polyglycolide, poly(orthoesters) and poly(anhydrides). Depending upon the ratio of drug to polymer and the nature of the particular polymer employed, the rate of drug release can be controlled. Depot injectable formulations are also prepared by entrapping the drug in liposomes or microemulsions which are compatible with body tissues. The injectable formulations can be sterilized, for example, by filtration through a bacterial-retaining filter or by incorporating sterilizing agents in the form of sterile solid compositions which can be dissolved or dispersed in sterile water or other sterile injectable media just prior to use. Suitable inert carriers can include sugars such as lactose. Desirably, at least 95% by weight of the particles of the active ingredient have an effective particle size in the range of 0.01 to 10 micrometers.

The term "pharmaceutically acceptable" describes a material that is not biologically or otherwise undesirable, i.e., without causing an unacceptable level of undesirable biological effects or interacting in a deleterious manner.

The present application can "comprise" (open ended) or "consist essentially of" the components of the present invention as well as other ingredients or elements described herein. As used herein, "comprising" is open ended and means the elements recited, or their equivalent in structure or function, plus any other element or elements which are not recited. The terms "having" and "including" are also to be construed as open ended unless the context suggests otherwise.

Following long-standing patent law convention, the terms "a", "an", and "the" refer to "one or more" when used in this application, including the claims. Thus, for example, reference to "a cell" includes a plurality of such cells, and so forth.

Unless otherwise indicated, all numbers expressing quantities of ingredients, properties such as reaction conditions, and so forth used in the specification and claims are to be understood as being modified in all instances by the term "about". Accordingly, unless indicated to the contrary, the numerical parameters set forth in this specification and claims are approximations that can vary depending upon the desired properties sought to be obtained by the presently-disclosed subject matter.

As used herein, the term "about," when referring to a value or to an amount of mass, weight, time, volume, concentration or percentage is meant to encompass variations of in some embodiments ±20%, in some embodiments ±10%, in some embodiments ±5%, in some embodiments ±1%, in some embodiments ±0.5%, in some embodiments ±0.1%, in some embodiments ±0.01%, and in some embodiments ±0.001% from the specified amount, as such variations are appropriate to perform the disclosed method.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, "optional" or "optionally" means that the subsequently described event or circumstance does or does not occur and that the description includes instances where said event or circumstance occurs and instances where it does not. For example, an optionally variant portion means that the portion is variant or non-variant.

Although any methods, devices, and materials similar or equivalent to those described herein can be used in the practice or testing of the presently-disclosed subject matter, representative methods, devices, and materials are described herein.

EXAMPLES

The presently-disclosed subject matter is further illustrated by the following specific but non-limiting examples. The following examples may include compilations of data that are representative of data gathered at various times during the course of development and experimentation related to the present invention.

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Several methods for preparing the compounds of this invention are illustrated in the following Examples. Starting materials and the requisite intermediates are in some cases commercially available, or can be prepared according to literature procedures or as illustrated herein.

Example 1. General Experimental Details for Synthesis

The [C^N]-cyclometalated gold(III) compounds were synthesized from previously reported methods.[54] Treatment of [C^N]—Au(III)$Cl_2$ with dithiocarbamate ligands in methanol for 16 h at room temperature followed by treatment with an aqueous saturated solution of $NH_4PF_6$ gave the desired compounds in respectable yields (Scheme 1).

Scheme 1. Synthetic scheme to generate clyclometalated (C^N) gold(III) complexes bearing dithiocarbamate ligands.

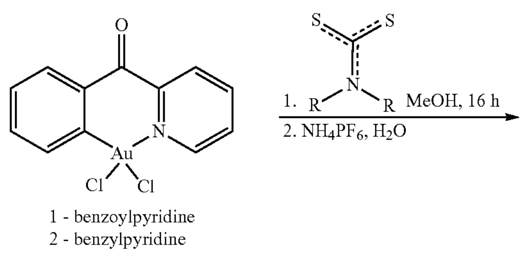

1 - benzoylpyridine
2 - benzylpyridine

-continued

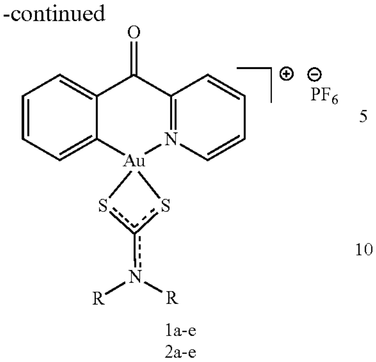

1a-e
2a-e

R groups

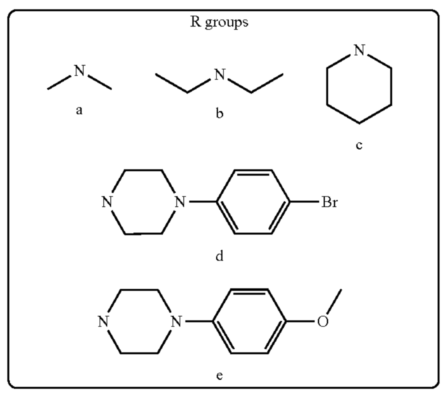

All reactions were carried under ambient conditions in air unless otherwise noted. Solvents were of ACS grade (Pharmco-Aaper) and used as is. The starting Au(III) cyclometalated complexes; [2-benzylpyridine]Au(III)$Cl_2$ and [2-benzoylpyridine]Au(III)$Cl_2$ were prepared according to a modified procedure as previously reported.[1] Sodium dimethyl dithiocarbamate and sodium diethyl dithiocarbamate salts were purchased from Alfa Aesar. 1-(4-bromophenyl) piperazine and 1-(4-Methoxyphenyl)piperazine were purchased from Sigma Aldrich. Ammomium hexafluorophosphate was purchased from Matrix Scientific. Carbon disulfide was purchased from Millipore Sigma and distilled prior to use. Sodium hydroxide pellets were purchased from VWR. Deuterated solvents were purchased from Cambridge Isotope Laboratories (Andover, Mass.). 3-(4,5-dimethylthiazol-2-yl)-2,5-diphenyltetrazolium bromide (MTT) and 2',7'-dichlorofluorescin diacetate (DCF-DA), and JC-1 were purchased from Cayman Chemicals. NMR spectra were recorded on a Bruker Avance NEO 400 MHz spectrometer and samples calibrated for: $^1$H NMR ($CD_3CN$ δ=1.94 ppm and DMSO-$d_6$ δ=2.50 ppm), $^{13}$C NMR ($CD_3CN$ δ=118.26 and 1.32 ppm and DMSO-$d_6$ δ=49.00 ppm), and $^{19}$F NMR externally referenced to $CFCl_3$ δ=0.00). Electrospray ionization mass spectrometry (ESI-MS) was performed on an Agilent Technologies 1100 series liquid chromatography/MS instrument. High-resolution mass spectra (HRMS) were obtained by direct flow injection (injection volume=2 μL) using ElectroSpray Ionization (ESI) on a Waters Qtof API US instrument in the positive mode (CIC, Boston University). Typical conditions are as follows: capillary=3000 kV, cone=35 or 15, source temperature=120° C., and a desolvation temperature=350° C. In addition to spectroscopic characterization, the purity of all compounds was assessed by RP-HPLC using an Agilent Technologies 1100 series HPLC instrument and an Agilent Phase Eclipse Plus C18 column (4.6 mm×100 mm; 3.5 μm particle size). All compounds were found to be 97% pure.

Example 2. Sodium Piperazine Dithiocarbamate

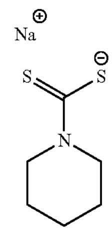

Prepared from a modified procedure in the literature.[2-3] A round bottom was charged with a piperazine (850 mg, 10 mmol) and dissolved in 80 mL of ethanol. Sodium hydroxide pellets (400 mg, 10 mmol) were crushed and added portion wise. The mixture was sonicated (15 minutes) until all the NaOH was dissolved. The reaction was cooled to 0° C. using an ice-bath. Carbon disulfide (1.53 g, 20 mmol) was placed in an addition funnel and added dropwise over 10 minutes. The reaction was allowed to warm to room temperature naturally and stirred for 12 h. All solvent was removed in vacuo at 50° C. to leave a yellow/white solid. The solid was dissolved in 20 mL of acetone and 250 mL of ether was added to precipitate a white solid, which was vacuum filtered, washed with excess ether, and dried to afford the sodium dithiocarbamate salt. Yield 1.62 g, 88%. $^1$H NMR (400 MHz, DMSO-$d_6$) δ=4.27 (t, J=8 Hz, 4H), 1.52-1.58 (m, 2H), 1.38-1.44 (m, 4H); $^{13}$C NMR (101 MHz, DMSO-$d_6$) δ=213.09, 50.71, 26.22, 24.86.

Example 3. Sodium 1-(4-bromophenyl)piperazine dithiocarbamate

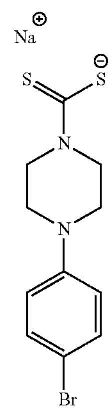 [SMILES: [Na+] ; S=C([S-])N1CCN(c2ccc(Br)cc2)CC1]

1-(4-bromophenyl)piperazine (241 mg, 1 mmol) and crushed NaOH pellets (40 mg, 1 mmol) were added in 25 mL of methanol and sonicated for 15 minutes to dissolve the NaOH pellets. The reaction was cooled to 0° C. Carbon disulfide (77 mg, 1 mmol) was placed in an addition funnel and added dropwise over 5 minutes. The reaction was allowed to warm up to room temperature naturally and stirred for 2 h. The solvent was removed in vacuo at 70° C. to leave a white solid. The solid was dissolved in acetone (5 mL) and ether (75 mL) was added to precipitate a white solid, which was vacuum filtered, washed with ether, and dried. Yield 200 mg, 59%. $^1$H NMR (400 MHz, DMSO-$d_6$) δ=7.35 (d, J=4 Hz, 2H), 6.88 (d, J=4 Hz, 2H), 4.45 (t, J=8 Hz, 4H), 3.11 (t, J=8, 4H); $^{13}$C NMR (101 MHz, DMSO-$d_6$) δ=214.73, 150.50, 131.86, 117.56, 48.88, 48.23.

Example 4. Sodium 1-(4-methoxyphenyl)piperazine dithiocarbamate

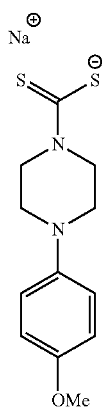 [SMILES: [Na+] ; COc1ccc(N2CCN(C(=S)[S-])CC2)cc1]

Prepared analogously to sodium 1-(4-bromophenyl)piperazine dithiocarbamate. 1-(4-methoxyphenyl)piperazine (192 mg, 1 mmol), NaOH (40 mg, 1 mmol), CS2 (77 mg, 1 mmol). Yield 215 mg, 74%. $^1$H NMR (400 MHz, DMSO-d6) δ=6.82 (d, J=4 Hz, 2H), 6.61 (d, J=4 Hz, 2H), 4.45 (t, J=8 Hz, 4H), 3.68 (s, 3H), 2.86 (t, J=8 Hz, 4H); $^{13}$C NMR (101 MHz, DMSO-$d_6$) δ=214.49, 153.45, 145.85, 118.03, 114.77, 55.69, 51.31, 50.30, 49.40, 46.12.

Example 5. General Procedure for the Preparation of Au(III) [CˆN] Dithiocarbamate Complexes 1a-e and 2a-e Complexes were prepared following a slightly modified procedure from the literature.[4] For complexes 1a-1e, the corresponding Au(III) starting material (2-benzoylpyridine) Au(III)$Cl_2$ (50 mg, 0.11 mmol) was suspended in 20 mL of MeOH in a 250 mL Erlenmeyer flask and stirred at room temperature. A separate solution of the corresponding sodium dithiocarbamate salt (0.13 mmol) was dissolved in 10 mL of MeOH and added dropwise (500 μL/minute). The mixture gradually turned yellow upon addition of the dithiocarbamate solution. The reaction was stirred at room temperature for 10-12 h. A saturated solution of $NH_4PF_6$ in DI $H_2O$ was made and added to the MeOH mixture. Excess DI $H_2O$ was added until a precipitate was observed. The solution was filtered and the solid washed with DI $H_2O$ (10 mL), excess $Et_2O$ and vacuum dried for 30 minutes to afford the Au(III) complexes 1a-1e. Complexes 2a-e were prepared analogously to 1a-1e but with the Au(III) starting material (2-benzylpyridine)Au(III)$Cl_2$ (50 mg, 0.11 mmol).

Example 6. 1a

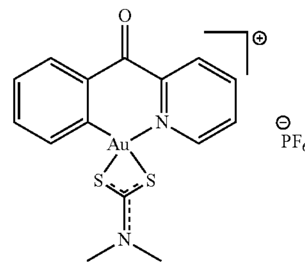

Prepared as described in the general procedure. [(2-benzoylpyridine)Au(III)$Cl_2$] (50 mg, 0.11 mmol) and NaDMDTC (19 mg, 0.13 mmol). Yield 61 mg, 86%. $^1$H NMR (400 MHz, MeCN-$d_3$) δ=9.01 (d, J=4 Hz, 1H), 8.51 (d, J=4 Hz, 2H), 7.97 (quint., J=8 Hz, 2H), 7.58 (sext., J=12 Hz, 3H), 3.44 (d, J=8 Hz, 6H); $^{13}$C NMR (101 MHz, MeCN-$d_3$) δ=194.11, 190.33, 152.69, 147.60, 145.03, 142.14, 136.13, 131.75, 131.58, 131.36, 130.09, 129.09, 42.18, 41.07; 19F NMR (376 MHz, MeCN-$d_3$) δ=−131.02, −135.41, −139.81, −144.20, −148.59, −157.37. HRMS (m/z) calcd. 499.0213, found 499.0212 [M-$PF_6$]+, Purity was demonstrated to be >97% by RP-HPLC: $R_f$=6.20 minutes using the following method: Flow rate: 1 mL/min; X=260 nm; Eluent A=$H_2O$ with 0.1% TFA; Eluent B=MeOH with 0.1% TFA; Solvent Gradient: 0-3 min (50:50 $H_2O$:MeOH), 5 min (40:60 $H_2O$:MeOH), 7 min (30:70 $H_2O$:MeOH), 9 min (0:100 $H_2O$:MeOH), 10 min (20:80 $H_2O$:MeOH) 12 min until end of run (100:0 $H_2O$:MeOH).

Example 7. 1b

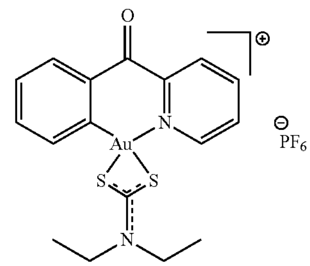

Prepared as described in the general procedure. [(2-benzoylpyridine)Au(III)$Cl_2$] (50 mg, 0.11 mmol) and NaDEDTC (22 mg, 0.13 mmol). Yield 62 mg, 84%. $^1$H NMR (400 MHz, MeCN-ds) (=9.03 (d, J=4 Hz, 1H), 8.54 (d, J=4 Hz, 2H), 8.02 (quint., J=8 Hz, 2H), 7.60 (sext., J=12 Hz, 3H), 3.88 (dq, J=20, 8 Hz, 4H), 1.39 (dt, J=24, 8 Hz, 6H); $^{13}$C NMR (101 MHz, MeCN-$d_3$) δ=193.47, 190.30, 152.60, 147.61, 145.02, 142.32, 136.12, 131.75, 131.56, 131.35, 130.09, 129.09, 49.02, 47.67, 47.47, 12.31, 12.07, 12.02; 19F NMR (376 MHz, MeCN-$d_3$) δ=−131.02, −135.41, −139.81, −144.20, −148.59, −157.37. HRMS (m/z) calcd. 527.0526, found 527.0516 [M-$PF_6$]$^+$, Purity was demonstrated to be >97% by RP-HPLC: $R_f$=7.00 minutes using the following method: Flow rate: 1 mL/min; λ=260 nm; Eluent A=$H_2O$ with 0.1% TFA; Eluent B=MeOH with 0.1% TFA; Solvent Gradient: 0-3 min (50:50 $H_2O$:MeOH), 5 min (40:60 $H_2O$:MeOH), 7 min (30:70 $H_2O$:MeOH), 9 min (0:100 $H_2O$:MeOH), 10 min (20:80 $H_2O$:MeOH), 12 min until end of run (100:0 $H_2O$:MeOH).

Example 8. 1c

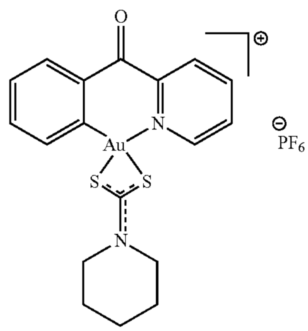

Prepared as described in the general procedure. [(2-benzoylpyridine)Au(III)$Cl_2$] (50 mg, 0.11 mmol) and NaPipDTC (24 mg, 0.13 mmol). Yield 55 mg, 73%. $^1$H NMR (400 MHz, MeCN-$d_3$) δ=8.99 (d, J=4, 1 Hz H), 8.51 (d, J=4 Hz, 2H), 7.98 (quint., J=8 Hz, 2H), 7.58 (sext., J=12 Hz, 3H), 3.90 (dt, J=16, 4 Hz, 4H), 1.74-1.82 (m, 6H); $^{13}$C NMR (101 MHz, MeCN-$d_3$) δ=191.37, 190.34, 152.64, 147.60, 145.01, 142.37, 136.12, 131.76, 131.64, 131.37, 130.07, 129.09, 52.99, 51.16, 25.97, 24.02; 19F NMR (376 MHz, MeCN-$d_3$) δ=−130.85, −135.24, −139.63, −144.02, −148.41, −157.20. HRMS (m/z) calcd. 539.0526, found 539.0527 [M-$PF_6$]+, Purity was demonstrated to be >97% by RP-HPLC: $R_f$=7.12 minutes using the following method: Flow rate: 1 mL/min; λ=260 nm; Eluent A=$H_2O$ with 0.1% TFA; Eluent B=MeOH with 0.1% TFA; Solvent Gradient: 0-3 min (50:50 $H_2O$:MeOH), 5 min (40:60 $H_2O$:MeOH), 7 min (30:70 $H_2O$:MeOH), 9 min (0:100 $H_2O$:MeOH), 10 min (20:80 $H_2O$:MeOH), 12 min until end of run (100:0 $H_2O$:MeOH).

Example 9. 1d

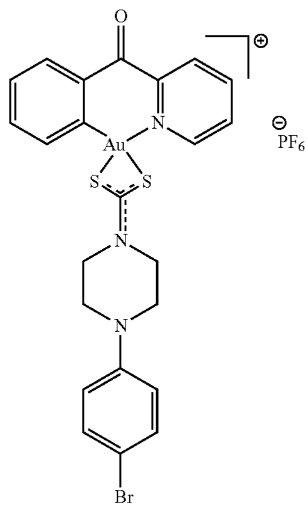

Prepared as described in the general procedure. 2-benzoylpyridine)Au(III)$Cl_2$] (50 mg, 0.11 mmol) and Na(4-bromophenylpiperazine)DTC (44 mg, 0.13 mmol). Yield 30 mg, 32%. $^1$H NMR (400 MHz, MeCN-$d_3$) δ=9.04 (d, J=4 Hz, 1H), 8.54 (d, J=4 Hz, 2H), 8.01 (quint., J=8 Hz, 2H), 7.63 (sext., J=12 Hz, 3H), 7.44 (d, J=8 Hz, 2H), 6.95 (d, J=8 Hz, 2H), 4.12 (t, J=8 Hz, 4H), 3.48 (t, J=12 Hz, 4H); $^{13}$C NMR (101 MHz, MeCN-$d_3$) δ=194.06, 152.66, 149.61, 144.92, 136.11, 132.58, 131.67, 131.64, 131.43, 130.05, 129.03, 112.64, 50.78, 49.14, 48.07; 19F NMR (376 MHz, MeCN-$d_3$) δ=−130.66, −135.05, −139.44, −143.84, −148.23, −152.62. HRMS (m/z) calcd. 693.9897, found 693.9899 [M-$PF_6$]$^+$, Purity was demonstrated to be >97% by RP-HPLC: $R_f$=9.26 minutes using the following method: Flow rate: 1 mL/min; λ=260 nm; Eluent A=$H_2O$ with 0.1% TFA; Eluent B=MeOH with 0.1% TFA; Solvent Gradient: 0-3 min (50:50 $H_2O$:MeOH), 5 min (40:60 $H_2O$:MeOH), 7 min (30:70 $H_2O$:MeOH), 9 min (0:100 $H_2O$:MeOH), 10 min (20:80 $H_2O$:MeOH), 12 min until end of run (100:0 $H_2O$:MeOH).

Example 10. 1e

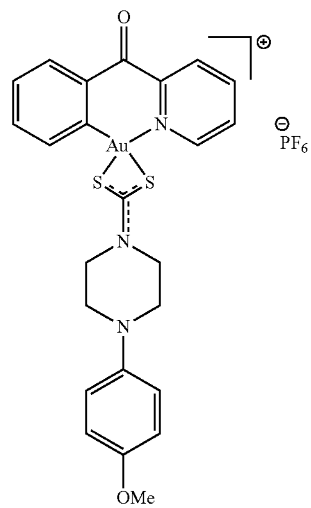

Prepared as described in the general procedure. [(2-benzoylpyridine)Au(III)$Cl_2$] (50 mg, 0.11 mmol) and Na(4-methoxyphenylpiperazine)DTC (39 mg, 0.13 mmol). Yield 42 mg, 48%. $^1$H NMR (400 MHz, MeCN-$d_3$) δ=8.87 (d, J=8 Hz, 1H), 8.31 (t, J=8 Hz, 2H), 7.82 (t, J=12 Hz, 1H), 7.61 (d, J=8 Hz, 1H), 7.50 (t, J=8 Hz, 1H), 7.43 (d, J=8 Hz, 4H), 7.26 (d, J=10 Hz, 1H), 6.97 (d, J=8 Hz, 2H), 6.88 (d, J=8 Hz, 2H), 4.01 (dt, J=20, 8 Hz, 4H), 3.74 (s, 3H), 3.28 (quint., J=8 Hz, 4H); $^{13}$C NMR (101 MHz, MeCN-$d_3$) δ=203.55, 155.21, 151.22, 144.80, 134.96, 132.54, 132.36, 128.49, 127.39, 119.54, 115.05, 55.64, 50.69, 50.08, 49.10; 19F NMR (376 MHz, MeCN-$d_3$) δ=−135.41, −139.80, −144.19, −148.58, −152.98, −157.36. HRMS (m/z) calcd. 646.0897, found 646.0896 [M-$PF_6$]+, Purity was demonstrated to be >97% by RP-HPLC: $R_f$=7.14 minutes using the following method: Flow rate: 1 mL/min; =260 nm; Eluent A=$H_2O$ with 0.1% TFA; Eluent B=MeOH with 0.1% TFA; Solvent Gradient: 0-3 min (50:50 $H_2O$:MeOH), 5 min (40:60 $H_2O$:MeOH), 7 min (30:70 $H_2O$:MeOH), 9 min (0:100 $H_2O$:MeOH), 10 min (20:80 $H_2O$:MeOH), 12 min until end of run (100:0 $H_2O$:MeOH).

Example 11. 2a

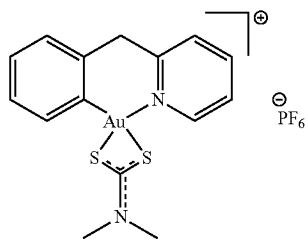

Prepared as described in the general procedure. [(2-benzylpyridine)Au(III)$Cl_2$] (50 mg, 0.11 mmol) and NaDMDTC (19 mg, 0.13 mmol). Yield 64 mg, 92%. $^1H$ NMR (400 MHz, MeCN-$d_3$) 0=8.86 (d, J=8 Hz, 1H), 8.22 (t, J=8 Hz, 1H), 7.95 (d, J=8 Hz, 1H), 7.62 (t, J=8 Hz, 1H), 7.42 (t, J=8 Hz, 1H), 7.32 (t, J=8 Hz, 1H), 7.19 (t, J=8 Hz, 1H), 4.43 (s, 2H), 3.45 (d, J=4 Hz, 6H); $^{13}C$ NMR (101 MHz, MeCN-$d_3$) 0=195.79, 157.04, 152.22, 146.36, 144.17, 13357, 131.11, 129.61, 129.52, 129.23, 127.73, 126.21, 47.31, 42.12, 40.89; 19F NMR (376 MHz, MeCN-$d_3$) δ=−130.53, −134.92, −139.31, −143.70, −148.10, −152.48. HRMS (m/z) calcd. 485.0421, found 485.0418 [M-$PF_6$]$^+$, Purity was demonstrated to be >97% by RP-HPLC: $R_f$=6.26 minutes using the following method: Flow rate: 1 mL/min; X=260 nm; Eluent A=$H_2O$ with 0.1% TFA; Eluent B=MeOH with 0.1% TFA; Solvent Gradient: 0-3 min (50:50 $H_2O$:MeOH), 5 min (40:60 $H_2O$:MeOH), 7 min (30:70 $H_2O$:MeOH), 9 min (0:100 $H_2O$:MeOH), 10 min (20:80 $H_2O$:MeOH), 12 min until end of run (100:0 $H_2O$:MeOH).

Example 12. 2b

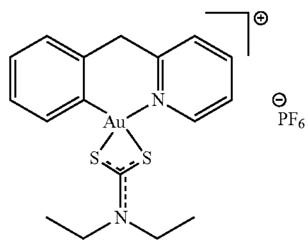

Prepared as described in the general procedure. [(2-benzylpyridine)Au(III)$Cl_2$] (50 mg, 0.11 mmol) and NaDEDTC (22 mg, 0.13 mmol). Yield 64 mg, 88%. $^1H$ NMR (400 MHz, MeCN-$d_3$) δ=8.85 (d, J=8 Hz, 1H), 8.21 (t, J=8 Hz, 1H), 7.91 (d, J=8 Hz, 1H), 7.60 (t, J=8 Hz, 1H), 7.40 (t, J=8 Hz, 1H), 7.31 (t, J=8 Hz, 1H), 7.16 (t, J=8 Hz, 1H), 4.45 (s, 2H), 3.65 (td, J=24, 16, 8 Hz, 4H), 1.32-1.48 (m, 6H); $^{13}C$ NMR (101 MHz, MeCN-$d_3$) δ=195.12, 157.03, 152.17, 146.48, 144.16, 133.56, 131.09, 129.60, 129.50, 129.22, 127.75, 126.23, 48.87, 47.37, 47.30, 12.32, 12.04; 19F NMR (376 MHz, MeCN-$d_3$) δ=−134.25, −138.64, −143.03, −147.42, −151.81, −160.60. HRMS (m/z) calcd. 513.0734, found 513.0740 [M-$PF_6$]-1, Purity was demonstrated to be >97% by RP-HPLC: $R_f$=7.34 minutes using the following method: Flow rate: 1 mL/min; X=260 nm; Eluent A=$H_2O$ with 0.1% TFA; Eluent B=MeOH with 0.1% TFA; Solvent Gradient: 0-3 min (50:50 $H_2O$:MeOH), 5 min (40:60 $H_2O$:MeOH), 7 min (30:70 $H_2O$:MeOH), 9 min (0:100 $H_2O$:MeOH), 10 min (20:80 $H_2O$:MeOH), 12 min until end of run (100:0 $H_2O$:MeOH).

Example 13. 2c

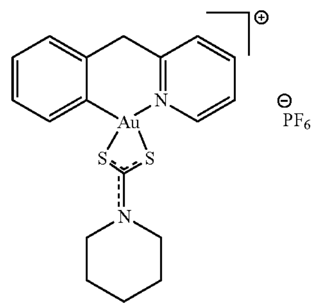

Prepared as described in the general procedure. [(2-benzylpyridine)Au(III)$Cl_2$] (50 mg, 0.11 mmol) and NaPipDTC (24 mg, 0.13 mmol). Yield 51 mg, 69%. $^1H$ NMR (400 MHz, MeCN-$d_3$) δ=8.83 (d, J=8 Hz, 1H), 8.23 (t, J=8 Hz, 1H), 7.96 (d, J=8 Hz, 1H), 7.62 (t, J=8 Hz, 1H), 7.42 (t, J=8 Hz, 1H), 7.32 (t, J=8 Hz, 1H), 7.20 (t, J=8 Hz, 1H), 4.44 (s, 2H), 3.94 (dt, J=12, 4 Hz, 4H), 1.81-1.85 (m, 6H); $^{13}C$ NMR (101 MHz, MeCN-$d_3$) δ=193.10, 157.05, 152.22, 146.55, 144.14, 133.59, 131.18, 129.60, 129.49, 129.22, 127.74, 126.22, 52.81, 50.80, 47.33, 26.01, 25.78, 24.03; 19F NMR (376 MHz, MeCN-$d_3$) δ=−128.20, −132.59, −136.98, −141.38, −145.77, −150.16. HRMS (m/z) calcd. 525.0734, found 525.0731 [M-$PF_6$]$^+$, Purity was demonstrated to be >97% by RP-HPLC: $R_f$=7.48 minutes using the following method: Flow rate: 1 mL/min; =260 nm; Eluent A=$H_2O$ with 0.1% TFA; Eluent B=MeOH with 0.1% TFA; Solvent Gradient: 0-3 min (50:50 $H_2O$:MeOH), 5 min (40:60 $H_2O$:MeOH), 7 min (30:70 $H_2O$:MeOH), 9 min (0:100 $H_2O$:MeOH), 10 min (20:80 $H_2O$:MeOH), 12 min until end of run (100:0 $H_2O$:MeOH).

Example 14. 2d

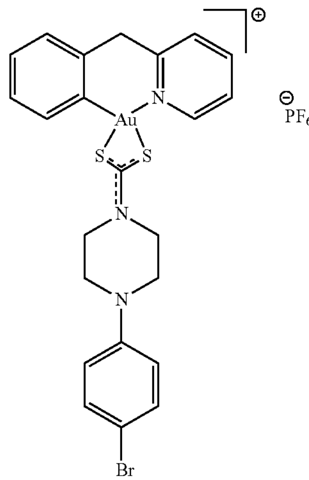

Prepared as described in the general procedure. [(2-benzylpyridine)Au(III)$Cl_2$] (50 mg, 0.11 mmol) and Na(4- bromophenylpiperazine)DTC (44 mg, 0.13 mmol). Yield 39 mg, 43%. $^1$H NMR (400 MHz, MeCN-$d_3$) δ=8.86 (d, J=8 Hz, 1H), 8.21 (t, J=8 Hz, 1H), 7.94 (d, J=8 Hz, 1H), 7.61 (t, J=8 Hz, 1H), 7.39-7.45 (m, 4H), 7.33 (t, J=8 Hz, 1H), 7.19 (t, J=8 Hz, 1H), 6.92 (q, J=12 Hz, 2H), 4.42 (s, 2H), 4.06-4.11 (m, 4H), 3.42-3.48 (m, 4H); $^{13}$C NMR (101 MHz, MeCN-$d_3$) δ=195.05, 156.34, 151.65, 149.05, 145.68, 143.57, 132.87, 131.97, 130.53, 129.04, 128.64, 127.14, 125.60, 118.20, 112.02, 50.07, 48.25, 47.54, 46.65; 19F NMR (376 MHz, MeCN-$d_3$) δ=−131.38, −135.77, −140.16, −144.55, −148.94, −157.73. HRMS (m/z) calcd. 680.0104, found 680.0104 $[M-PF_6]^+$, Purity was demonstrated to be >97% by RP-HPLC: $R_f$=9.40 minutes using the following method: Flow rate: 1 mL/min; X=260 nm; Eluent A=$H_2O$ with 0.1% TFA; Eluent B=MeOH with 0.1% TFA; Solvent Gradient: 0-3 min (50:50 $H_2O$:MeOH), 5 min (40:60 $H_2O$:MeOH), 7 min (30:70 $H_2O$:MeOH), 9 min (0:100 $H_2O$:MeOH), 10 min (20:80 $H_2O$:MeOH), 12 min until end of run (100:0 $H_2O$:MeOH).

Example 15. 2e

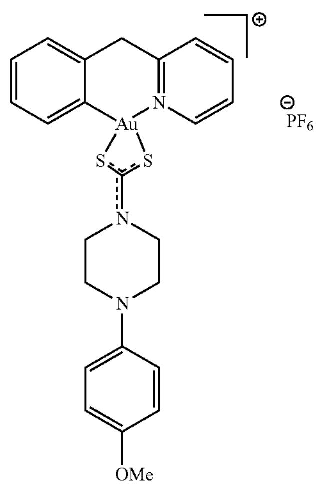

Prepared as described in the general procedure. [(2-benzylpyridine)Au(III)$Cl_2$] (57 mg, 0.11 mmol) and Na(4-bromophenylpiperazine)DTC (39 mg, 0.13 mmol). Yield 49 mg, 43%. $^1$H NMR (400 MHz, MeCN-$d_3$) δ=8.86 (d, J=4 Hz, 1H), 8.21 (t, J=8 Hz, 1H), 7.93 (d, J=8 Hz, 1H), 7.61 (t, J=8 Hz, 1H), 7.40 (t, J=8 Hz, 2H), 7.30 (t, J=8 Hz, 1H), 7.18 (t, J=8 Hz, 1H), 6.98 (d, J=12 Hz, 2H), 6.89 (d, J=8 Hz, 2H), 4.42 (s, 2H), 4.06-4.12 (m, 4H), 3.75 (s, 3H), 3.283.33 (m, 4H); $^{13}$C NMR (101 MHz, MeCN-$d_3$)=194.74, 156.43, 154.69, 151.74, 145.79, 144.26, 143.64, 132.98, 130.63, 129.12, 129.01, 128.72, 127.21, 125.67, 119.01, 114.53, 55.13, 50.70, 49.61, 48.83, 46.72; 19F NMR (376 MHz, MeCN-$d_3$) δ=−130.66, −135.05, −139.44, 143.84, −148.23, −152.62. HRMS (m/z) calcd. 632.1105, found 632.1100 $[M-PF_6]^+$, Purity was demonstrated to be >97% by RP-HPLC: $R_f$=8.48 minutes using the following method: Flow rate: 1 mL/min; λ=260 nm; Eluent A=H2O with 0.1% TFA; Eluent B=MeOH with 0.1% TFA; Solvent Gradient: 0-3 min (50:50 H2O:MeOH), 5 min (40:60 $H_2O$:MeOH), 7 min (30:70 $H_2O$:MeOH), 9 min (0:100 $H_2O$:MeOH), 10 min (20:80 $H_2O$:MeOH), 12 min until end of run (100:0 $H_2O$:MeOH).

Example 16. NMR and MS Characterization

The compounds (1a-e and 2a-e) where characterized by $^1$H-NMR, $^{13}$C-NMR, and $^{19}$F-NMR and high-resolution mass spectrometry (HRMS). The purity of the compounds was verified by HPLC (>95%). In the instant invention, the structural architecture of Au(III) dithiocarbamate complexes were expanded to include cyclic and aromatic side chains in addition to cyclometalation, which provide stabilization by strong σ-donation to the gold center.[55-56] It has been demonstrated that this stabilization strategy has positive implications on the solution chemistry, biological and electrochemical behavior of complexes.[57] Two different [C^N]Au(III)$Cl_2$ complexes with electronic variations were used in the synthesis with the aim of establishing structural diversity. Complexes 1a-e possess a carbonyl at the methine bridge of the benzylpyridine framework, whereas 2a-e does not. Studies from the instant observations show that the difference impart unique reactivity and kinetics towards nucleophiles. Alternate metal-based drugs to platinum, the first-line of chemotherapy for several cancer types are desperately needed to overcome the toxicity and resistance associated with platinum drugs.[58-62] Gold compounds including auranofin have been used in preclinical and clinical trials with great promise.[63-67] A more systematic design and the elucidation of the mechanism of action of gold compounds will expand the utility of well-defined gold anticancer drug candidates with reduced susceptibility to resistance and toxic side effects. A small library of gold(III) compounds supported by different cyclometalated and dithiocarbamate ligands to obtain cationic complexes complemented by hexafluorophosphate ions was developed. Structural diversity was achieved by using two different cyclometalated gold(III) starting materials and five dithiocarbamate ligands of distinct structural and electronic variety. Consequently, the library enabled exploration of the biological activity of novel gold(III) dithiocarbamates in the context of cancer as described in this report.

Example 17. X-Ray Crystallography

Single crystals of compounds 1c, 2a, 2b, 2c, and 2e (FIG. 1) were grown by slow diffusion of $Et_2O$ into a concentrated MeCN solution at room temperature.

All crystals were mounted using polyisobutene oil on the end of a glass fibre, which had been mounted to a copper pin using an electrical solder. It was placed directly in the cold gas stream of a liquid nitrogen cryostat[5-6] A Bruker D8 Venture diffractometer with graded multilayer focused MoKα X-rays (λ=0.71073 Å) was used to collect diffraction. Raw data were integrated, scaled, merged, and corrected for Lorentz-polarization effects using the APEX3 package.[7-9] Space group determination and structure solution and refinement were carried out with SHELXT and SHELXL respectively.[10-11] All non-hydrogen atoms were refined with anisotropic displacement parameters. Hydrogen atoms were placed at calculated positions and refined using a riding model with their isotropic displacement parameters (Uiso) set to either 1.2 Uiso or 1.5 Uiso of the atom to which they were attached. Ellipsoid plots were drawn using SHELXTL-XP.[12] The structures, deposited in the Cambridge Structural Database, were checked for missed symmetry, twinning, and overall quality with PLATON,[13] an R-tensor,[14] and finally validated using CheckCIF.[13]

Compounds 2a, 2b, 2c, and 2e crystallize out in the solid state with one molecule per asymmetric unit while compound 1c contains two cation/anions pair. Each cyclometalated ligand, 2-benzylpyridine and 2-benzoylpyridine have a slightly puckered twist. The bridging methine carbon allows for the formation of a 6-membered ring containing the Au atom, leading to a less strained cyclometalated system. Each molecule is distorted around the Au—C and Au—N bonds resulting in half occupancy among the two atoms. Analyzing the bonding motif of the [C^N] framework reveals a significant trans-effect on the binding dithiocarbamate ligand. The Au—S bond trans to the nitrogen of the [C^N] ligand is significantly shorter (on average 0.156 Å) than the Au—S bond trans to the carbon (Table 1). This results in a slightly distorted square planar geometry around the Au(III) center in comparison to other Au(III) bis-dithiocarbamate complexes bearing symmetrical dithiocarbamate ligands which contain four Au—S bonds equidistant to one another (~2.33 Å).[47, 68]

TABLE 1

Selected interatomic distances of complexes 1c, 2a, 2b, 2c, and 2e.

| | Compound | | | | |
|---|---|---|---|---|---|
| Bond (Å) | 1c | 2a | 2b | 2c | 2e |
| Au—C | 2.042 (19) | 2.043 (3) | 2.061 (5) | 2.042 (3) | 2.045 (19) |
| Au—N | 2.062 (18) | 2.071 (2) | 2.065 (5) | 2.065 (3) | 2.069 (17) |
| Au—$S_{(trans\ to\ N)}$ | 2.283 (8) | 2.280 (7) | 2.278 (16) | 2.276 (9) | 2.298 (5) |
| Au—$S_{(trans\ to\ C)}$ | 2.376 (9) | 2.404 (8) | 2.392 (14) | 2.499 (8) | 2.379 (5) |

solutions were then diluted to 50 μM×4 mL with the respective biological medium. The amount of DMSO in each solution was 5%, therefore the instrument was blanked with either a 5% DMSO/PBS solution or 5% DMSO/DMEM solution prior to each scan. Time periods of t=0 h (after preparation of sample), 1 h, 6 h, 12 h, and 24 h were recorded. Prior to each time point, the instrument was blanked with corresponding 5% DMSO solution. The absorbance profile was scanned from 650 nm to 240 nm for each scan. For each complex, the data were normalized to the highest absorbance at t=0 h and plotted in GraphPad Prism 6. Each respective graph can be seen in the appended graphs.

Complexes 1a and 2a in both PBS and DMEM displayed the highest stability over 24 h (FIG. 3). After 24 h, no significant decrease in absorbance was observed for compounds 1a and 2a. The cyclic dithiocarbamate ligands used, especially complexes bearing the phenyl-substituted piperazine moiety demonstrated reduced stability in comparison to the alkyl substituted dithiocarbamates over 24 h. Although no deposition of elemental gold was observed, UV-vis analysis showed a significant decrease in absorption. The reduced stability of these complexes was attributed to the longer Au—S bond distances (2.298 Å (5)) trans to the aromatic nitrogen of the cyclometalated ligand, indicative of a weaker bond. This in addition to the other electronic factors promote facile reactivity with nucleophiles, hence the instability. Also, X-ray crystallography reveals the (4-methoxyphenyl)piperazine dithiocarbamate as an elongated moiety with a puckered square planar geometry. Elongation of the ligand likely weakens the Au—S bonds, which reduces stability to nucleophiles in the medium used. Overall, alkyl substituted gold dithiocarbamates, 1a and 2a show stability in biologically relevant media over extended periods of time and are promising candidates for further studies.

Example 18. UV-Vis Spectrometry of Complexes

Figure 2:
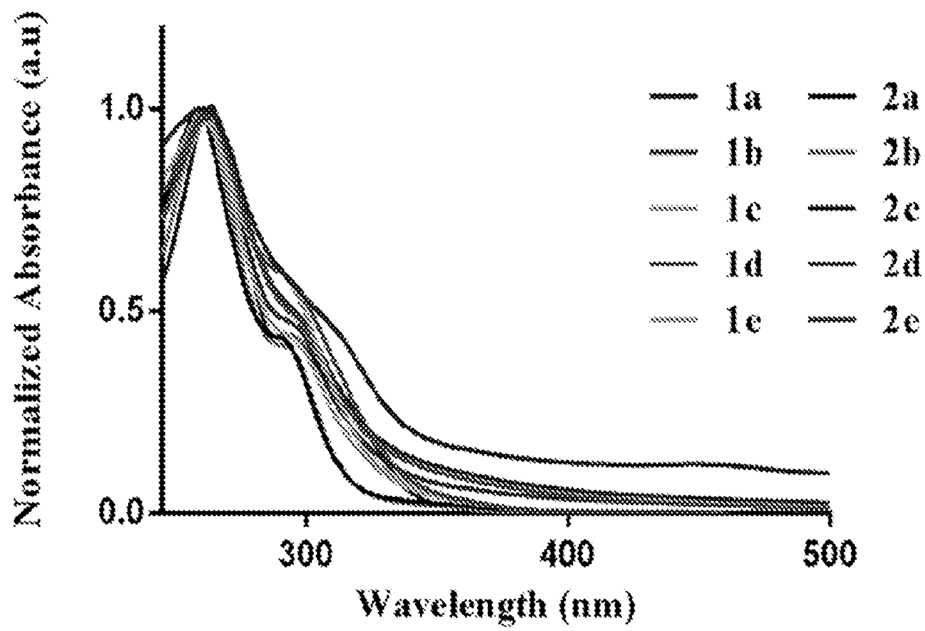
FIG. 2 includes UV-vis spectra of 1a-e (50 μM) and 2a-e (50 μM) in DMSO.
Figure 3A:
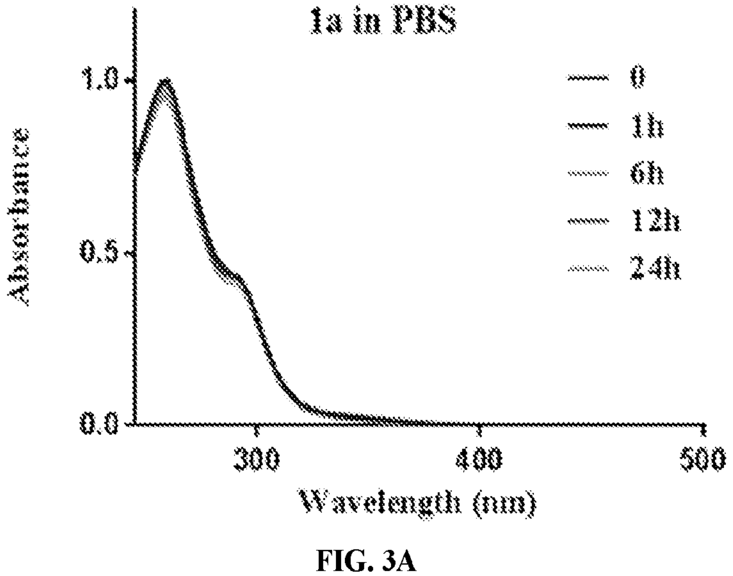
FIGS. 3A-3D illustrate the stability of 1a (50 μM) in PBS over 24 h (FIG. 3A), the stability of 1a (50 NM) in DMEM over 24 h (FIG. 3B), the stability of 2a (50 μM) in PBS over 24 h (FIG. 3C), and the stability of 2a (50 μM) in DMEM over 24 h (FIG. 3D).
Figure 3B:
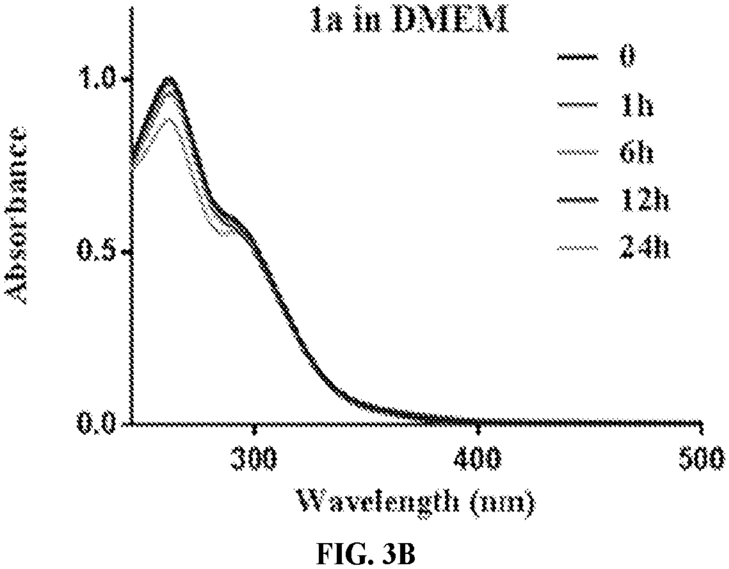
Figure 3C:
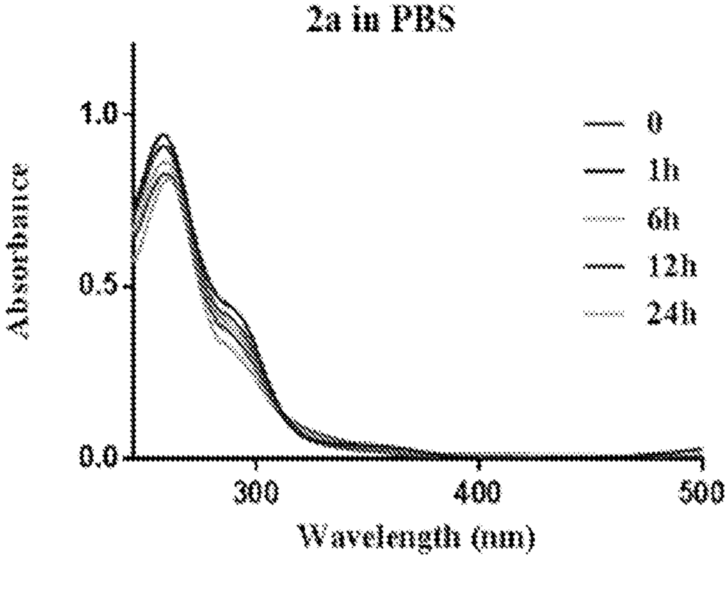
Figure 3D:
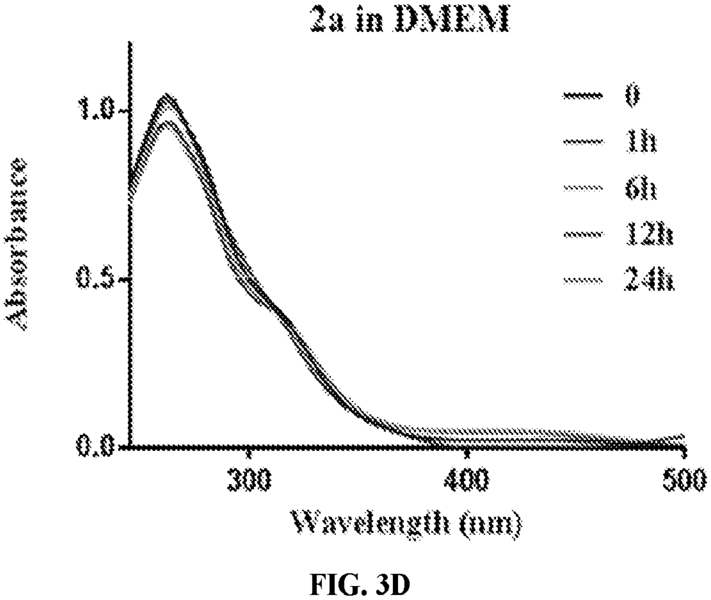
Figure 4A:
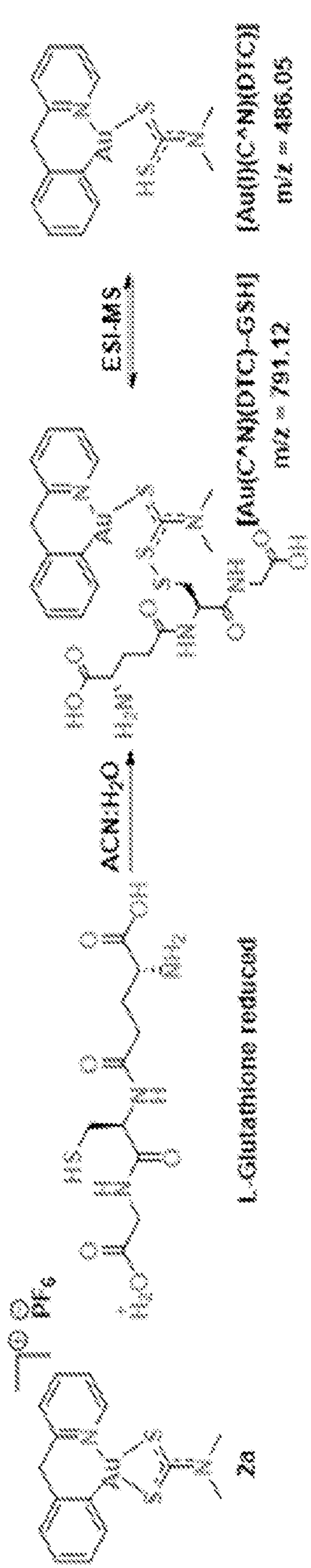
FIGS. 4A-4C illustrate elucidation of the Au(III)-thiol adduct.
Figure 4B:
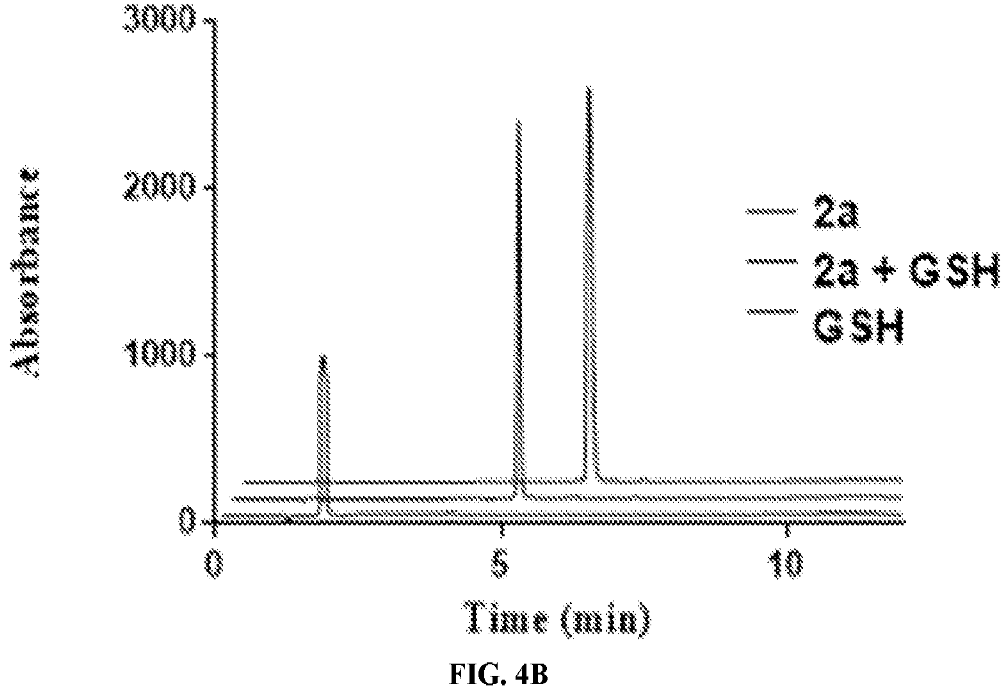
Figure 4C:
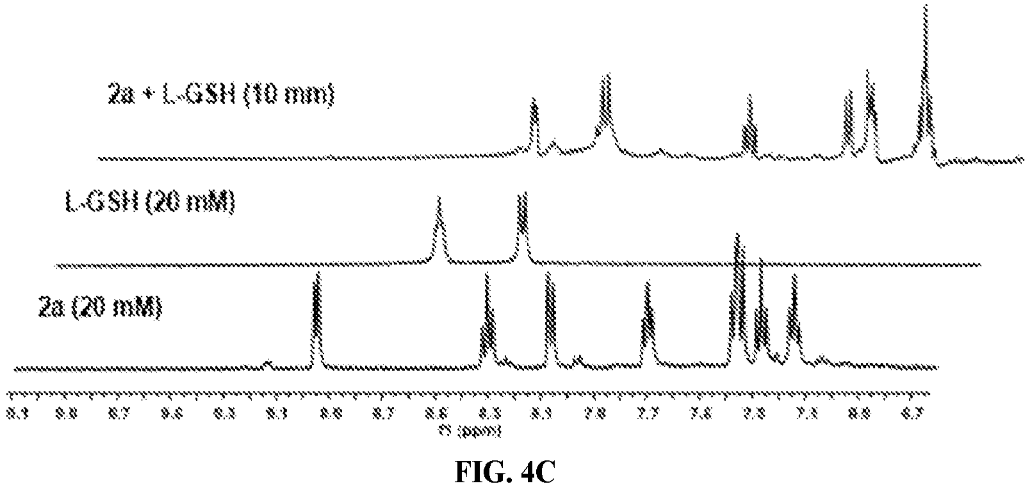
Figure 4D:
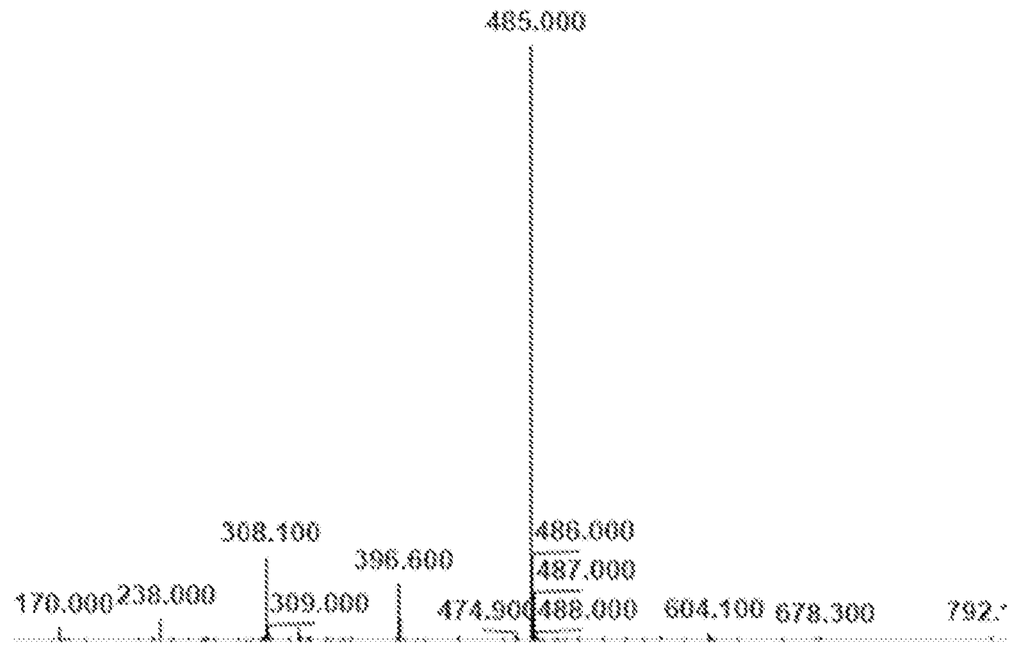
FIG. 4D includes LC-MS of the 2a+GSH adduct ((λ=280 nm), and FIG. 4E includes cyclic voltammograms of 2a (I=Au(I) to Au(0) reduction,[70] II=disproportionation of a one electron reduction from Au(III)/Au(II) and Au(II)/Au (I),[73-74] III=Au(III) to Au(I) reduction,[46,73-74] IV=Oxidation of the dithiocarbamate ligand) and 2a+GSH (I=Au(I) to Au(0), II=Oxidation of the dithiocarbamate ligand, III=Oxidation of GSH).
Figure 4E:
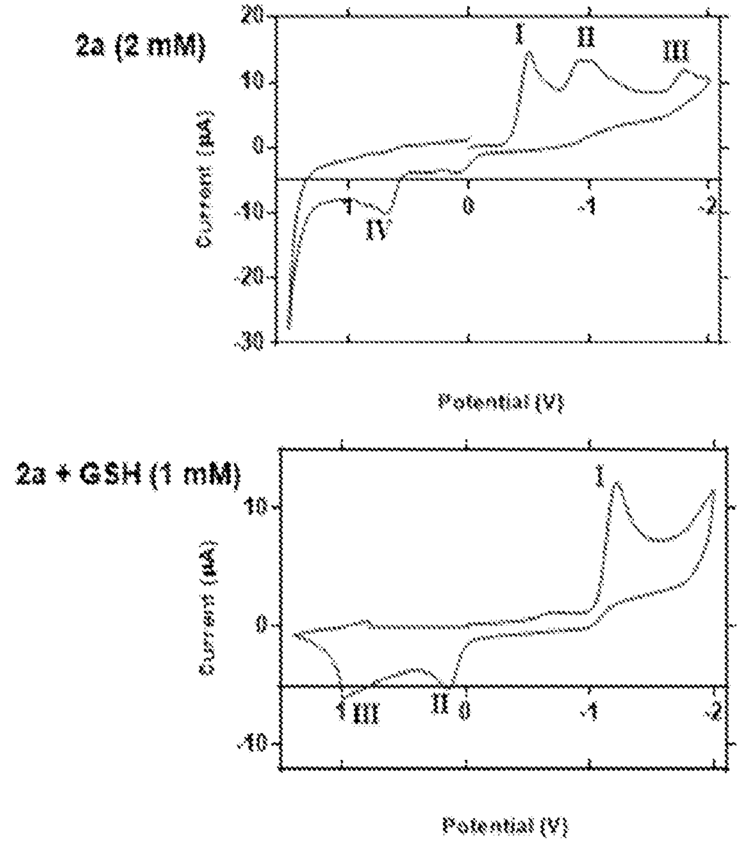

The photophysical properties of all ten complexes were evaluated by scanning their absorption profile in DMSO (FIG. 2). Spectra were recorded on a Shimadzu UV-1280 model instrument. All complexes were prepared as a 1 mM stock in DMSO. A stock solution of each complex was prepared and diluted to a final concentration of 50 μM×4 mL with DMSO. Prior to spectra acquisition the instrument was blanked with DMSO.

The UV-vis profile was then obtained by scanning from 600 to 200 nm. The spectra were normalized to maximum absorbance and plotted in GraphPad Prism 6.

Each complex displayed similar absorption profiles with a high-energy transition at 260 nm and a corresponding lower energy transition at 295-305 nm. The high-energy transition at 260 nm can be attributed to intraligand transitions of the 2-benzylpyridine or 2-benzoylpyridine fragments in the [C^N] ligands. The low-energy transition is attributed to ligand-to-metal-charge transfer from the donor dithiocarbamate ligand to the electrophilic Au(III) metal center.[39] The different dithiocarbamate ligands utilized had minimal effect on the measured absorbance.

Example 19. UV-Vis Stability in DMEM and PBS

The stability of the complexes were evaluated in two relevant biological media, PBS (phosphate-buffered saline) and DMEM (Dulbecco's modified eagle medium). DMEM, which contains several biological nucleophiles such as amino acids, are common sources of reductants.

All spectra were recorded on a Shimadzu UV-1280 model instrument. DMEM was used as purchased from Corning® (4.5 g/L glucose, L-glutamine and sodium pyruvate). PBS was used as received from Corning® (without calcium or magnesium). Each medium was warmed to room temperature prior to dilution of the complexes. All complexes were freshly prepared prior to use as a 1 mM stock in DMSO. The

Example 20. Reactivity with GSH(UV-Vis Spectrometry)

Stock solutions of the complexes were prepared by dissolving enough compound to achieve 1 mM×1 mL in DMSO. The stock solutions were diluted down to 50 μM by taking 50 μl of the stock and diluting to 1 mL with PBS. A separate stock solution of GSH was prepared as a 1 mM stock×5 mL. This stock solution was then diluted to 50 μM in PBS. All spectra were recorded on a Shimadzu UV-1280 model instrument. A blank was prepared by mixing 50 μL of DMSO and 1.95 mL of PBS. Time intervals of 5 minutes and 12 h were recorded. Prior to each recording the instrument was blanked. The equimolar solutions of the complex (50 μM) and GSH (50 μM) were mixed in a 1:1 ratio to achieve a final concentration of 25 μM the UV-vis spectra recorded at the indicated time intervals. For each reaction, the spectrum was normalized to the highest absorbance and plotted in GraphPad Prism 6. Each respective graph can be seen in the appended graphs.

Example 21. Reactivity with NAC(UV-Vis Spectrometry)

The experimental procedure was performed identically to that of the reaction involving GSH noted above. For each reaction, the spectrum was normalized to the highest absorbance and plotted in GraphPad Prism 6. Each respective graph can be seen in the appended graphs.

Example 22. Reactivity with GSH (HPLC)

All solvents used were of HPLC grade. All spectra were recorded using an Agilent Technologies 1100 series HPLC instrument and an Agilent Phase Eclipse Plus C18 column (4.6 mm×100 mm; 3.5 μm particle size). Compound 2a was prepared as a 5 mM stock in MeCN. GSH was prepared as a 5 mM stock in $H_2O$. The stocks were diluted to a final concentration of 2.5 mM with the appropriate solvent and each respective HPLC spectrum recorded. For the reaction of 2a+GSH, 1 mL from each of the 5 mM stocks were mixed in a 1:1 ratio to achieve a 2 mL solution with a final concentration of 2.5 mM. The sample was then subjected to HPLC analysis. All spectra were recorded using the following method: Flow rate: 1 mL/min; λ=240 nm; Eluent A=$H_2O$ with 0.1% TFA; Eluent B=MeOH with 0.1% TFA; Solvent Gradient: 0-3 min (50:50 $H_2O$:MeOH), 5 min (40:60 $H_2O$:MeOH), 7 min (30:70 $H_2O$:MeOH), 9 min (0:100 $H_2O$:MeOH), 10 min (20:80 $H_2O$:MeOH), 12 min until end of run (100:0 $H_2O$:MeOH). Data were plotted using GraphPad Prism 6. Each respective graph can be seen in the main text (FIG. 4).

Example 23. Reactivity with GSH ($^1H$ NMR Spectroscopy)

Stock solutions comprised of a 1 mL, 20 mM solution of 2a or L-GSH in DMSO-$d_6$ was prepared. The solution of GSH was sonicated for 5 minutes to dissolve all of the reagent. 500 μL of each solution were mixed in a 1:1 ratio to produce a final concentration of 10 mM in DMSO-$d_6$. The solution was then analyzed by $^1H$ NMR spectroscopy. The solution was further analyzed at different time intervals, t=1 h, 6 h, 12 h, and 24 h. Spectra were plotted using Mestrenova. (FIG. 4).

Example 24. LC-MS Analysis of the 2a+GSH Adduct

After performing the reaction of 2a+GSH, a single new peak was observed. The same solution was then subjected to LC-MS analysis (2.5 mM) using an Agilent 1200 HPLC with a direct flow injection with a HPLC auto sampler without a column, λ=280 nm, (injection volume: 40 μL, flow rate: 0.2 mL/min). ESI positive mode was taken with a source temperature of 120° C., desolvation temperature of 300° C., Capillary Vat 3.5 kV while Cone was set at 35. Data was plotted and analyzed using Mestrenova.

Example 25. Cyclic Voltammetry

All electrochemical measurements were recorded with a scan rate of 0.1 V/s with a three-segment sweep and a sample interval of 0.001 V. The quiet time was set to 2 seconds and sensitivity and $1\times10^{-5}$ A/V. All solutions were freshly prepared prior to use. All spectra were recorded using a CH instruments 650E potentiostat. The electrodes used were all 3 mm: glassy carbon working electrode (CHI104), Ag/AgCl reference electrode (CHI111), and a platinum wire counter electrode (CHI115). Compound 2a (8.8 mg/7 mL), NaDMDTC (2 mg/7 mL), and (2-benzylpyridine)$AuCl_2$ (6.1 mg/7 mL) were prepared as a 2 mM solution in anhydrous DMSO using 0.1 M $NBu_4PF_6$ (271 mg/7 mL) as the electrolyte. The samples were purged with nitrogen for 15 minutes and recorded. GSH (4.3 mg/7 mL) was prepared as a 2 mM solution in deoxygenated DI $H_2O$ using 0.1 M anhydrous $NaClO_4$ (85 mg/7 mL) as the electrolyte. Due to poor solubility of GSH in DMSO, the reaction between 2a and GSH was performed in a mix of solvents. Compound 2a (8.8 mg/7 mL) was dissolved in anhydrous DMSO while GSH (4.3 mg/7 mL) was dissolved in deoxygenated DI $H_2O$. 3.5 mL of each solution were mixed in a 1:1 ration to achieve a final concentration of 1 mM×7 mL. To this was then added 0.1 M $NBu_4PF_6$ as the electrolyte (271 mg). All data were plotted in GraphPad Prism 6.

Example 26. Reactivity of Gold(III) Dithiocarbamates with Cysteine Thiols

After establishing the stability of complexes, 1a or 2a in biological buffer and DMEM solutions, the reactivity of 2a with cysteine thiols was investigated using L-glutathione (GSH) and L-N acetyl cysteine as a models (FIG. 4). Whereas gold dithiocarbamates are known to react with thiols,[45,49,51,69] detailed studies to unravel the potential mechanism of activity do not exist. HPLC trace of the reaction solution revealed one distinct band at a different retention time (Rt—5.00 minutes) from 2a (Rt—6.03 minutes) or GSH (Rt—1.72 minutes) (FIGS. 4B and 4C). Subjecting the reaction solution of 2a with GSH to LC-MS analysis (FIGS. 4D and 4E), which supported the formation of a new species with a mass peak at m/z 791, attributable to a gold(I) disulfide species, [Au(C^N)(DTC)-GSH] (FIGS. 4D and 4E), which is short-lived under ESI-MS conditions due to the labile disulfide bond formed between the thiol of L-GSH and the dithiocarbamate ligand of the gold complex (FIG. 4A). Thus, a more dominant mass peak at m/z 485, attributable to an intact gold complex with liberated L-GSH is observed. $^1H$ NMR spectroscopy revealed the farthest downfield-shifted peak (δ=9.03 ppm), which is the hydrogen located next to the nitrogen in the cyclometalated-ligand, was significantly shifted upfield in the adduct solution (FIGS. 4B and 4C). The loss of coordination from the nitrogen of the cyclometalated ligand to gold, a key signature of the proposed adduct contributes to the upfield shift. The formation of the gold(I) complex was confirmed by cyclic voltammetry (FIGS. 4D and 4E), displaying a reduction potential of −1.20 V that is consistent with a gold(I) species.[70-72] The effect of the 2a-GSH adduct was evaluated on breast cancer cells and similar toxicity was found ($IC_{50}$—0.53 μM), as reported in Table 2 below. The reactivity of [C^N] gold(III) dithiocarbamates with representative thiols and unraveled the potentially active cytotoxic agent of this class of compounds under reducing conditions.

TABLE 2

$IC_{50}$ values for 1a-e and 2a-e across a panel of cell lines. Cells were seeded at a density of 2,000 cells/well and treated for 72 h. $IC_{50}$ values are plotted as the mean ± s.e.m (n = 3).
$IC_{50}$ (μM), 72 h

| | MDA-MB-175 | MDA-MB-231 | A2780 | RPE-NEO |
|---|---|---|---|---|
| 1a | 0.926 ± 0.10 | 0.531 ± 0.103 | 0.521 ± 0.081 | 10.29 ± 2.61 |
| 1b | 1.26 ± 0.307 | 0.935 ± 0.16 | 0.924 ± 0.187 | 25.4 ± 1.98 |
| 1c | 1.85 ± 0.194 | 0.951 ± 0.135 | 1.19 ± 0.126 | 12.11 ± 1.59 |
| 1d | 0.842 ± 0.671 | 1.14 ± 0.08 | 0.816 ± 0.123 | 15.13 ± 2.19 |
| 1e | 1.12 ± 0.431 | 1.36 ± 0.04 | 1.13 ± 0.065 | 14.8 ± 2.15 |
| 2a | 0.618 ± 0.080 | 0.773 ± 0.117 | 0.741 ± 0.086 | 17.1 ± 1.86 |
| 2b | 0.831 ± 0.099 | 2.11 ± 0.100 | 0.820 ± 0.073 | 15.1 ± 1.86 |
| 2c | 1.031 ± 0.091 | 1.04 ± 0.101 | 1.20 ± 0.33 | 21.1 ± 18.6 |
| 2d | 0.937 ± 0.399 | 0.849 ± 0.067 | 2.962 ± 0.71 | 14.5 ± 2.45 |
| 2e | 1.17 ± 0.487 | 1.31 ± 0.088 | 0.811 ± 0.892 | 19.2 ± 2.81 |

Example 27. Cell Culture

All cell lines were purchased from ATCC and routinely grown in a humidified incubator at 37° C. with 5-10% CO2. MDA-MB-231, MDA-MB-175, MRCS, RPE-NEO, H460, and K562 were grown in DMEM supplemented with 10% FBS, 1% amphotericin and 1% penicillin/streptomycin. A2780 cells were grown in RPMI supplemented with 10% FBS, 1% amphotericin, and 1% penicillin/streptomycin, and 4 mM glutamine. All supplements along with PBS and trypsin-EDTA were purchased from Corning Inc. and used as is.

Example 28. Cellular Uptake

Figure 5:
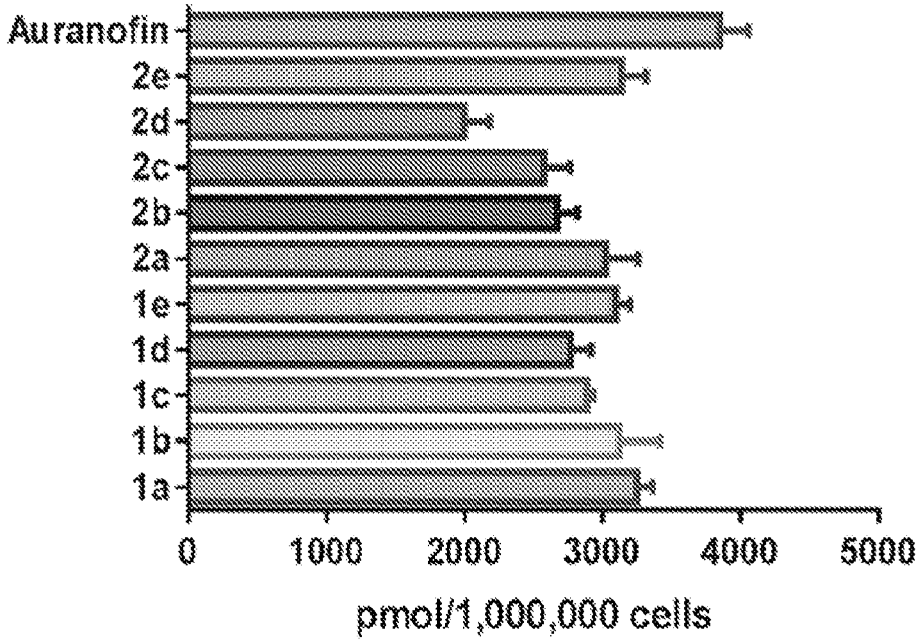
FIG. 5 illustrates intracellular uptake of 1a-e and 2a-e as well as Auranofin. Cells were seeded at a density of $1\times10^6$ and incubated overnight. Cells were incubated with gold drug or compounds for 24 h (5 μM). Data is plotted as the mean±s.e.m (n=3).

Cellular uptake studies were performed to determine what percentage of the compounds were getting into the cell after treatment. High cellular uptake generally corresponds to high efficacy of the drug candidate in hand, since most drug targets are intracellular. For this study, MDA-MB-231 were treated with all 10 compounds and Auranofin at 5 μM for 24 h (FIG. 5). Auranofin is the only gold-based therapeutic to be clinically approved, therefore Auranofin as a benchmark for comparison. 67 After treatment, the cells were washed with PBS, digested with 0.5 mL of conc. HCl and diluted with DI water and subjected to ICP-OES analysis. All ten compounds exhibited intracellular uptake above 2,000 pmol/million cells. In comparison to Auranofin, none of the complexes exhibited higher uptake, however; the complexes 1a and 2a had uptakes (3017 pmol/million cells) and (3267 pmol/million cells) respectively. Complexes 1c-e and 2c-e, which contain more hydrophobic R groups such as the piperadine and phenyl substituted piperazine handles, exhibited lower intracellular uptake than the complexes with the less hydrophobic shorter alkyl (methyl and ethyl) handles. Overall, these ten Au(III) complexes demonstrate relatively high intracellular uptake which can explain the high in vitro cytotoxicity as well as the rate at which cellular bioenergetics are affected Example 29. Anticancer Activity In Vitro All the gold(III) dithiocarbamate compounds display remarkable cell killing potential in a panel of breast, ovarian, lung and leukemia cancers. Preliminary studies focused on different cancer cell lines (MDA-MB-231, MDA-MB-175, and A2780) and a normal retinal epithelial cell line (RPE-NEO). These adherent cells were exposed to a serial-diluted concentration of all ten compounds for 72 h. The cells were subsequently treated with 3-(4,5-dimethylthiazol-2-yl)-2,5-diphenyltetrazolium bromide (MTT) solutions, dissolved with DMSO and the absorbance at 570 nm was measured with a plate-reader. An initial screen showed promising half-maximal inhibitory concentration ($IC_{50}$) values for all complexes across the three cancer cell lines (Table 2).

Figure 6A:
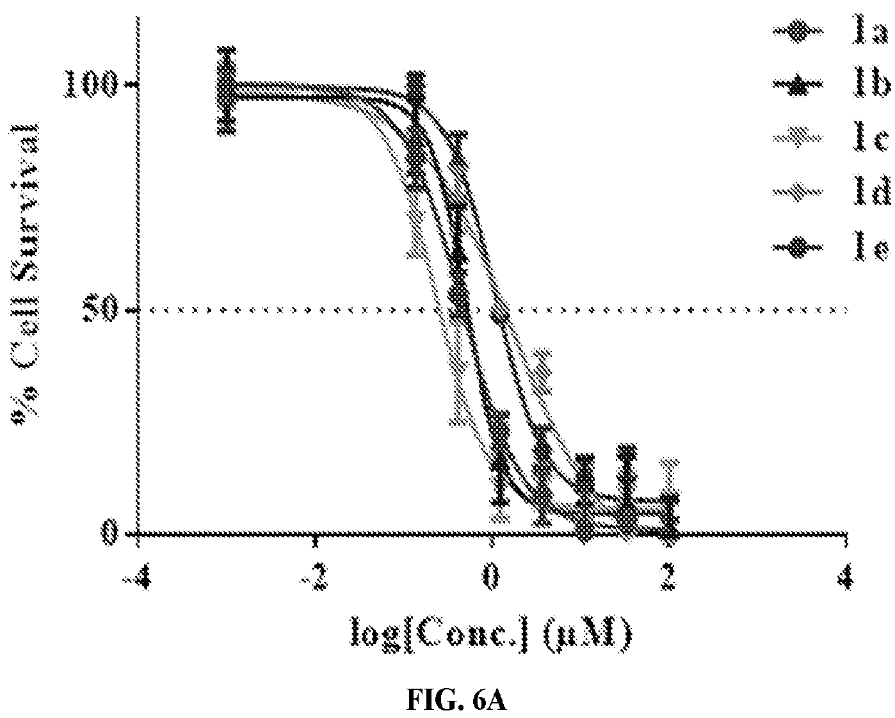
FIGS. 6A-6D illustrate in vitro activity of complexes 1a-e and 2a-e in multiple cancer cell lines.
Figure 6B:
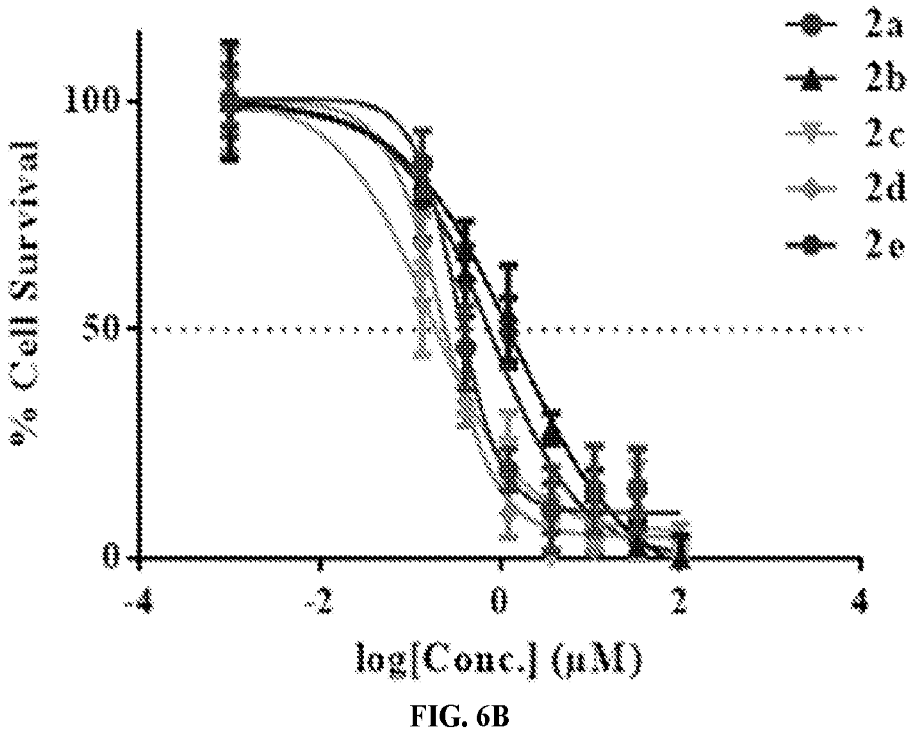

Specifically, the complexes exhibited high toxicity (0.5-1.5 μM) towards the TNBC cell line MDA-MB-231 (FIGS. 6A and 6B). The cytotoxicity of complexes 1a and 2a towards TNBC's is quite promising as these cell lines are typically cisplatin resistant.[75-76] Drug resistance is an ever-increasing problem in medicine so developing therapeutics for refractory tumours is of great importance.[77] To test the selectivity of compounds 1a and 2a for cancer cells over normal cells, these complexes were evaluated in the normal retinal epithelial cells using the MTT assay. There was ~30-fold selectivity for cancer cells over normal cells, indicative of compounds with potential for reduced side effects.

Figure 6C:
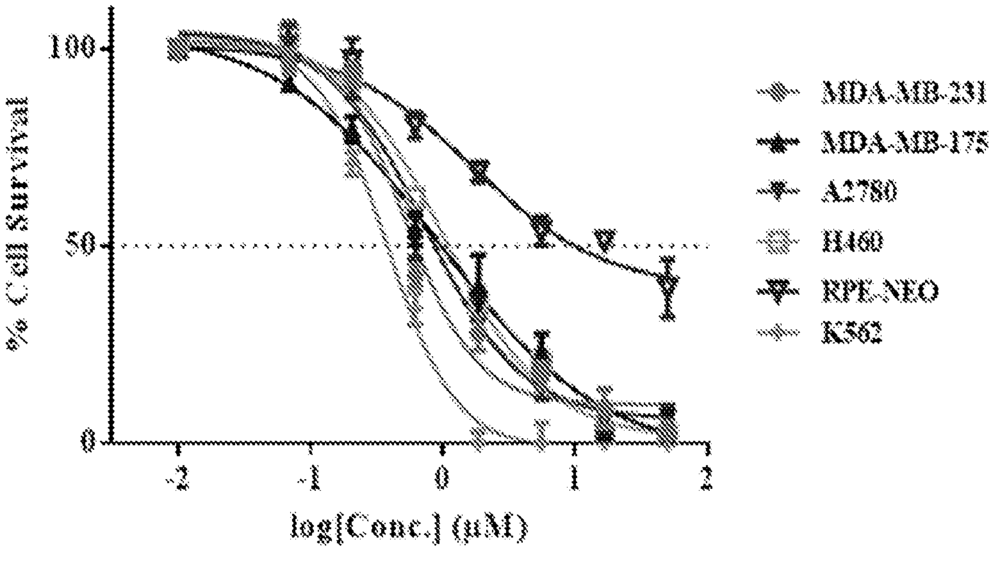
Figure 6D:
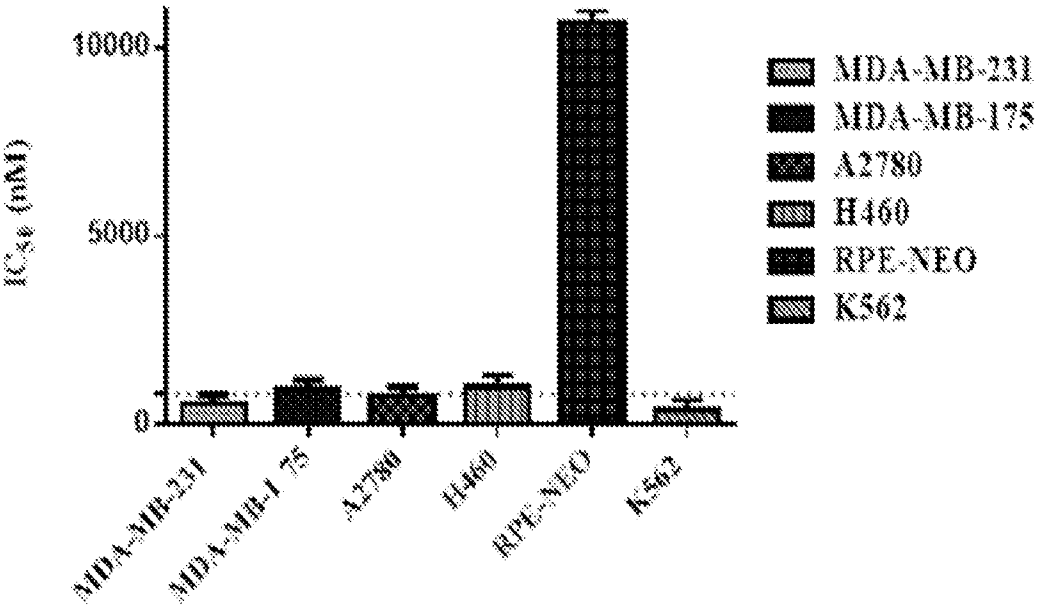

With the completion of preliminary cytotoxicity screening, the efficacy of compound 2a was evaluated in different cancer tissue type beyond breast cancer. Both H460 (human large cell lung carcinoma) and K562 (human chronic myelogenous leukemia) were utilized (FIGS. 6C and 6D). There was comparable cytotoxicity in these cell lines to those in the preliminary screen. with 2a displaying $IC_{50}$ values of 1.5 μM in H460 and 1.0 μM in K562. With a promising candidate in hand, further biological testing was pursued to gain mechanistic insight of this class of Au(III) dithiocarbamates.

Example 30. Differential Gene Expression and Biological Pathway Analysis

Figure 7A:
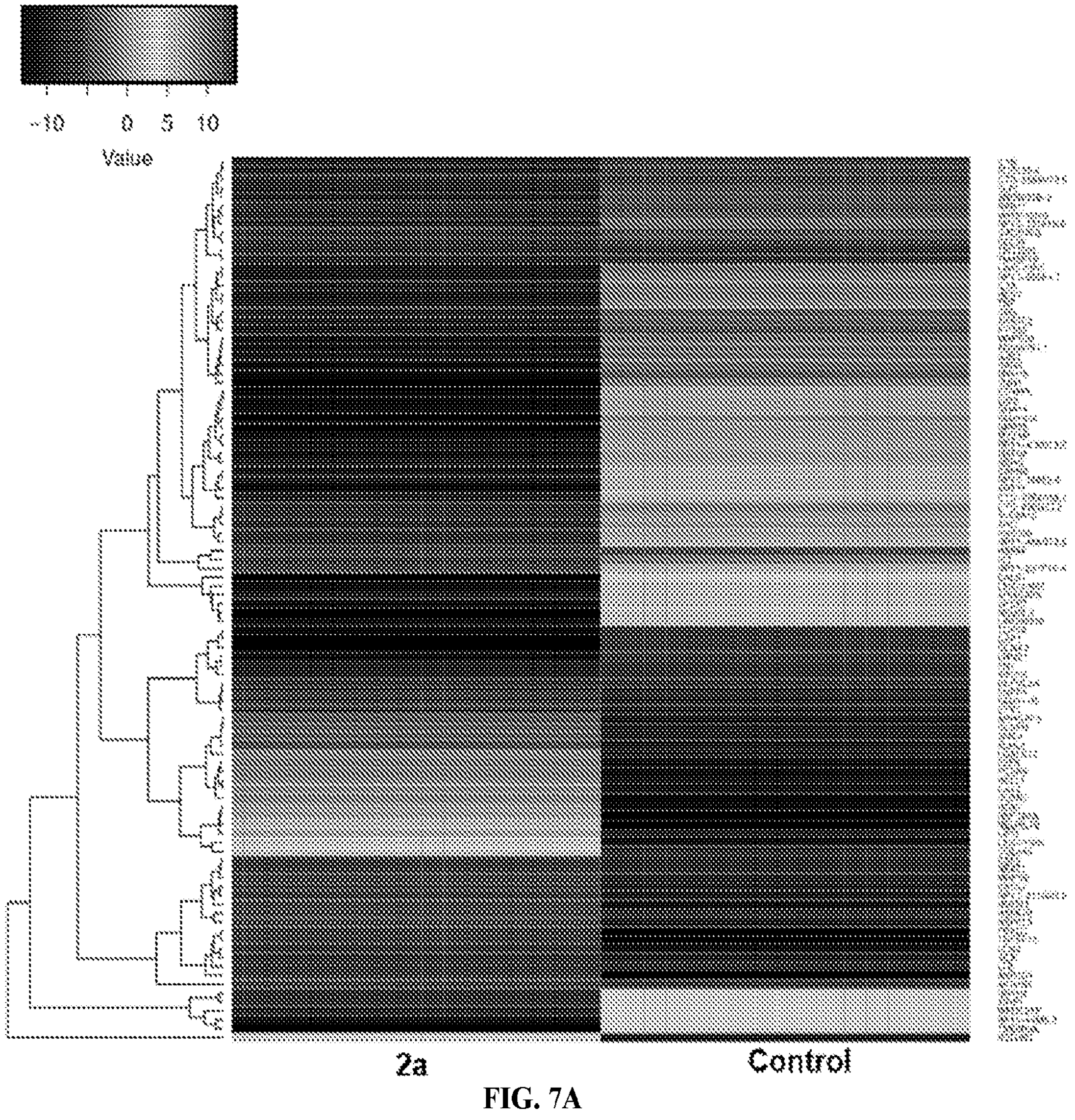
FIG. 7A includes a representative heat map of DEGs in response to 2a, and FIGS. 7B and 7C include GO and KEGG plots outlining varying pathways perturbed upon treatment with 2a. For GO; GeneRatio=n/2005 and =BgRatio n/17107. For KEGG; GeneRatio=n/727 and BgRatio=n/5824.
Figure 7B:
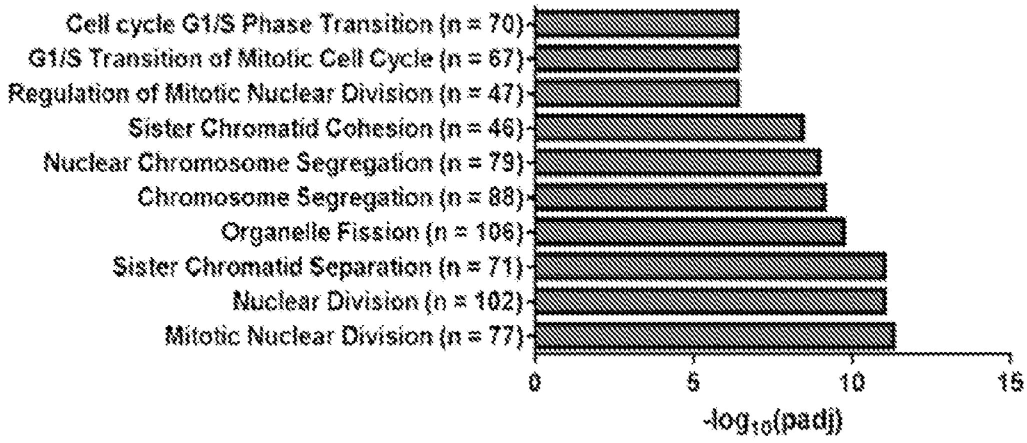
Figure 7C:
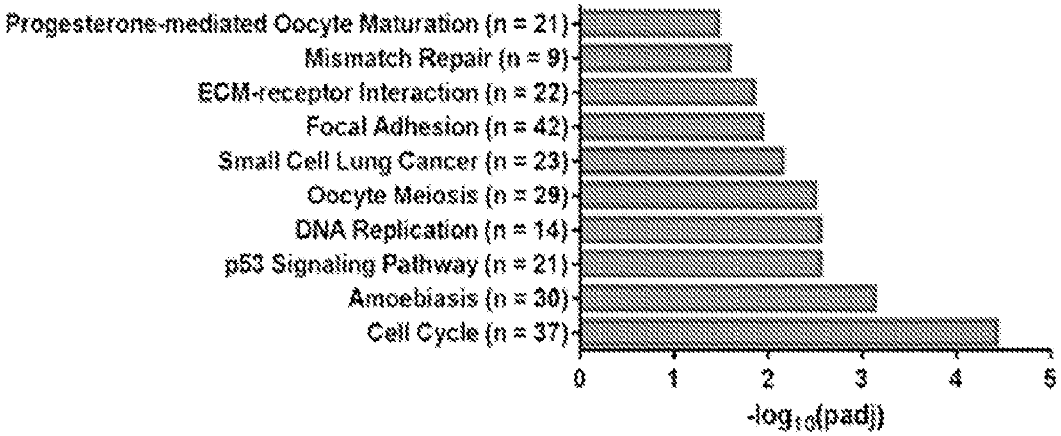

The whole-cell effect of compound 2a was evaluated by analyzing differentially expressed genes (DEG) from RNA-seq. MDA-MB-231 cells were treated with 1 μM of 2a for 12 h followed by the isolation of high-purity RNA for Illumina Hi-seq. There were 3019 DEG found with 1596 upregulated and 1423 downregulated genes in response to 2a (FIG. 7A). Subsequent use of gene ontology (GO)[78,79] (FIG. 7B) and Kyoto encyclopaedia of genes and genomes (KEGG)[80-82] (FIG. 7C) pathway analysis software led to potential processes perturbed by 2a. The pathway analysis software employed are an extensive library database capable of integrating chemical and biological pathway perturbation processes and is well suited for drug development studies. For the identified processes, the corresponding downstream canonical pathways were examined and corroborated activated or inhibited pathways with functional biology experiments (vide infra). Notable pathways identified include, mitotic nuclear division, organelle fission, cell-cycle, progesterone oocyte maturation, and focal adhesion processes. Interestingly, a significant number of these processes are regulated by the mitochondria. It is well established that a number of aggressive tumor types including TNBCs exhibit impaired mitochondria function, which present a vulnerability.[83-84] The ability of class of gold(III) dithiocarbamates to disrupt mitochondria function in MDA-MB-231 cells was tested by detailed mitochondrial investigations.

Example 31. Gold(III) Dithiocarbamate Disrupts TNBC Cell Metabolism

The RNA-seq showed transcriptional suppression of key genes involved in the catalytic conversion of long-chain fatty acids such as ACSL4. Further analysis of DEG revealed the modulation of several genes within the mitochondria respiratory chain or oxidative phosphorylation. Activated DEG included NDUFS7, [complex I], COX7A1 gene [complex IV], and ATP5O, ATP5I genes [complex V] whereas the inhibited DEG were MT-ND4L [complex I], SDHD gene [complex II], and ATP5C, ATP5F [complex V]. Moreover, an uncoupling protein related gene, UCP3 was found to be upregulated in response to 2a. These findings prompted functional biology experiments to further corroborate the effect of 2a or its mechanism of action in TNBC. The effects of 2a on mitochondrial membrane potential were examined, assayed by JC-1 dye.[85] Following an extended 2a treatment and JC-1 staining (FIG. 8), 2a exhibits strong depolarization of the MMP (J-monomers) in comparison to the DMSO treatment (J-aggregates) in MDA-MB-231 cells. Carbonyl cyanide m-chlorophenyl hydrazine (CCCP), an uncoupler, was used as a positive control to validate the experiment. The MMP is a key driving force in ATP synthesis and overall a key factor in maintaining redox homeostasis throughout the cell.[86] Uncoupling of the mitochondrial membrane results in acute cell death as the mitochondrial become dysfunctional in this aggregative state.

Example 32. Bioenergetics

Figure 9A:
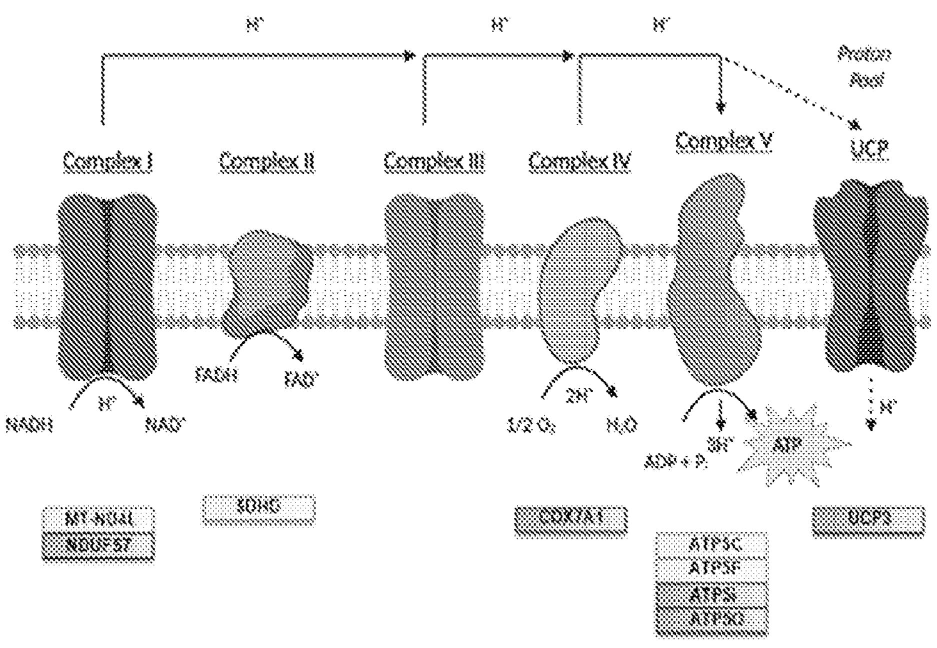
FIG. 9A includes a schematic illustration of the electron transport chain and corresponding DEGs for 2a, FIGS. 9B-9F include results of bioenergetic monitoring of MDA-MB-231 and MRCS cells following acute in vitro treatment with complex 2a. MDA-MD-231 were seeded at a density of $3\times10^4$ and MRCS at a density of $5\times10^4$ and analyzed with a Seahorse XF96 analyzer to assess the effect on key bioenergetic parameters.
Figure 9B:
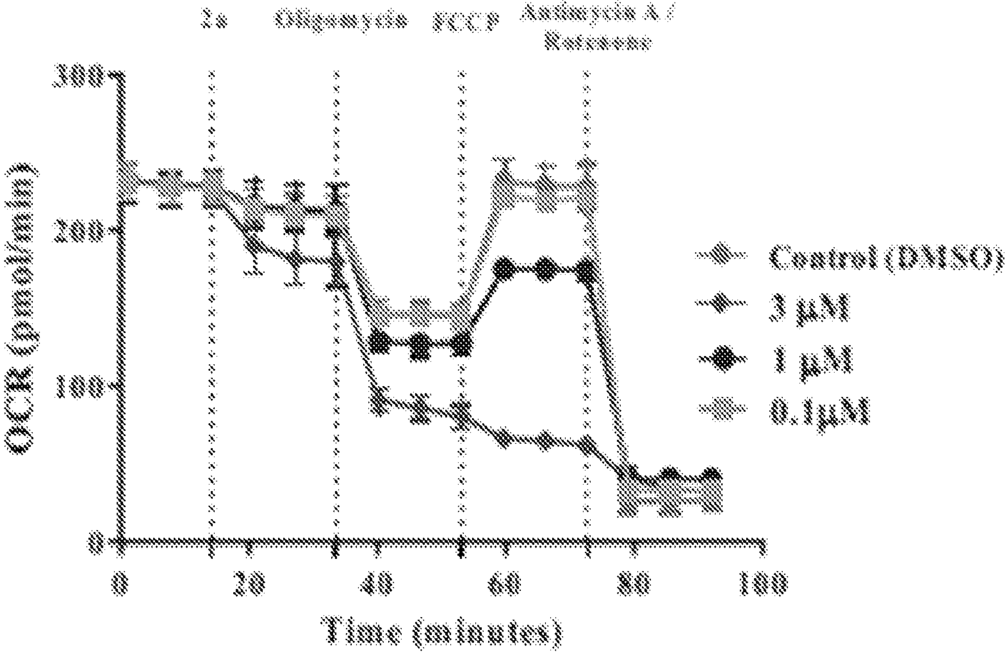
FIGS. 9B and 9C includes results of a mitochondria stress test was performed with pneumatic injections of compound 2a at concentrations ranging from (0.1-3 μM) and response to injections of oligomycin, FCCP, and antimycin A/rotenone. Data is plotted as the mean±s.e.m (8 technical replicates).
Figure 9C:
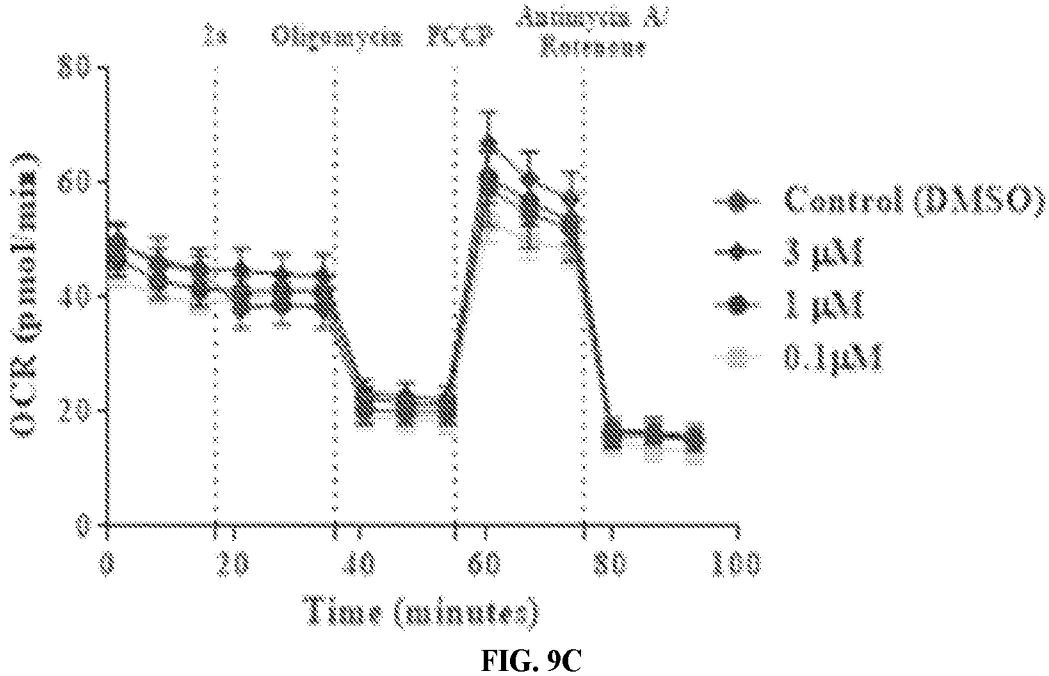
Figure 9D:
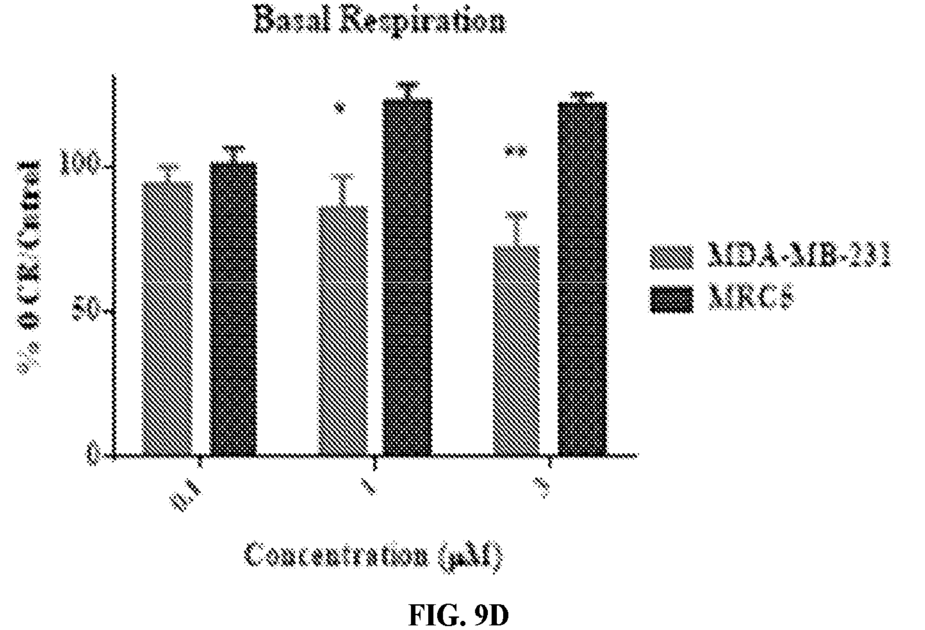
FIGS. 9D and 9F illustrate key bioenergetic parameters having significant statistical response to treatment with compound 2a at concentrations as low as 3 μM within 30 minutes in MDA-MB-231 with selectivity over MRCS cells. Data are plotted as the mean±s.e.m, * $p<0.05$, ** $p<0.01$.
Figure 9E:
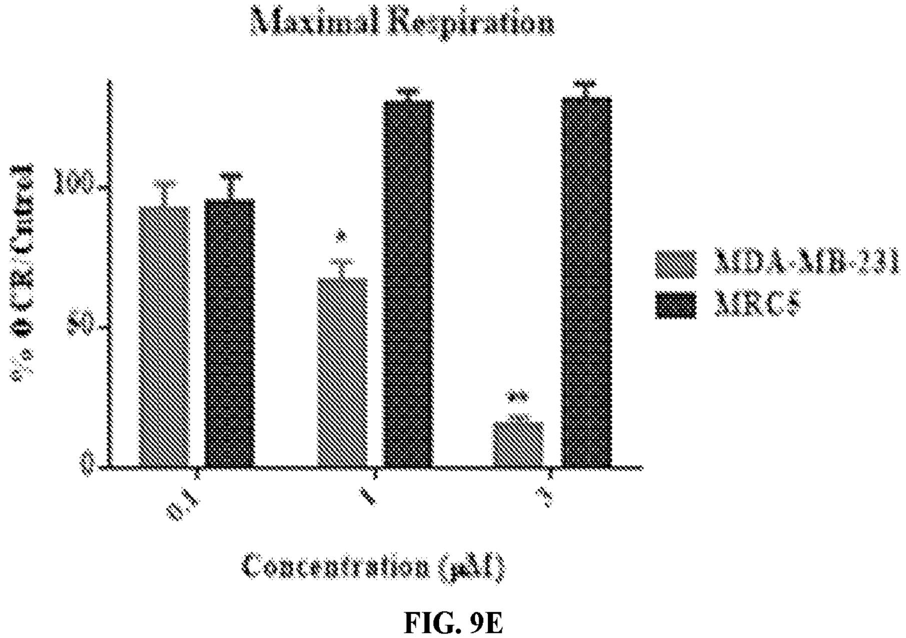
Figure 9F:
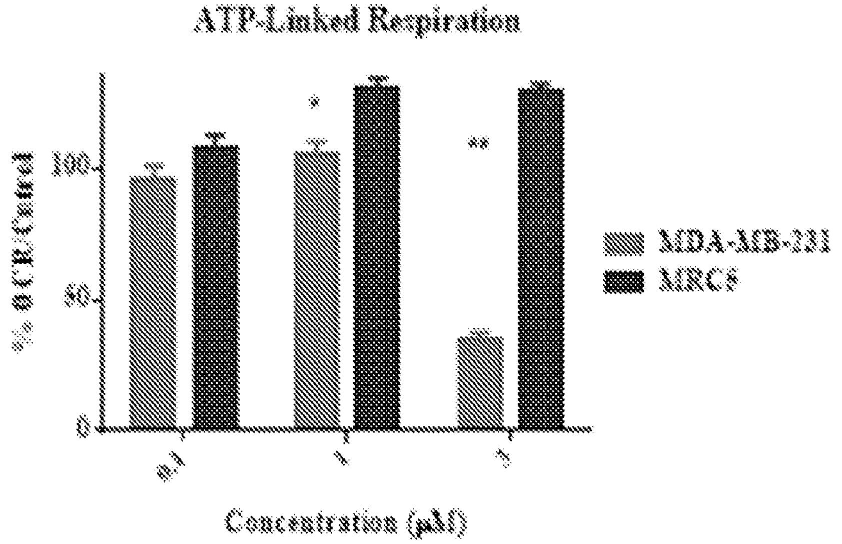

With the previous biological data pointing towards metabolic changes, the effect 2a had on redox metabolism was explored. The ETC is a complicated biological system that is constantly changing in response to external stress in order to achieve redox homeostasis within the cell. With the DEG data alluding to involvement of ETC genes (FIG. 9A), the effect of complexes on these biological parameters was next examined. Oxygen consumption rate (OCR) experiments by Seahorse 96XF to quantify the effect of 2a on mitochondrial bioenergetics or stress (MitoStress) (FIGS. 9B and 9C) was next performed.[87] A series of known inhibitors of the various parts of the ETC that allow for the measurement of specific parameters were used. Pneumatic injections of 2a into wells containing adhered MDA-MB-231 cells followed by subsequent injections of oligomycin, a complex V inhibitor, to view the basal OCR; FCCP, an uncoupler used to observe the maximum OCR, and rotenone/antimycin A, a complex I/III inhibitor to completely shut down the ETC. The first step was to determine the optimal MDA-MB-231 cell density and FCCP concentration, which was 30,000 cells/well and (0.6 μM) FCCP, respectively. At a concentration of 3 μM, the basal OCR is diminished by more than 20% after only 17 minutes from time of injection of 2a (FIG. 9D). A low concentration of 2a (1 μM), maximal OCR (FIG. 9E) is diminished by more than 25% within 50 minutes of treatment compared to the control. The overall decrease in maximal OCR at 1 and 3 μM implies acute depletion of mitochondrial respiration. ATP linked respiration was also calculated and found to be decreased by more than 80% at 3 μM treatment (FIG. 9F). Overall, the rapid decline in OCR suggests that these complexes are severely impacting the ETC and subsequently OXPHOS, thus causing cell death. Despite the acute dose-dependent OCR depletion induced by 2a in MDA-MB-231 cancer cells (FIG. 9B), 2a did not impact the OCR of normal epithelial cells, MRCS (FIG. 9C). These data indicate that 2a causes rapid irreversible inhibition of OXPHOS in the TNBC, MDA-MB-231 but not in the normal epithelial fibroblast, MRCS.

Example 33. Apoptosis Evaluation

To further assess the mechanistic pathway upon treatment with 2a, the apoptotic effect in MDA-MB-231 was analyzed. Apoptosis is a common cell death pathway for chemotherapeutics which can be characterized by distinct morphological features and biochemical mechanisms.[88-89] Apoptosis occurs normally in healthy cells to maintain a healthy population of cells during aging or development of tissues. Apoptosis occurs normally in healthy cells to maintain a healthy population of cells during aging or development of tissues. Some transition metal-based drugs can trigger apoptosis due to inhibition of p53 dependant pathway (a tumour suppressor gene).[90-91] Populations of apoptotic cells can be determined by containing cells with Annexin V and PI.[92-93] Cells undergoing apoptosis contain ample amount of phosphatidylserine (PS) which can be bound by Annexin V. The Annexin is then labelled with FITC, a green fluorogenic dye which can be visualized by fluorescence activated cell sorting (FACS). PI is used to stain damaged DNA to distinguish apoptotic from necrotic cells. Such staining gives four separate quadrants upon analysis; i) lower left, healthy cells which are negative for both markers, ii) lower right, pre-apoptotic cells which are positive for FITC but not for PI, iii) upper right, apoptotic cells which are positive for both markers, iv) upper left, necrotic cells which are positive for only PI. FIG. 10A illustrates that 2a at 10 μM induced significant apoptosis of MDA-MB-231 cells. Experimental data shows a 36% increase (extrapolated from FIG. 10B) in apoptotic cells in comparison to the control in just 4 h, indicative of apoptosis as a possible mode of cell death. It is possible that 2a triggers either caspase dependant- or caspase independent-apoptosis.[94-95] Immunoblotting was used to assess the effect of 2a on proteins involved in caspase related apoptosis. In a concentration dependant manner, both caspase 3 and cleaved caspase 3 were found to be upregulated in comparison to the control (FIG. 10C). Upregulation of these proteins is indicative of a caspase dependant apoptotic pathway. Caspase 3 is considered to be an executioner caspase in apoptosis as it coordinates the destruction of cellular structures including DNA fragmentation and degradation of the cytoskeleton.[96-97] Immunoblotting of cleaved PARP in response to 2a showed unaltered protein expression, which is likely due to an uninvolved role of PARP DNA damage response.[98-102]

Example 34. ROS Analysis

The status of intracellular ROS induced by 2a was next examined. For this experiment, 2',7'-dichlorofluoresceindiacetate (DCF-DA),[103] a fluorogenic dye with an excitation/emission wavelength of 495/525 nm was used. DCF-DA enters into the cell and is subsequently deacetylated by cellular esterases where it is then oxidized by ROS to produce a fluorescent compound that can detected with flow cytometry (FACS) using the FITC channel.[104]

Figure 11:
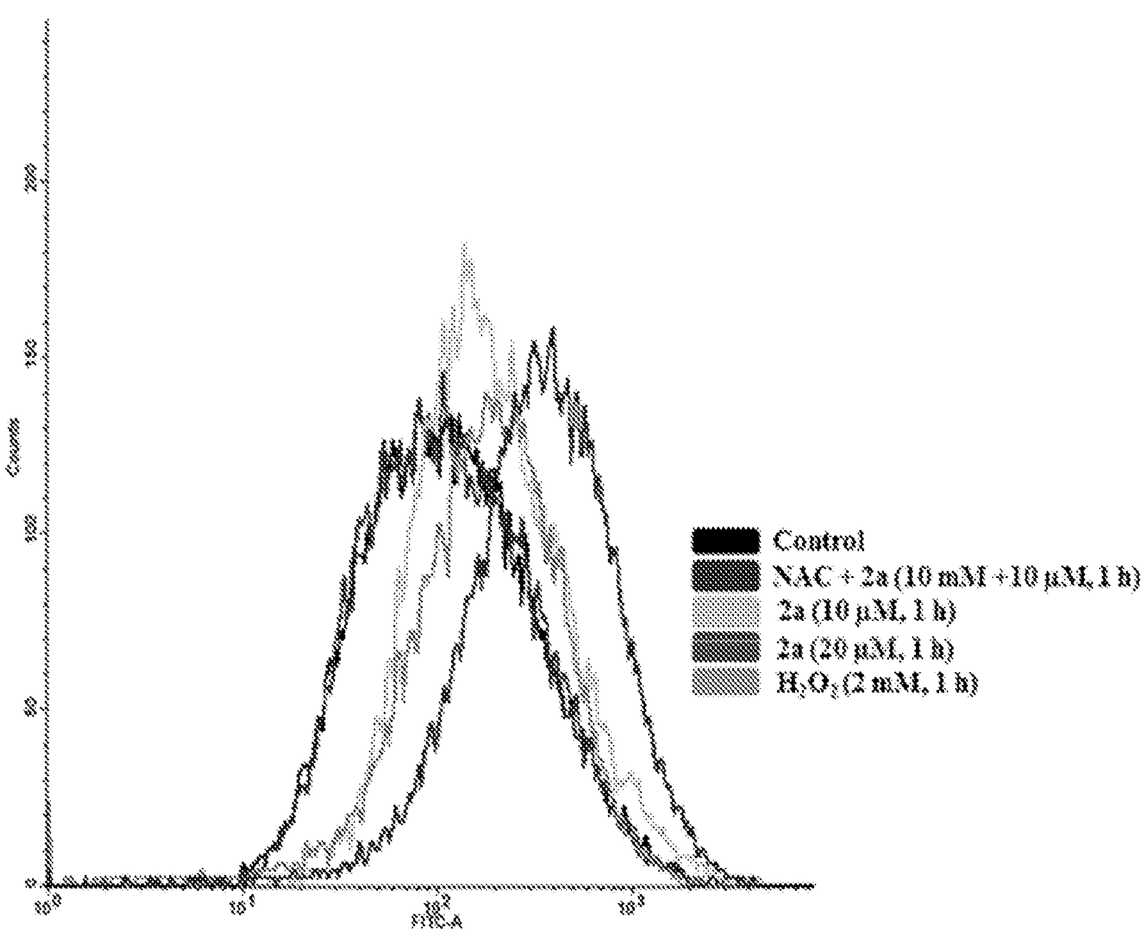
FIG. 11 illustrates that 2a induces significant increase in ROS at 10 μM in 1 h. ROS accumulation in MDA-MB-231 cells were monitored with DCF-DA over 1 h. Cells were seeded at a density of $5\times10^5$ and added compounds from a 5 mM stock solution in DMSO. $H_2O_2$ was used a positive control (30 minutes, 1 mM). Cells were pre-treated with 10 mM N-acetyl cysteine (NAC) for 2 h prior to addition of the compounds.

To quantify the amount of ROS produced, MDA-MB-231 cells were subjected to 2a at 10 and 20 μM to assess concentration dependence. Within 1 hour of treatment, a 1.3× increase in ROS in cells treated with 2a versus DMSO (FIG. 11) was observed. At twice the concentration, 20 μM, a 1.5× increase in ROS was observed. This shows a slight concentration dependence as well as very fast imbalance of the cell homeostasis. When compared to the $H_2O_2$ control, 2a produces similar ROS levels in MDA-MB-231 cells (FIG. 11). This suggests that ROS production has a key role in the cell death pathway of these complexes. To further solidify that the DCF-DA fluorescence is from ROS and not other reactive species such as RNS, cells were pre-treated with 10 mM N-acetyl cysteine for 2 h. NAC is a natural ROS scavenger and a key component in the formation of glutathione (GSH), which is a powerful antioxidant.[105-106] After pre-treatment, the cells were subjected to the same concentration of 2a (10 μM) for 1 h. FACS analysis showed that there was no increase in ROS levels in comparison to the control. This reveals that there is a significant amount of ROS being produced in the cells upon treatment and could be a product of OXPHOS inhibition.

Example 35. Cell Cycle Analysis

Figure 12A:
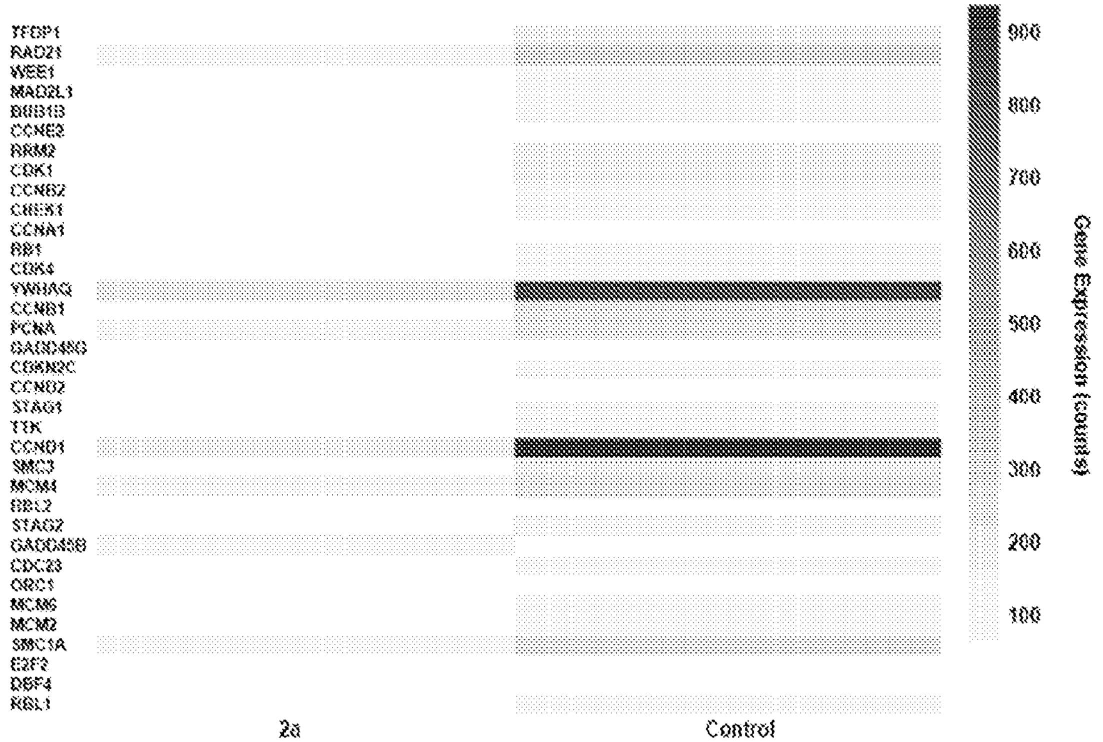
Figure 12B:
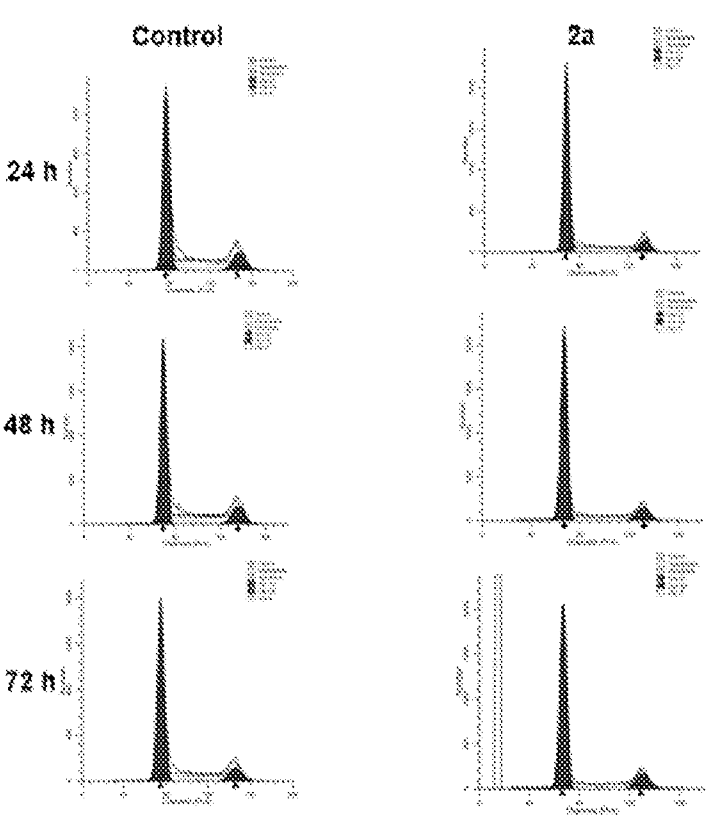
Figure 12C:
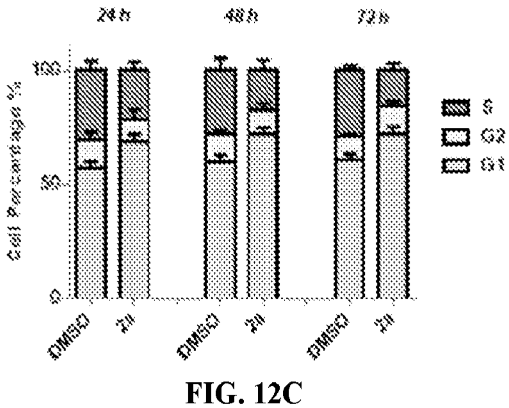
Figure 12D:
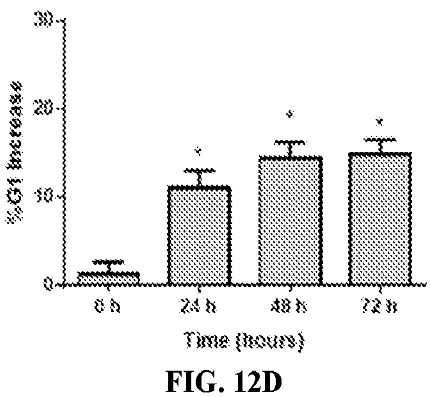

The effect of 2a on cell cycle was studied by flow cytometry. There was a time-dependent increase in G0/G1 cell cycle population over 24-72 h period. Analysis of RNA-seq data revealed the down regulation of several cell cycle related genes including cyclin D1 and cyclin dependent kinases (CDK1, CDK4, CCND1) (FIG. 12A). There are several small molecule drug candidates in clinical trials as inhibitors of CDK and induce G1 cell cycle arrest.[107-110] There are several small molecule drug candidates in clinical trials as inhibitors of CDK4/6 and induce G1 cell cycle arrest.[107-110] Thus, the finding is relevant for the design of gold based therapies for refractory tumors such as TNBC.[107-110] Thus, the instant finding is relevant for the design of gold-based therapies for refractory tumors such as TNBC. After 24 h, a 10% increase can be seen for G1 cell population as well as a 6% decrease in S phase in comparison to the control (FIGS. 12B and 12C). Over the course of 72 h, there is a significant increase in G1 phase, suggesting that 2a is arresting the cell cycle at the G1 phase. This data allowed for insights into the mechanism of action of gold dithiocarbamates, which is clearly differentiated from cisplatin.[111] The mitochondria control cellular ATP production, it is therefore possible that inhibition of mitochondria respiration and consequently low ATP levels lead to cell cycle arrest.[112-114]

Example 36. Cell Viability of 2a+GSH Adduct in MDA-MB-231

Figure 13:
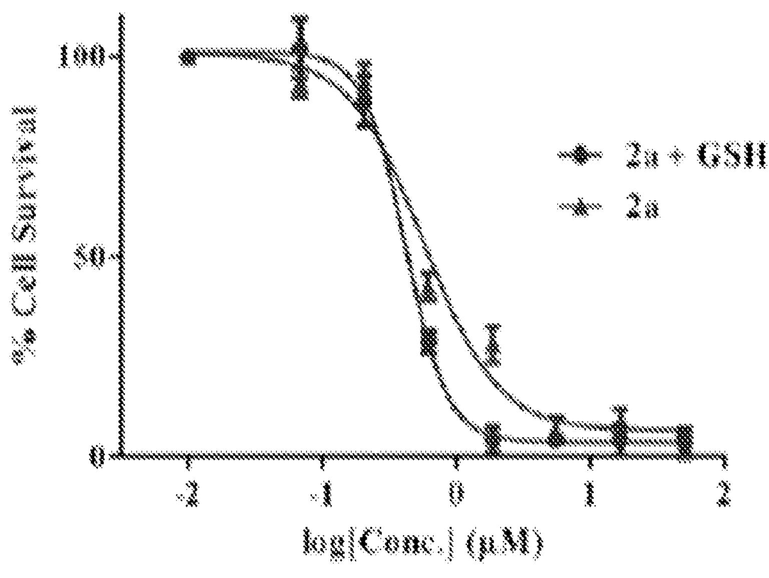
FIG. 13 includes % cell survival data for 2a and 2a+ DSH over 72 hours.
Figure 14A:
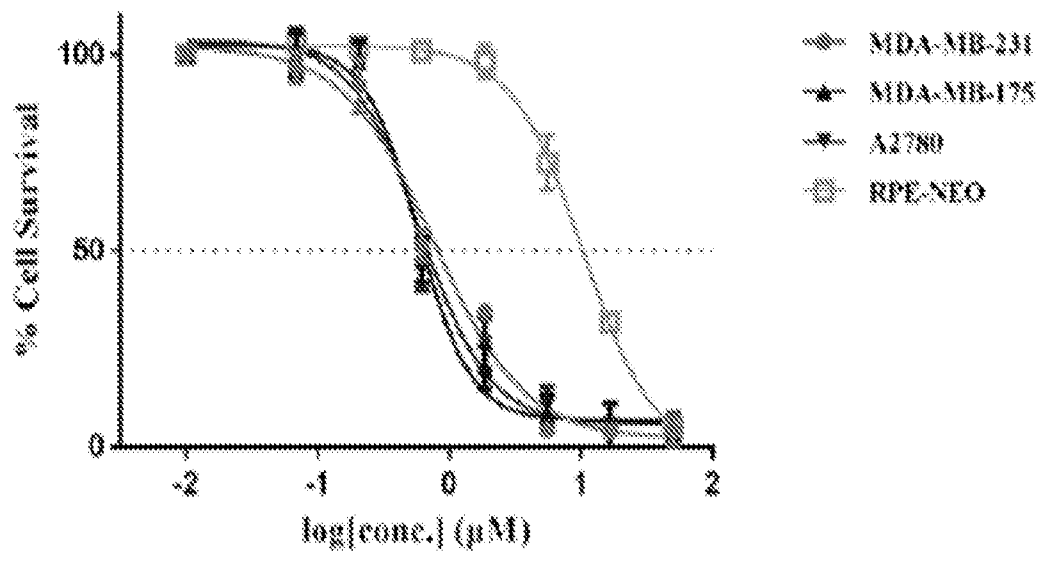
FIGS. 14A-14I include % cell survival for 1a-1e and 2a-2e, respectively, with data plotted as the mean±s.e.m. (n=3).
Figure 14B:
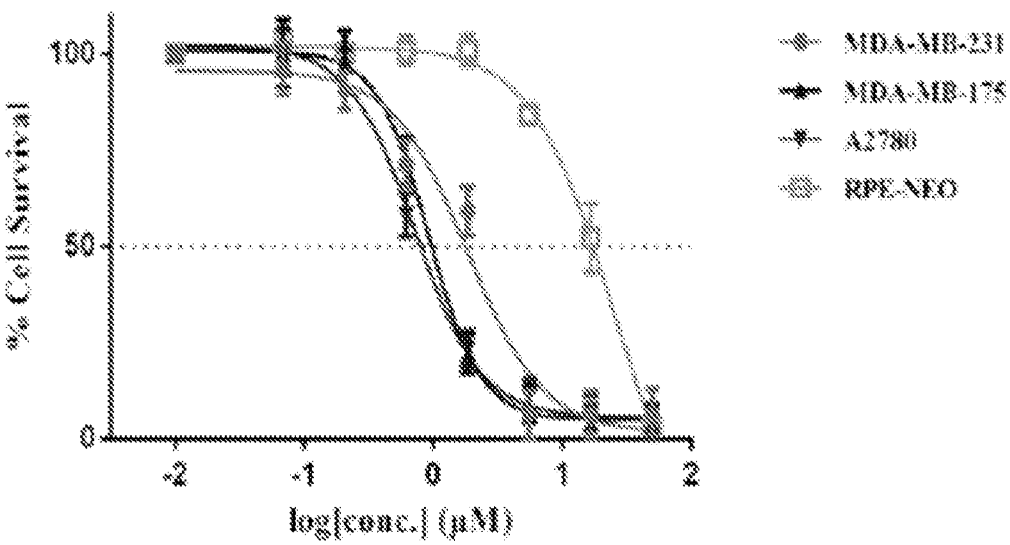
Figure 14C:
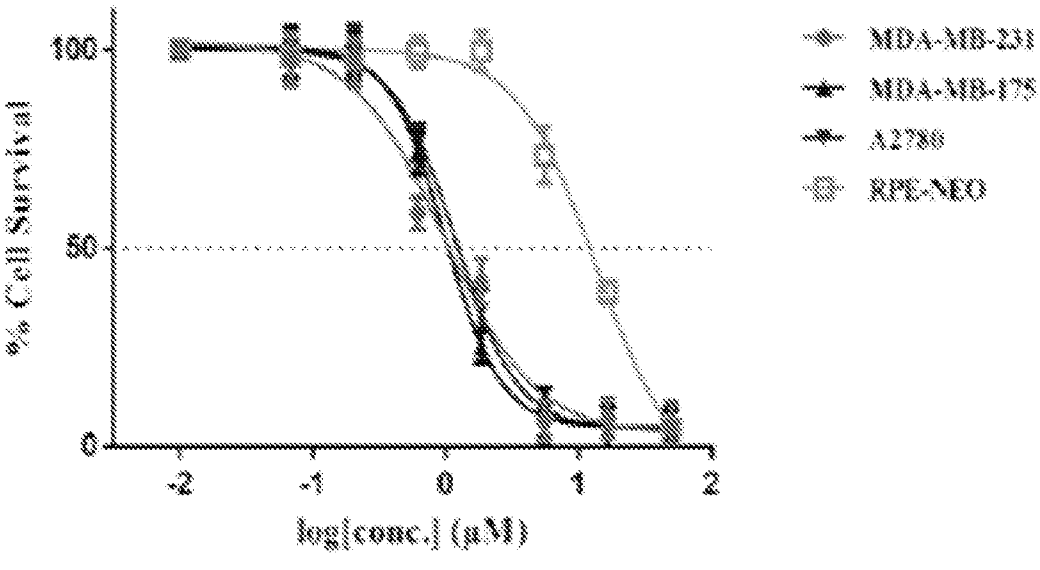
Figure 14D:
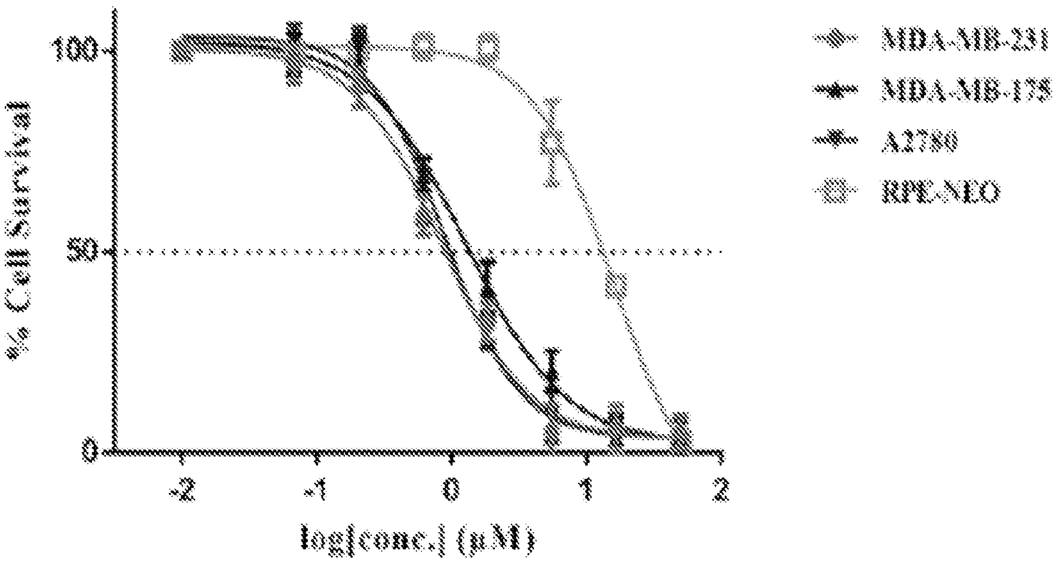
Figure 14E:
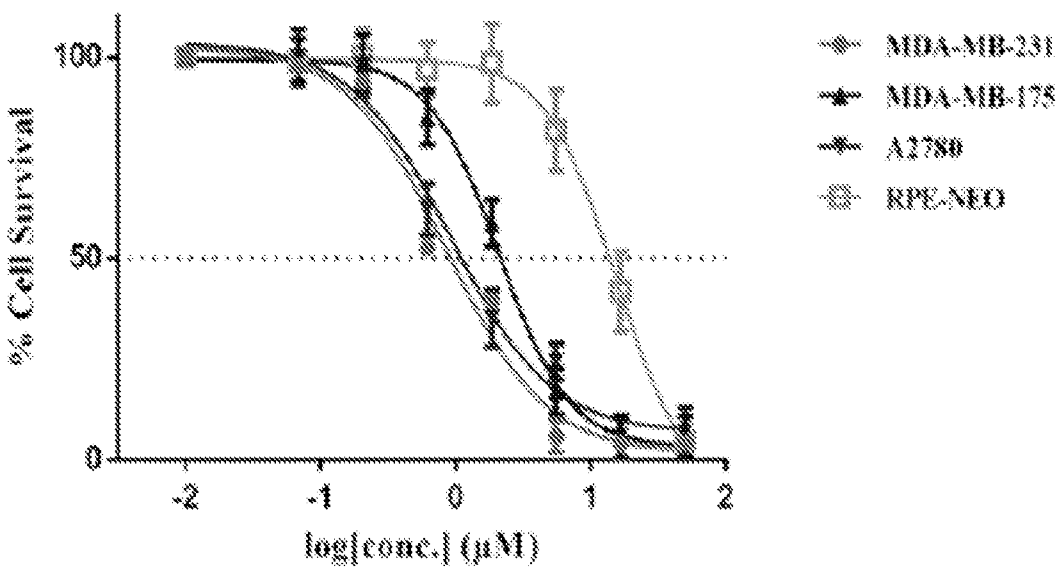
Figure 14F:
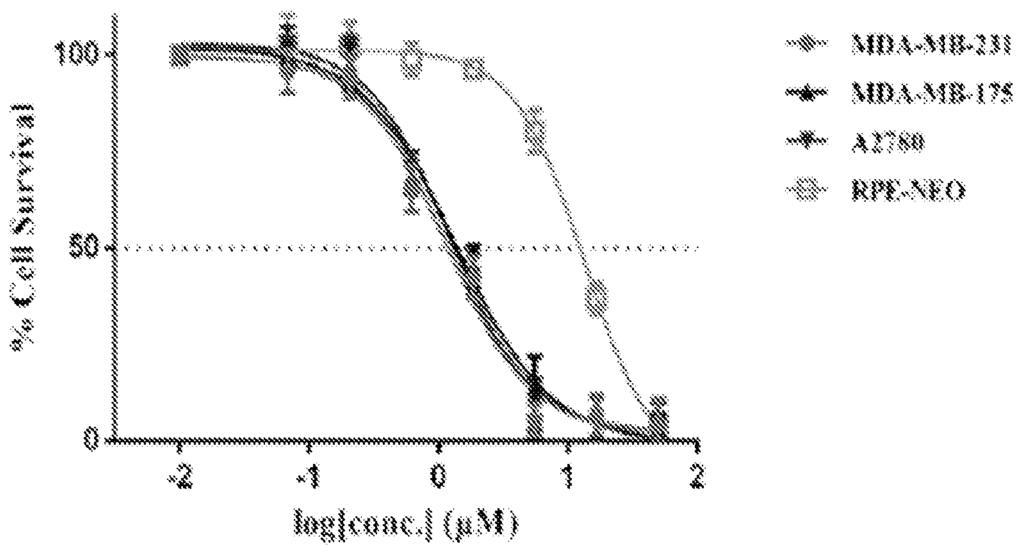
Figure 14G:
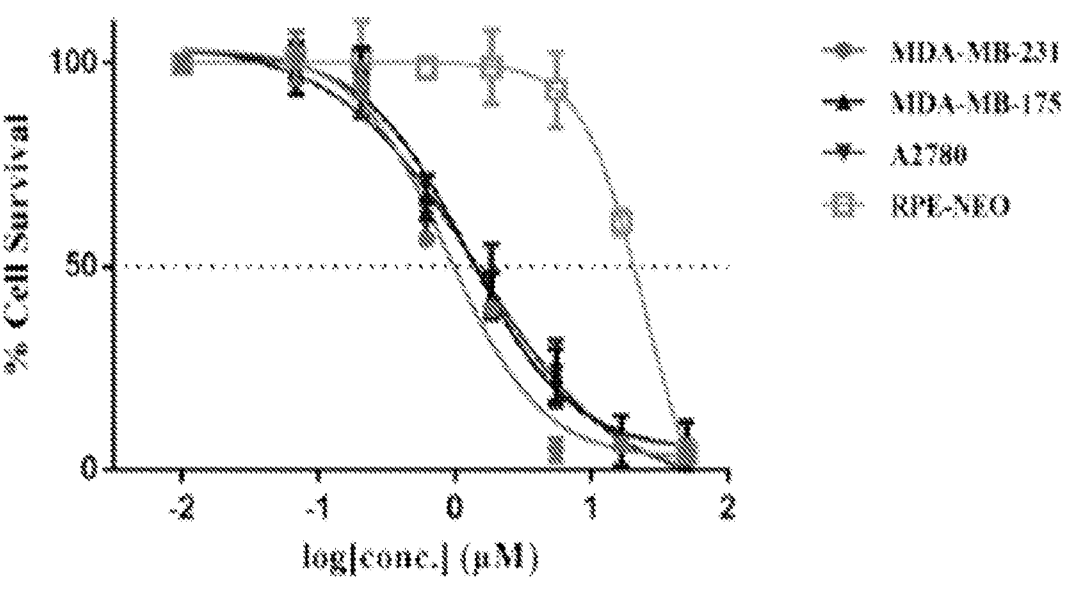
Figure 14H:
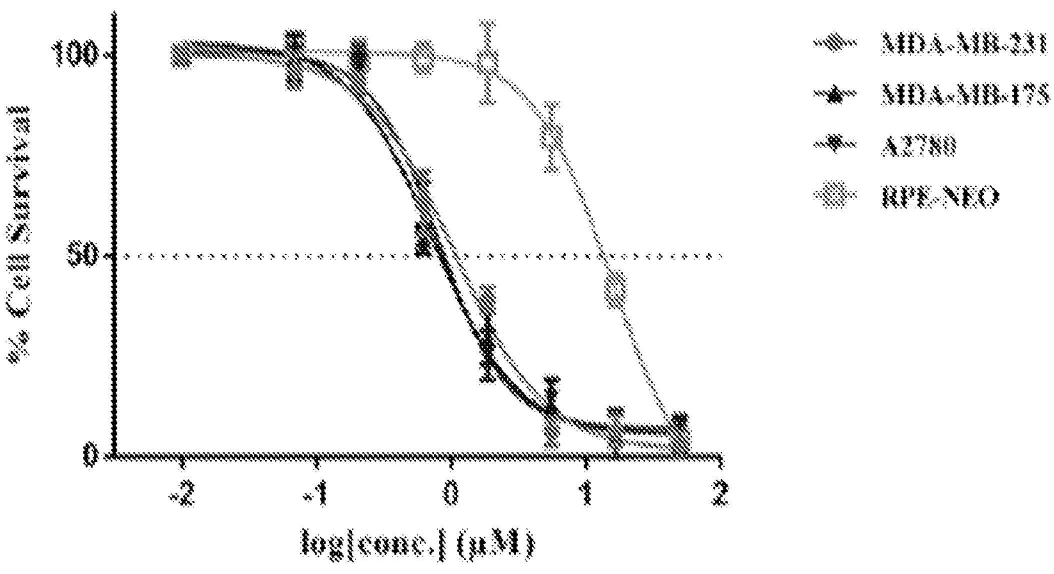
Figure 14I:
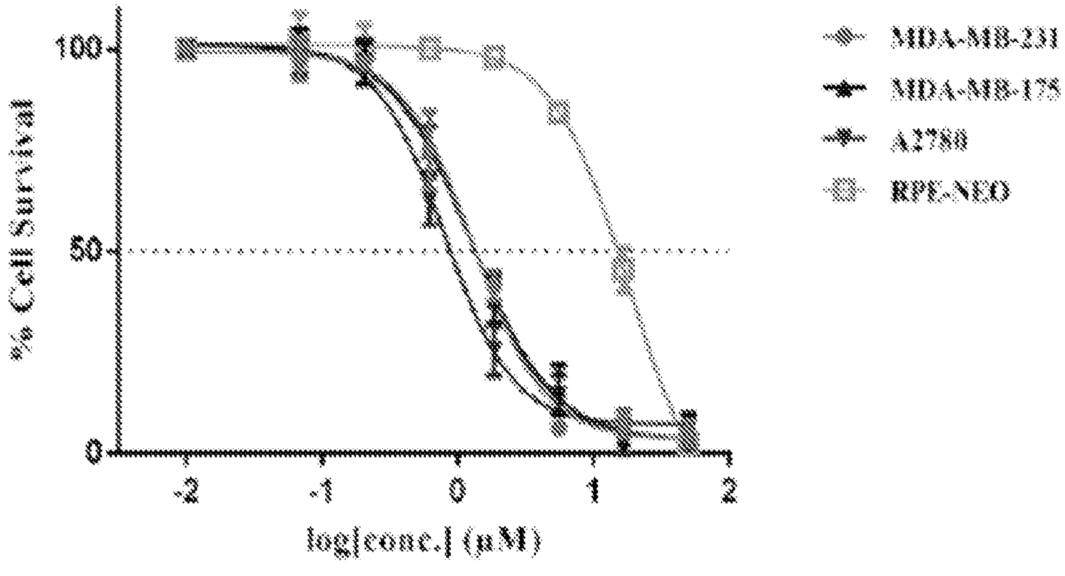

Cells were grown to confluency and added trypsin to collect the cells. The cells were washed with 2 mL of PBS and suspended in 10 mL of DMEM. The cells were centrifuged at 2000 rpm for 5 minutes. The pellet was washed with 2 mL of PBS and suspended in 5 mL of DMEM. The cells were then plated in three separate 96-well clear bottom plate at a density of 2,000 cells/well. The cells were allowed to adhere overnight. The adduct was prepared by taking a 10 mM stock of 2a in DMSO and GSH in DMEM and mixing in a 1:1 ratio to achieve a 5 mM stock of the adduct. The adduct solution was diluted to 100 μM working concentration with DMEM. The adduct was then added at a 3× dilution starting at 50 μM for the highest concentration and the cells incubated for 72 h at 37° C. with 5-10% $CO_2$. The medium was removed and a solution of MTT (100 μL, prepared by dissolving MTT at 5 mg/mL and diluting by 10× with DMEM) was added to each well and incubated for 4 h at 37° C. with 5-10% $CO_2$. The dye was removed from each well and 100 μL of DMSO was added to induce cell lysis. The plates were read using a Genios plate reader (λ=570 nm). The experiment was performed in triplicate. Data are plotted as the mean±s.e.m. (n=3) (FIG. 13).

Example 37. Cell Viability of 1a-1e and 2a-2e (Adherent Cell Lines)

The cell viability of all 10 complexes were performed in MDA-MB-231, MDA-MB-175, A2780, and RPE-NEO. The cell viability of compound 2a was also determined in H460. Cells were grown to confluency and trypsin was added to detach and harvest cells. The cells were washed with 2 mL of PBS and suspended in 10 mL of the appropriate media. The cells were centrifuged at 2000 rpm for 5 minutes and the pellet washed with 2 mL of PBS then suspended in 5 mL of the appropriate media. The cells were plated at a density of 2,000 cells/well in a 96-well clear bottom plate and allowed to adhere overnight at 37° C. with 5-10% $CO_2$. The compounds were prepared as a stock in DMSO and used fresh. The compounds were added at seven concentrations with a 3× serial dilution starting at 50 μM for the highest concentration and incubated at 37° C. for 72 h with 5-10% $CO_2$. The medium was removed and a solution of MTT (100 μL, prepared by dissolving MTT at 5 mg/mL and diluting by 10× with DMEM) was added to each well and incubated for 4 h at 37° C. with 5-10% $CO_2$. The dye was removed from each well and 100 μL of DMSO was added to induce cell lysis. The plates were read using a Genios plate reader (λ=570 nm). The experiment was performed in triplicate and data are plotted as the mean±s.e.m. (n=3). Data for 2a can be found in FIG. 6A-6D and the other complexes can be seen in the FIGS. 14B-14J.

Example 38. Cell Viability of 1a-1e and 2a-2e (Suspended Cell Lines)

The cell viability of 2a was determined in K562. Cells were grown to confluency and centrifuged at 2000 rpm for 5 minutes to collect the cell pellet. The cells were washed with 5 mL of PBS, suspended in 5 mL of DMEM, and centrifuged again at 2000 rpm for 5 minutes to collect the pellet. The pellet was then washed with 2 mL of PBS and suspended in 5 mL of DMEM. The cells were plated at density of 2,000 cells/well in a 96-well white bottom plate. 2a was prepared as a stock solution in DMSO and used fresh. The compounds were added at seven concentrations with a 3× serial dilution starting at 50 μM for the highest concentration and incubated at 37° C. for 72 h with 510% $CO_2$. The cells were removed from the incubator and allowed to rest at room temperature for 30 minutes. To each designated well was then added 20 μL of CellTiter-Glo solution and orbitally shaken for 5 minutes and the luminescence (1000 ms integration and 150 ms gain) acquired on a Genios plate reader. The experiment was performed in triplicate. Data are plotted as the mean±s.e.m. (n=3) as seen in the main text (Table 2 and FIGS. 6A-6D).

Example 39. Apoptosis Analysis

MDA-MB-231 cells were seeded at a density of $5\times10^5$ cells/well in a 6 well clear bottom plate with a final media volume of 2 mL. The cells were allowed to adhere overnight at 37° C. A stock of 2a was prepared fresh in DMSO and added to the desired well at a concentration of 1 μM with a final volume of 2.5 mL and incubated for 4 h at 37° C. A stock of $H_2O_2$ was prepared in PBS and the cells treated at a final concentration of 2 mM for 1 hour as a positive control. When ready for analysis, the media were removed and the wells washed with 5 mL of PBS. The cells were trypsinized (1 mL), 5 mL of DMEM were added to each well, and total volume collected and centrifuged to pellet the cells. The cells were resuspended in 2 mL of fresh media, counted, and reconstituted to a concentration of $1\times10^5$ cells/mL. The cells were centrifuged again, and the pellet suspended in 500 μL of Annexin binding buffer. To each sample was added 5 μl of Annexin V-FITC and 5 μl PI and incubated in the dark at room temperature for 5 minutes. The samples were then subjected to FACS analysis. Graphs are representative of three technical replicates. Percentages are plotted as the mean±s.e.m. (n=3) as seen in the main text (FIG. 10).

Example 40. Immunoblotting

MDA-MB-231 cells were seeded at density of $5\times10^5$ cells/well in a 6 well clear bottom plate with a final volume of 2 mL and allowed to adhere overnight at 37° C. Compound 2a was prepared as a stock in DMSO and added to the respective wells at the specified concentrations of 0.1, 1, and 10 μM and treated for 12 h. The cells were washed with PBS (3×3 mL) and were scraped into SDS-PAGE loading buffer (64 mM Tris-HCl (pH 6.8)/9.6% glycerol/2% SDS/5% β-mercaptoethanol/0.01% bromophenol blue) and incubated at 95° C. on a heat block for 10 min. The samples were cooled and stored at −20° C. until ready for use. Whole cell lysates were resolved by 4-20% sodium dodecylsulfate polyacrylamide gel electrophoresis (SDS-PAGE; 100 V for 35 min) followed by electro transfer to a PVDF (350 mA for 1 h). Membranes were blocked using 3% (w/v) bovine serum albumin (BSA) in PBST (PBS/0.1% Tween 20) and incubated with specific primary antibodies (Cell Signaling Technology) overnight at 4° C. On the following day, after washing with PBST (3×5 mL), the membrane was incubated with horseradish peroxidase-conjugated secondary antibodies (Cell Signaling Technology) in freshly prepared BSA blocking solution. Immuno complexes were detected with the ECL detection reagent (BioRad) and analyzed using a BioRad imager with a chemiluminescence filter. Blots can be found in the main text (FIG. 10C).

Example 41. Whole Cellular Uptake

MDA-MB-231 cells were seeded at a density of $1\times10^6$ cells/mL in a 6 well clear bottom plate with a volume of 2.5 mL and allowed to adhere overnight at 37° C. Compounds were prepared as a stock in DMSO and added to each well at a final concentration of 5 μM and treated for 24 h. Auranofin was used as a comparative control and treated at a final concentration of 5 μM and treated for 24 hours as well. The cells were then collected by trypsinization and centrifuged at 2000 rpm for 5 minutes to form a pellet. The pellet was suspended in 1 mL of DMEM, transferred to a 1.5 mL Eppendorf tube, and centrifuged again at 2000 rpm for 5 minutes. The media were removed, washed with PBS twice, and the pellet stored at −20° C. until analysis. Prior to analysis, the pellets were suspended in 0.5 mL of concentrated HCl and agitated for 1 minute. The solution was transferred to a 15 mL Falcon tube and then 4.5 mL of DI $H_2O$ was added. The samples were then subjected to analysis with ICP-OES. Data is represented as the mean±s.e.m. (n=3) as seen in the main text (FIG. 5).

Example 42. Differential Gene Expression Using RNA-Sequencing

MDA-MB-231 cells were seeded on petri dish (100 mm×15 mm) and allowed to grow to 85% confluency. The cells were then treated with 2a at a concentration of 1 μM for 12 h at 37° C. Cells were harvested and $1\times10^7$ cells were collected. High quality RNA was isolated using RNA Qiagen kit following manufacturer's protocol and subsequently sent to Novogene® for RNA-sequencing and analysis. Prior to analysis samples were required to pass three tests before library construction: 1) nanodrop for RNA purity ($OD_{260}/OD_{280}$), 2) agarose gel electrophoresis for RNA integrity and potential contamination, and 3) Agilent 2100 check RNA integrity. Next, the NEB library was constructed from mRNA enrichment and fragmentation, followed by reverse transcription, second strand cDNA synthesis, end repair, addition of adaptor, and finally amplification with PCR. After library construction, qPCR was used to accurately quantify the library effective concentration (>2 nM), in order to ensure the library quality. Raw reads were removed via the following parameters: 1) remove reads containing adaptors, 2) remove reads containing N>10% (N represents bases that could not be determined), 3) the Qscore (Quality value) of over 50% bases of the read was ≤5. Novogene® then uses STAR to accomplish the mapping reads to the reference genome. Gene expression level is then estimated by the abundance of transcripts (count of sequencing) that mapped to genome or exon where read counts are proportional to gene expression level, gene length and sequencing depth. Samples are then subjected to analysis using Pearson's correlation coefficient and principal component analysis for statistical significance.

Example 43. Mitochondrial Membrane Potential (JC-1)

Figure 8:
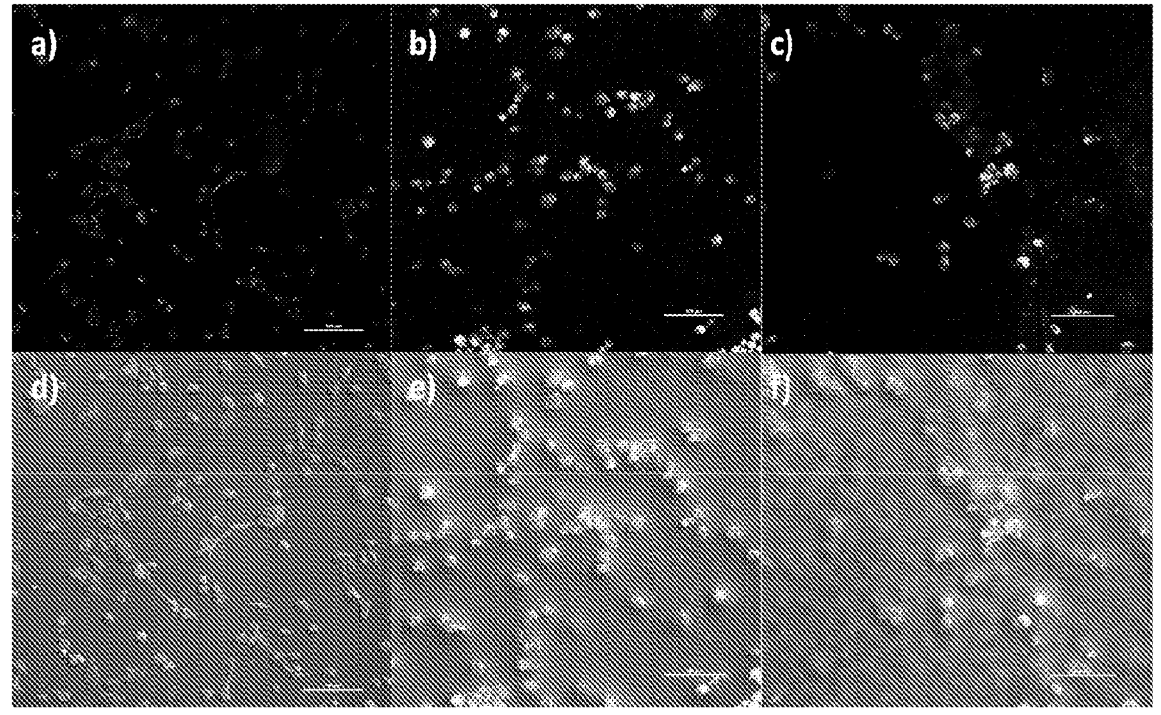
FIG. 8 illustrates the effects of 2a on mitochondrial membrane potential including, panel a: DMSO vehicle, panel b: 2a at 10 μM for 6 h, panel c: CCCP as a positive control at 100 μM for 30 minutes, and panes d-f: Corresponding bright field image: DMSO vehicle, 2a, and CCCP. Compound 2a significantly depolarizes the mitochondria membrane upon treatment within 6 h. Cells were seeded at a density of $5\times10^5$ cells per glass bottom dish with a #1.5 coverslip. J-monomers shown in green (exc. 488 nm) and J-aggregates (exc. 520 nm). Images are representative of three independent treatments.
Figure 15:
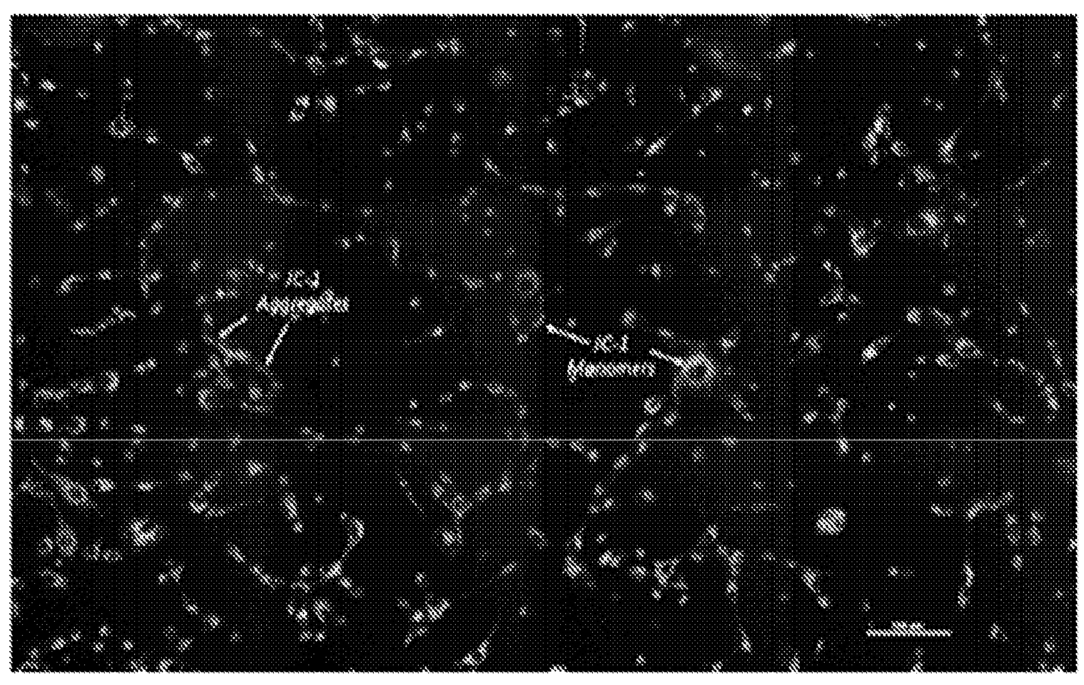
FIG. 15 shows % Cell survival of 2e, data are plotted as the mean±s.e.m. (n=3).

MDA-MB-231 cells were plated at a density of $5\times10^5$ cells/plate using a glass bottom petri dish fitted with a #1.5 cover slip with a final volume of 1.5 mL and allowed to adhere overnight at 37° C. Compound 2a was prepared as a stock in DMSO and added at a final concentration of 10 μM. The cells were treated for 6 h at this concentration. CCCP was prepared as a stock in DMSO and added at a final concentration of 100 μM and the cells treated for 1 h. This was used as a positive control. After the indicated treatment time, a working solution of the JC-1 dye (Cayman Chemicals) was prepared by adding 100 μL of dye into 900 μL of DMEM. Note: the working solution of JC-1 should always be prepared fresh and not stored for long-term use. Then, 100 μL/mL of DMEM were added to the cells and incubated at 37° C. for 20 minutes. Prior to imaging, the media was removed and replaced with room temperature PBS (2 mL). The cells were then visualized using confocal microscopy on a Nikon MR Inverted Confocal Microscope. J-aggregates were imaged with (excitation/emission: 510/590 nm) and J-monomers with (excitation/emission: 488/525 nm). Each image is representative of three technical replicates as seen in the main text (FIG. 8). A field of view (FOV) image can be found in FIG. 15.

Example 44. ROS Analysis (DFC-DA)

MDA-MB-231 cells were seeded at a density of $5\times10^5$ cells/well in a 6-well clear bottom plate with a final volume of 2 mL and allowed to adhere overnight at 37° C. Compound 2a was prepared as a stock in DMSO and added to the desired wells at a final concentration of both 5 and 10 μM and treated for 1 h. For the positive control, $H_2O_2$ was used and diluted with PBS and added at a final concentration of 1 mM with a treatment time of 1 h. For the wells that were pre-treated with NAC, a stock solution of NAC in DMEM was added at a concentration of 10 mM for 2 h prior to the addition of 2a. Following treatment, the media were removed, cells were washed with 5 mL of PBS, and collected via trypsinization by centrifuging at 2000 rpm for 5 minutes. The pellet was then suspended in 500 μL of a 10 μM DCF-DA solution in PBS and incubated for 30 minutes at 37° C. in the dark. The cells were then centrifuged again at 2000 rpm for 5 minutes, the pellet washed with PBS (3×1 mL) and suspended in 500 μL of PBS. The cells were then analyzed using FACS with the FITC channel (excitation, λ=488 nm). Each data set is representative of three technical replicates as seen in the main text (FIG. 11).

Example 45. Mitochondrial Metabolism Analysis with Seahorse XF96 Analysis

The initial step of Seahorse XF96 analysis included optimization of the cell density. In this stage MDA-MB-231 cells were seeded at a range of densities from 2000 cells/well to 100,000 cells/well, followed by optimization of the FCCP injection concentration used (0.6 μM of 1.2 μM). The optimum conditions were determined to be 30,000 cells/well and an FCCP injection concentration of 0.6 μM. All Seahorse XF96 experiments with MDA-MB-231 were performed under these conditions. The cells were seeded the night prior to the experiment with a final volume of 100 μL and incubated overnight at 37° C. Compound 2a was prepared as a stock in DMSO and diluted to a working concentration of 200 μM with Seahorse XF96 assay buffer and then subsequently serial diluted by 3× to achieve multiple concentrations. The assay was performed using a pneumatic injection method of 2a, with the final injection concentrations of 0.1, 1, 3, and 11 μM. This was followed by injection of oligomycin (1.5 μM), FCCP (0.6 μM) and rotenone/antimycin A (0.5 μM). The metabolic parameters are calculated as seen in the supplementary information of the following papers.[15-16] The Seahorse XF96 analysis for MRCS was performed in an identical manner to MDA-MB-231 except that MRCS cells were seeded at a density of 50,000 cells/well and an FCCP injection concentration of 0.6 μM was used.

Example 46. Cell Cycle Analysis

MDA-MB-231 cells were seeded at a density of $2\times10^5$ cells/well in a 6 well clear bottom plate with a final media volume of 2 mL and allowed to adhere overnight 37° C. Compound 2a was prepared fresh as a stock in DMSO and added at a final concentration of 0.1 μM with a final volume of 2.5 mL. Cells were treated with 2a for time periods of 24 h, 48 h, and 72 h. After the desired treatment period, the medium was removed and added to a 15 mL Falcon tube. The wells were washed with 5 mL of PBS and added to the Falcon tube. The cells were trypsinized (1 mL) and added 5 mL of fresh DMEM. All media were combined, and the tube centrifuged at 2000 rpm for 5 minutes to collect the pellet. The media were decanted, and the pellet suspended in 1 mL of PBS, which was then transferred to a 1 mL Eppendorf tube, centrifuged at 2000 rpm for 5 minutes and suspended in 70% EtOH/PBS solution. These solutions were stored at 4° C. until ready for analysis. Once all treatments had been collected, the cells were collected by centrifuging at 2000 rpm for 5 minutes. The cells were washed twice with PBS (1 mL) and suspended in a 504 of RNase solution (100 mg/mL) and 2004 of a 50 mg/mL PI solution. The solutions were then filtered through a 5 mL polystyrene round-bottom tube fit with a cell-strainer cap. The samples were then analyzed with FACS. Data are representative of three technical replicates with percentages plotted as the mean±s.e.m. (n=3) as seen in the main text (FIG. 12).

Example 47. Mitochondrial Dysfunction and Metabolic Stress Via Loss of OCR

Figure 16A:
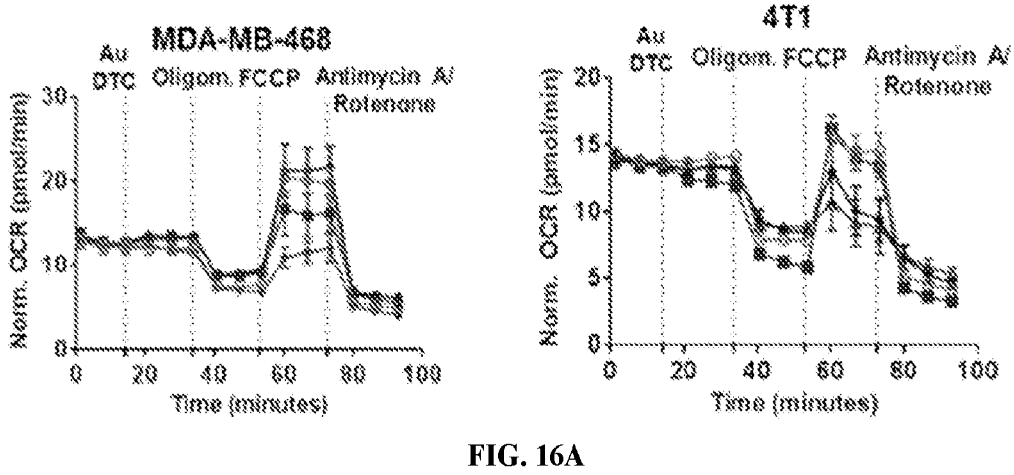
FIGS. 16A and 16B include results of bioenergetic stress test of AuDTC in representative cancerous and normal breast cell lines.
Figure 16B:
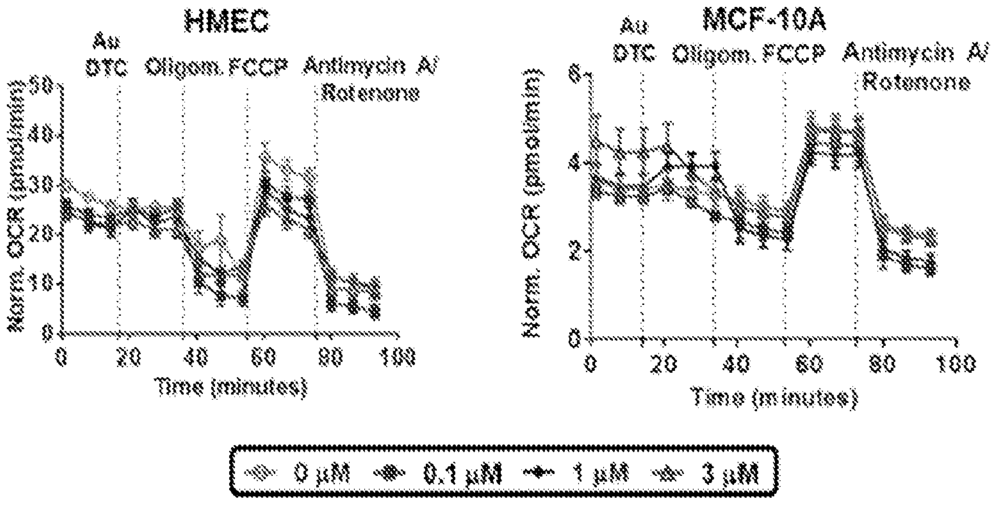

A metabolic stress test was performed on mitochondria using the Seahorse XF96 and measured the subsequent changes of OCR after injection AuDTC (FIG. 16A-16B). The gold agent (2a) was injected pneumatically at varying concentrations (vehicle (1% DMSO), 0.1, 1 and 3 μM), followed by electron transport chain inhibitors to shut off various parts of the ETC.

Figure 17:
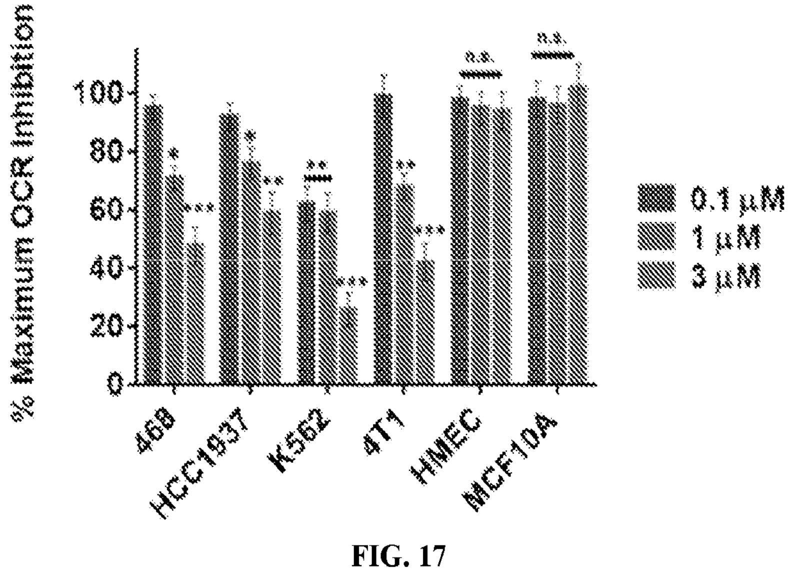
FIG. 17 presents maximal OCR inhibition calculated from the OCR data after pneumatic injection of AuDTC. The control of each cell line was taken to be 100%. All concentrations are in comparison to the control. Data for each cell was normalized prior to calculations per 1,000 cells. Data are plotted as the mean±s.e.m, n=8. * $p<0.05$,  $p<0.01$, * $p<0.001$. n.s.=not significant, by a Student's two-tailed t test.

A loss of total OCR was seen across these panel of TNBCs upon treatment with AuDTC in a concentration dependent manner (FIG. 16A). Despite the loss in maximal OCR in the TNBC models, 2a did not affect the OCR of the two normal breast epithelial models: MCF-10A and HMEC, even at the same doses used (FIG. 16B). At a concentration of 3 μM (FIG. 17), a significant loss in maximal OCR and ATP-linked respiration was observed. Maximal OCR is measured by the area under the curve between the injection of FCCP and the cocktail of antimycin A/rotenone (time=53.11 minutes to 72.57 minutes). In MDA-MB-468, a concentration of 2-times the $IC_{50}$ value (1 μM) (FIG. 17), lead to a 39% loss in maximal OCR. Similarly, a 42% loss of maximal OCR was recorded in 4T1 (FIG. 17). Furthermore, in MDA-MB-468, 4T1, and K562 (leukemia), at a concentration of 3 μM (FIG. 17), a loss in OCR>50% was observed in comparison to the control (FIG. 17). The overall decrease in maximal OCR after a short exposure time across the panel of cell lines implies acute depletion of mitochondrial respiration. This effect was further evaluated on another highly proliferative TNBC model, HCC1937 (FIG. 17), and similar effects were observed.

Taken together the data illustrates that the gold agent rapidly perturbs mitochondrial metabolism regardless of tumor type and it is selective for cancer compared to normal cells. Further, the data represent an innate capability of the gold agent to rapidly induce mitochondrial stress through perturbation of OXPHOS.

Example 48. Complex I Mediated Metabolic Stress

The underlying mechanism of mitochondrial respiration inhibition was evaluated by assessing the effect of 2a on specific mitochondrial complex activity. Mitochondrial metabolism is driven by the transfer of electrons through the ETC. The complex system is made of >100 proteins which form the OXPHOS machinery. The ETC is comprised of 5 complexes; I-IV and complex V which is a subunit known as $F_0F_1$ ATP synthase which drives respiration through a proton gradient converting ADP to ATP. Several studies have identified potent small molecules for inhibition of these various complexes, therefore any possible specific interaction between the gold agent and complex I were explored.

Figure 18A:
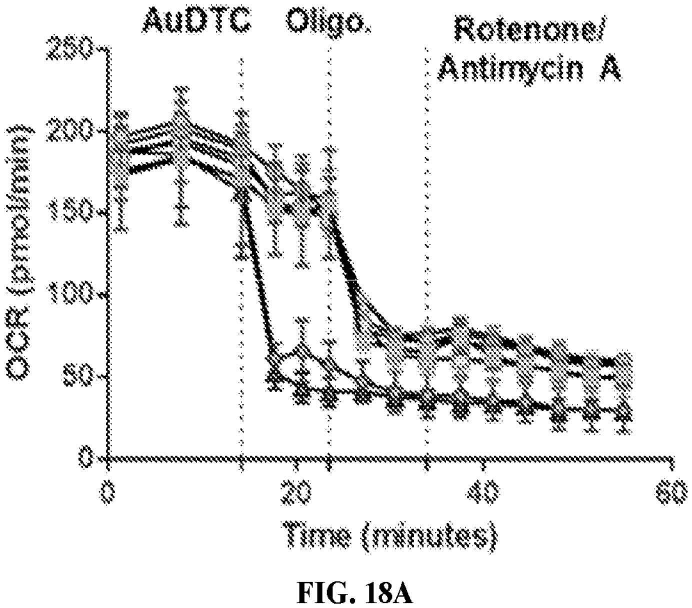
FIGS. 18A and 18B present Complex I-driven respiration results measured with Seahorse XF96 in MDA-MB-468 using plasma membrane permeabilization and substrates pyruvate (10 mM)/malate (1 mM).
Figure 18B:
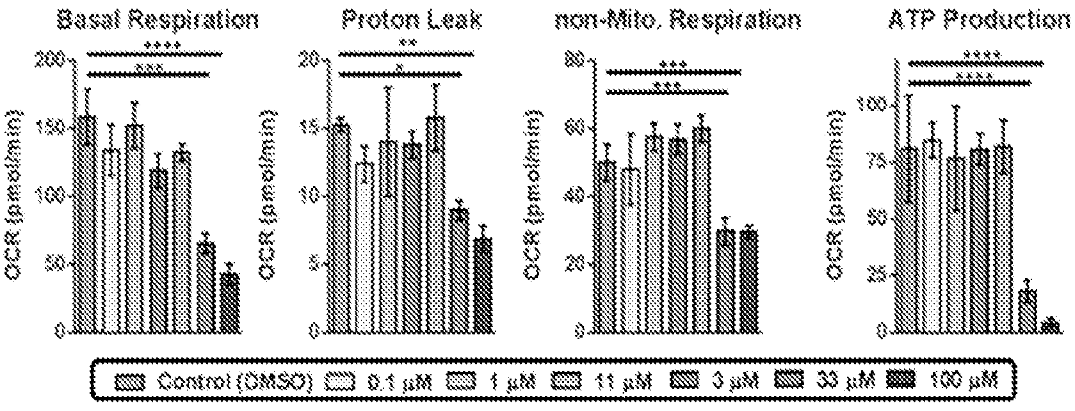

The effect of the gold agent on mitochondrial complex I-driven respiration was evaluated using the plasma membrane permeabilizer (XF PMP) assay (FIG. 18A). Pinpointing the precise underlying mechanism in disruptions of mitochondrial metabolism typically involves isolation of mitochondria. Given the complex nature of this experiment and avoiding low quality and low yielding isolation, the use of the XF PMP assay was employed to analyze the effect on complex I driven respiration in situ with the critical design of substrate and inhibitors. The assay forms pores in the plasma membrane of the seeded cells with significantly less mitochondrial outer membrane damage in comparison to common detergents (i.e. saponin and digitonin). Where these detergents often require careful titrations to determine optimal permeabilizing times and concentrations, a fixed concentration of XF PMP provides a sufficient basis for permeabilizing a broad selection of cell types To measure complex I driven OCR, MDA-MB-468 cells were subjected to pneumatic injection of 2a after the cells had been incubated with MAS buffer containing excess levels of pyruvate (10 mM) added with 1 mM malate to feed the TCA cycle and thus NADH linked respiration. In a concentration-dependent manner, a loss in OCR and respiratory function was observed at 33 μM (FIG. 18A).[403,404] Further analysis revealed a significant loss in basal respiration and ATP production as well as loss of proton leak illustrating that complex I driven respiration is affected (FIG. 18B). Given the high concentration required to inhibit pyruvate linked respiration, it was suspected that overall OCR loss is due to overall loss in mitochondrial function from an upstream inhibition, rather than a direct target to complex I. However, given that the effect on complex I respiration is rapid at 33 μM (FIG. 18B) and there is immediate loss in ATP production (FIG. 18B), it suggests that this deleterious effect is not a product of long exposure and subsequent cell senescence.

Example 49. Perturbation of Mitochondrial Membrane Potential

Following the observations that compound 2a decreases cellular respiration, the compound was further evaluated to determine how its exposure to cells affects mitochondrial membrane potential (MMP). Healthy mitochondria are heavily reliant on maintaining a homeostatic balance within the organelle. The REDOX transfer of electrons through ETC protein complexes I-IV in the inner mitochondria membrane provides the energy to drive protons against their concentration gradient across the inner mitochondrial membrane.[405-407] Therefore, loss in MMP would subsequently lead to loss in bioenergetic health, which would result in loss of ETC activity.

Figure 19A:
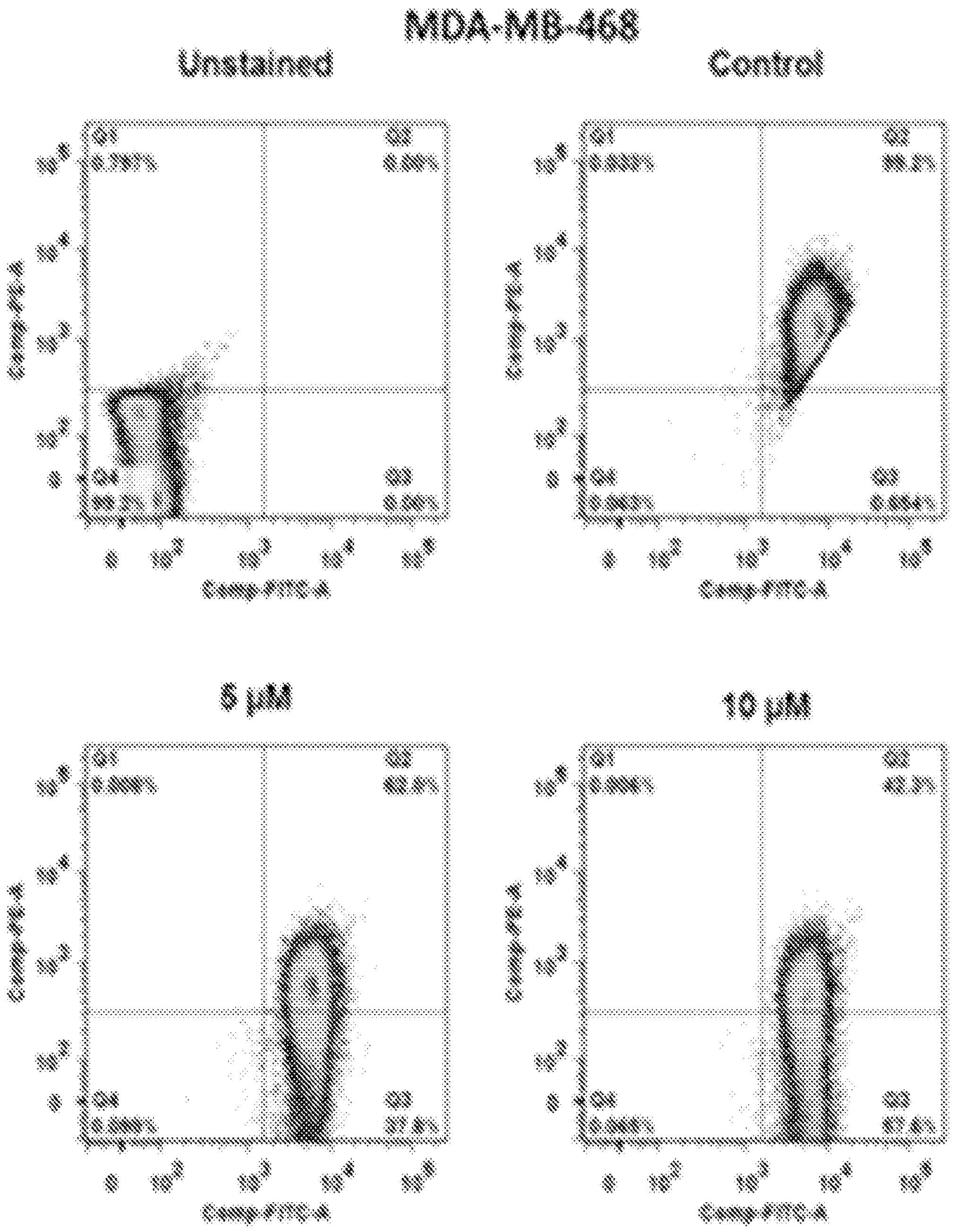
FIGS. 19A-19C include results of FACS analysis of MMP using JC-1 in MDA-MB-468. Loss of PE fluorescence (J-aggregates) was analyzed. Compensation was performed and held constant throughout the analysis.
Figure 19B:
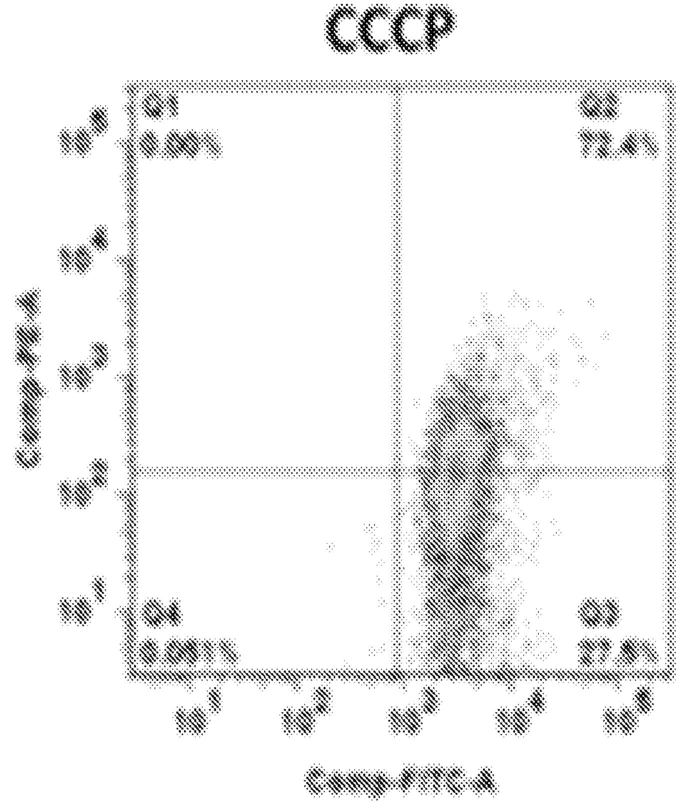
Figure 19C:
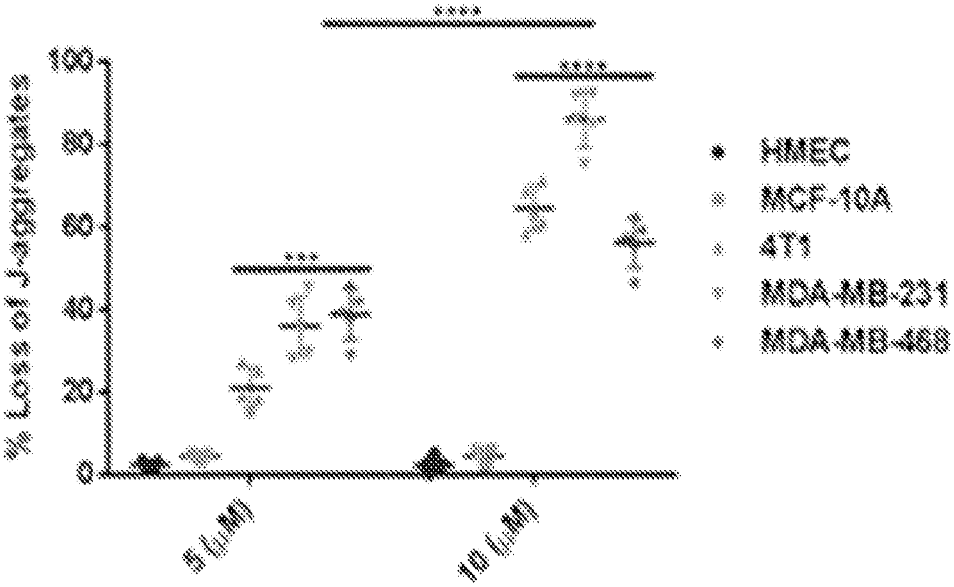

The MMP depolarizing effect on the panel of TBNCs and healthy models was examined with the use of flow assisted cell sorting (FACS) (FIG. 19A-C). JC-1 was used, a cationic, fluorometric dye that is dependent on the negative charge of the MMP. It is represented as J-aggregates (red fluorescence) when it accumulates into the mitochondria and J-monomers (green fluorescence) when it is located outside the mitochondrial membrane due to loss of the electrochemical gradient. Following extended treatment with 2a, a large decrease in mitochondrial membrane potential was observed (loss of PE when analyzed with flow cytometry) in MDA-MB-468 within 90 minutes of treatment (FIG. 19A) and MDA-MB-231 (data not shown). To validate the results, CCCP (5 μM, 1 hour) carbonyl cyanide m-chlorophenyl hydrazine, a classic uncoupler, was used (FIG. 19B). This compound rapidly induces MMP in TNBCs, up to 50% loss at 5 μM (MDA-MB-231, MDA-MB-468 and 4T1; FIG. 19C) and 60-95% loss (MDA-MB-231, MDA-MB-468 and 4T1; FIG. 19C) at 10 μM within just 90 minutes of treatment. Further investigation revealed a similar trend to the bioenergetic stress modelling. Even at concentrations as high as 10 μM, there was no significant observable loss in MMP in both HMEC and MCF-10A (FIG. 19C), illustrating high specificity towards mitochondrial dysfunction in cancer cell lines. With the MMP being a key driving force in regulation of mitochondrial metabolism, the perturbation is significant in further elucidating the mechanistic implications of this gold agent. Evidence suggests that the uncoupling of the MMP leads to acute cellular stress and cell death.

Example 50. Glycolytic Effect and Metabolic Reprogramming

Drawing back to the dependency of cancer cells on both aerobic glycolysis and cellular metabolism, fundamental changes in cellular response upon exposure to the gold agent were further studied. Based on the claim that these agents induce loss of mitochondrial respiration and subsequently loss of bioenergetics, the effect of 2a on glycolysis was analyzed, that is, both direct effects and induced effects after exposure.

Figure 20:
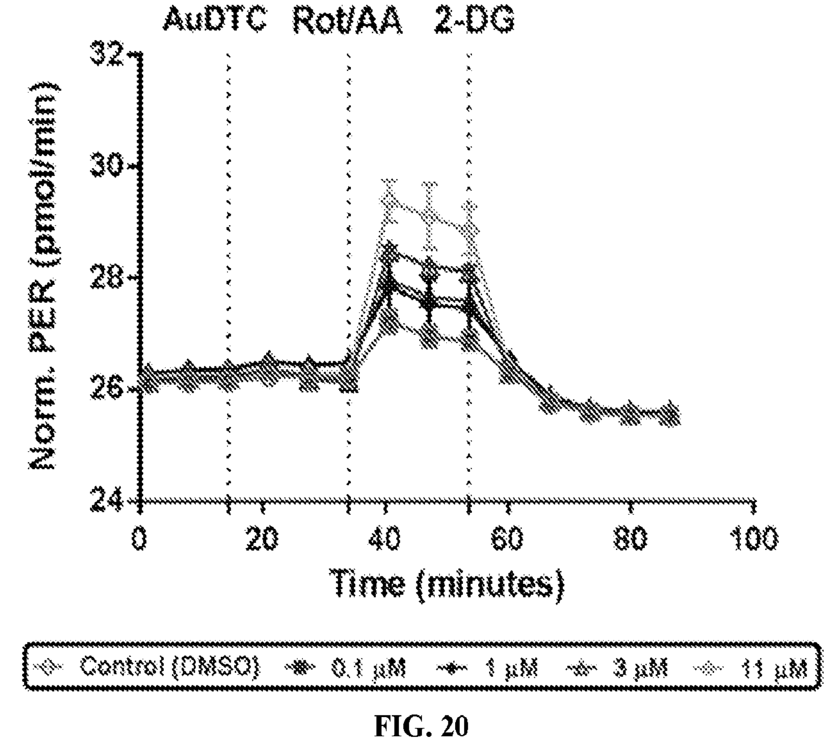
FIG. 20 includes the glycolytic rate of AuDTC after pneumatic injection in MDA-MB-231, a highly glycolytic cell line, in varying concentrations. PER was normalized per 1,000 cells. Data are plotted as the mean±s.e.m., n=8.

The glycolytic rate assay was first performed in MDA-MB-231, a classic TNBC cell line which has a higher dependency on glycolysis than OXPHOS for tumorigenesis (FIG. 20). Cells were incubated with the glycolytic rate assay medium, containing substrates that are useful for glycolysis (glutamine, glucose, and pyruvate) as well as HEPES buffer. The gold compound was pneumatically injected and the change in basal rates subsequently recorded. Next, OXPHOS inhibitors were injected to inhibit mitochondrial oxygen consumption and the rate of proton efflux from respiration (PER) calculated and removed from total PER to give the glycoPER.

Figure 21A:
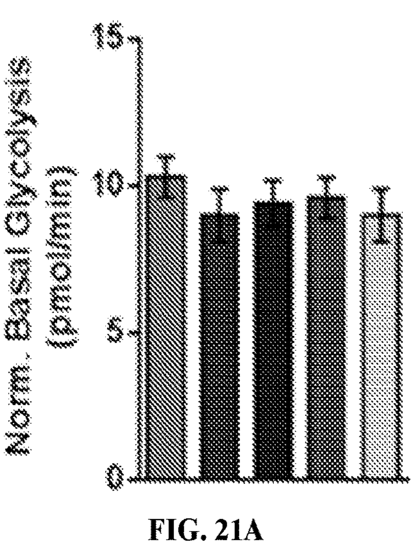
FIGS. 21A-21C include calculated parameters from normalized PER data presented in FIG. 19. Data was normalized per 1,000 cells before calculations. A) Basal glycolysis, time period between 2a and rotenone/antimycin a (Rot./AA), B) Compensatory glycolysis, time period from Rot/AA to 2-deoxyglucose (2-DG), C) mitoOCR/glycoPER ratio. Data are plotted as the mean±s.d., n=8. * $p<0.05$, ** $p<0.01$, by a Student's two-tailed t test in respect to the control.
Figure 21B:
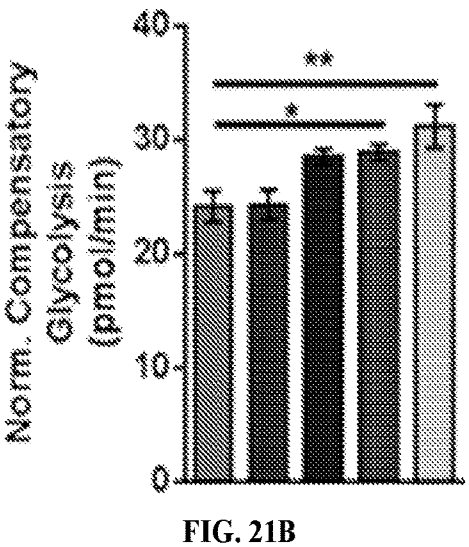

This injection is then followed by 2-deoxyglucose (2-DG) to block glycolytic acidification and confirm pathway specificity. This decrease then provides confirmation that the PER produced prior to the injection is due to glycolysis. Upon injection with the gold compound, no change was observed in the basal rate of PER (FIG. 21A), suggesting that this compound does not directly inhibit glycolysis. After injection of rotenone/antimycin A, a significant increase was observed in a concentration-dependent manner, which is recorded as compensatory glycolysis (FIG. 21B). At 3 μM, a 1.4-fold increase in glycoPER can be observed, followed by 1.7-fold increase at 11 μM (FIG. 21B). These data suggests that the gold compound does not directly affect glycolysis; however, a downstream effect is to shift the cellular metabolism to more glycolytic demand due to the loss in mitochondrial respiration mentioned before.

Figure 21C:
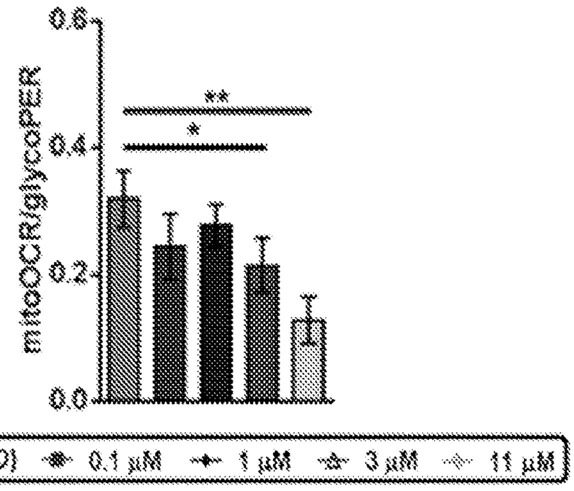
Figure 22:
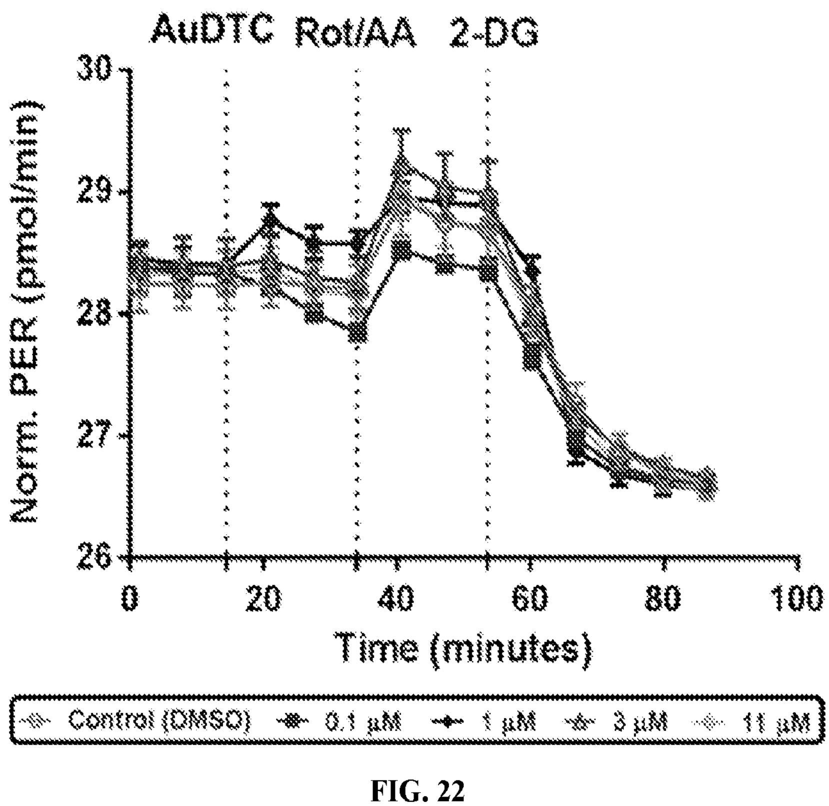
FIG. 22 includes glycolytic rate of 2a after pneumatic injection in HMEC, a normal human breast epithelial cell line, in varying concentrations. PER was normalized per 1,000 cells. Data are plotted as the mean±s.e.m., n=8.

The mitoOCR/glycoPER rate was compared (FIG. 21C), which exhibited a decrease in ratio as concentration of 2a increased. Importantly, the normal breast epithelial model, HMEC, was subjected to the same glycolytic stress test. No significant shift in metabolism was observed, suggesting that this compound does not alter OXPHOS and therefore no observed metabolic shift is observed (FIG. 22). This trend illustrates a metabolic shift to a more glycolytic dependency once the gold agent inhibits mitochondrial respiration. Taken together, this data exemplifies modulation of metabolism irrespective of distinct metabolic phenotype associated with cells and may have transformative outcomes for developing new therapeutics.

Figure 23:
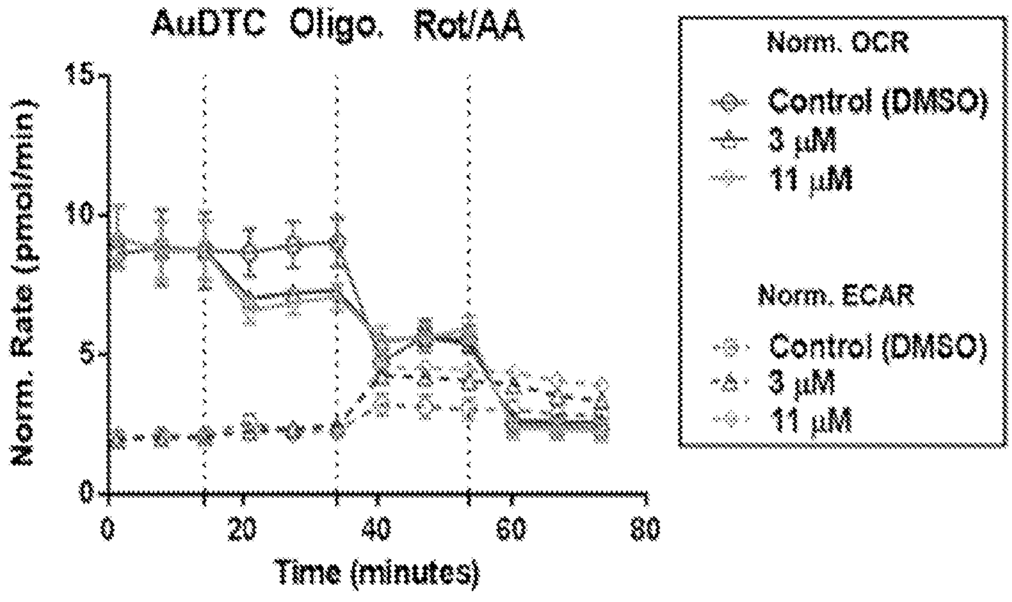
FIG. 23 includes real time ATP rate of AuDTC after pneumatic injection in MDA-MB-468. Solid lines represent flux in OCR (mitochondrial related ATP-mitoATP). Dashed lines represent flux in ECAR (glycolytic based ATP-glycoATP). OCR and ECAR rates were normalized per 1,000 cells. Data are plotted as the mean±s.e.m., n=8

To characterize cellular energy demands upon exposure to the gold agent AuDTC, the Seahorse XF analyzer was used to investigate ATP production rates linked to both glycolysis and mitochondrial metabolism in MDA-MB-468 (FIG. 23). This technology measures for the change in OCR and extra cellular acidification rate (ECAR) simultaneously. Basal rates are first analyzed, followed by injection of the gold agent, to analyze immediate shift in basal ATP rate production. This is followed by injection of oligomycin to inhibit OCR to allow characterization of the mitoATP rate. Complete shutdown of mitochondrial respiration allows for calculations of mitochondrial-related acidification, which when combined with PER data, allows for the calculation of the glycoATP rate. Upon pneumatic exposure to the gold agent in MDA-MB-468, within 20 minutes of injection, a decrease in basal mitoATP (represented by OCR) can be observed (FIG. 23, solid lines) followed by no change in glycoATP (represented by ECAR) (FIG. 23, dashed lines). This again signifies the selective perturbation of mitochondrial respiration over glycolysis upon exposure to the gold compound.

Figure 24:
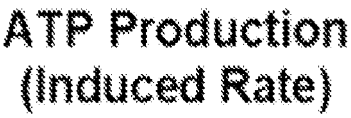
FIG. 24 includes mitochondrial and glycolytic ATP rates calculated from the real time ATP rate assay in MDA-MB-468. 0 μM represents 1% DMSO as the vehicle control. Normalized ATP rates induced after injection. ATP rates were normalized per 1,000 cells. Data are plotted as the mean±s.e.m., n=8.
Figure 24:
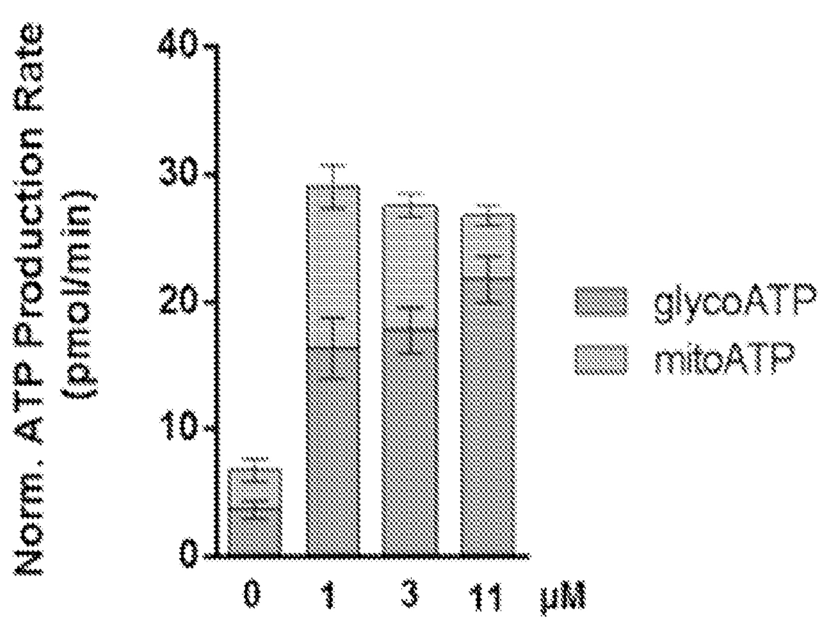

Quantifying these real-time ATP rate results shows a >10-fold induced rate of glycoATP coupled with loss of mitoATP, illustrating a metabolic shift towards glycolysis; a result which is indicative of a faulty ETC (FIG. 24). The data reveals that there while there is a loss in ATP from mitochondrial respiration, even at a concentration as low as 1 μM (FIG. 24).

Figure 25:
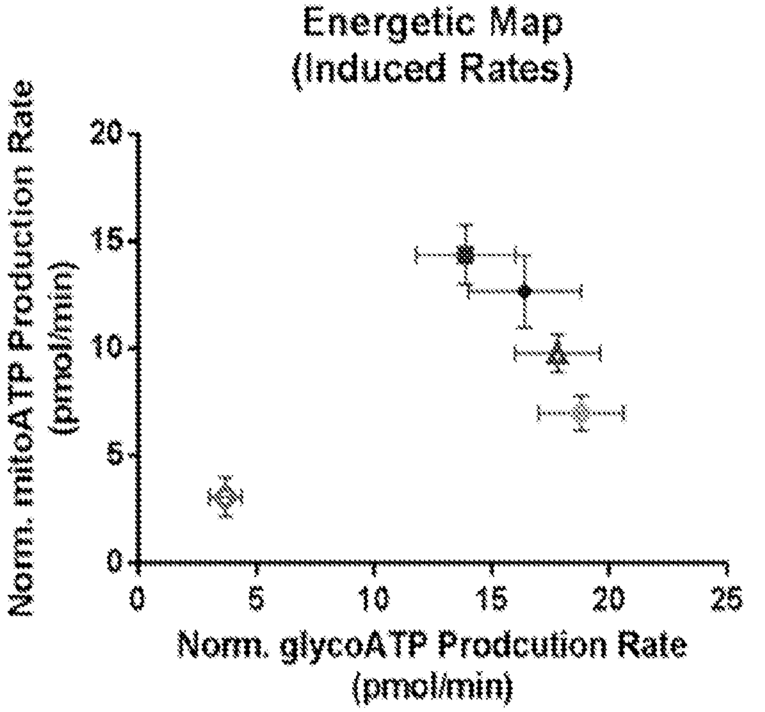
FIG. 25 includes a bioenergetic map of MDA-MB-468 after treatment with AuDTC. ATP rates are normalized per 1,000 cells. All rates plotted are induced rates.

Taken together, the glycolytic rate assay and ATP rate assay confirm in two independent manners that exposure to the gold agent induces a metabolic shift from mitochondrial metabolism to a glycolytic pathway (FIG. 25). This metabolic shift signifies a high dependence on functional mitochondria for proliferation and function, despite the acclaimed notion that cancer cells do not rely on OXPHOS for survival. This data gives strong evidence for gold complexes as selective modulators for bioenergetics, which can be useful in a clinical setting, given that conventional platinum-based drugs and hormonal therapies cannot treat these highly aggressive TNBCs.

Example 51. Induced Oxidative Stress and Damage

Figure 26A:
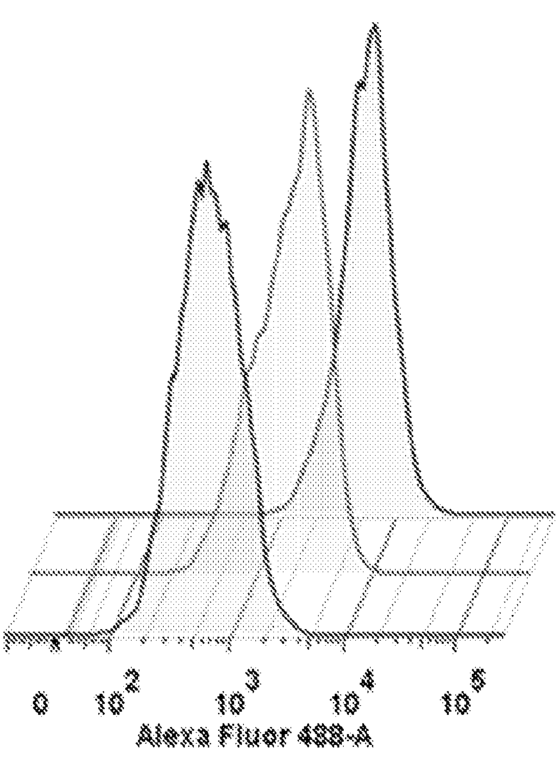
FIGS. 26A and 26B includes FACS histograms representing increase in ROS species in MDA-MB-468. Each histogram if representative of thee replicates.
Figure 26B:
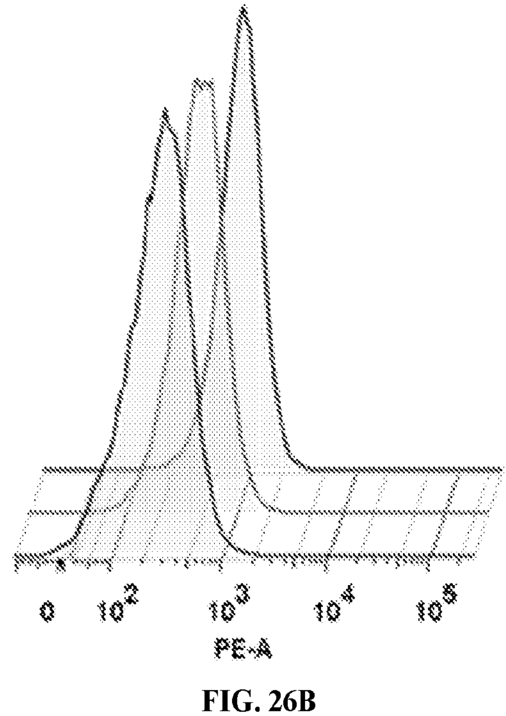

Reactive oxygen species are an integral part in maintaining cell homeostasis and are involved in a variety of cell signaling pathways. Innately, cells do require minimal amounts of ROS for proper function, however; increased amounts of ROS cause deleterious effects on cell proliferation and can ultimately lead to programmed cell death. With preceding data pointing to a loss of mitochondrial membrane potential and loss of cellular respiration, the effect of compound 2a was analyzed in the context of ROS production. First, the amount of ROS was analyzed by using DCF-DA, a fluorogenic dye, which is cleaved by intracellular esterases and subsequently oxidized by ROS species into a fluorescent molecule (FIG. 26A). A >4-fold shift of ROS was found upon treatment with the gold agent for 120 minutes at 5 μM and >6-fold increase at 10 μM in MDA-MB-468 (FIG. 26A). DCF-DA fluorescence was also measured in MDA-MB-231 and 4T1 to view the effect across a panel of TNBC cells (data not shown). This significant increase in ROS is attributed to loss of OXPHOS and a loss of a functional mitochondrial system. Second, to solidify the specificity of ROS, the use of MitoSOX was employed, which is a mitochondrial targeting dye that specifically reacts with superoxide. Mitochondrial ROS (mtROS) are a byproduct of the respiratory chain during OXPHOS. Furthermore, superoxide can be produced by a leaky ETC which can then be oxidized to $H_2O_2$, leading to an increase in mtROS fluorescence mentioned above. mtROS levels were then measured with the use of FACS as well in MDA-MB-468 (FIG. 26B). In all three TNBCs a significant increase of mtROS was produced at both 5 and 10 μM within only 120 minutes of treatment time (FIG. 26B). Further confirmation of mtROS production was done with the use of confocal microscopy. MtROS production was detected with the MitoSOX dye, MitoTracker Green FM, and Hoechst as counterstains (data not shown).

Figure 27:
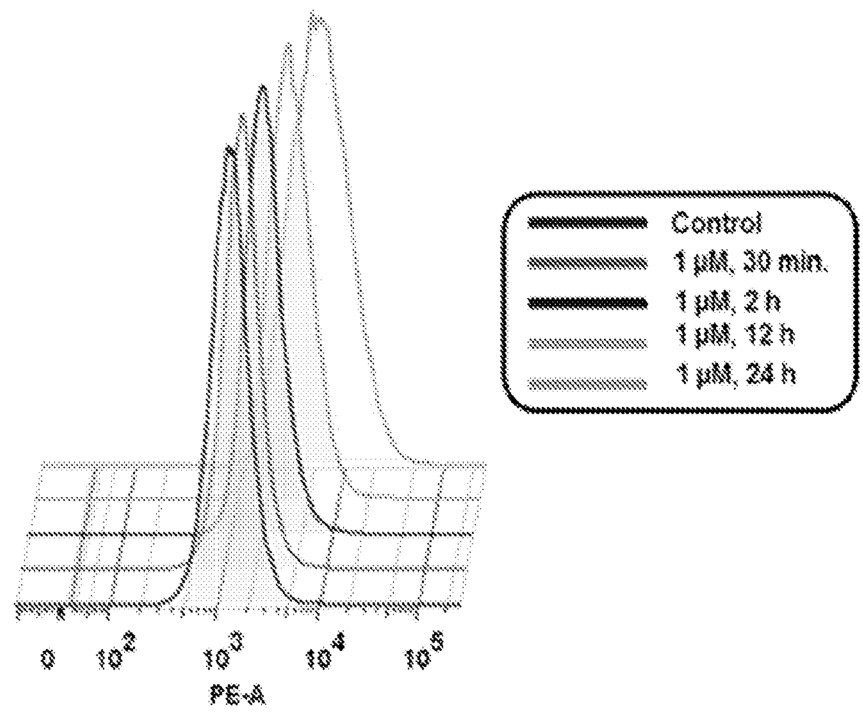
FIG. 27 includes mtROS levels in a time defendant manner in MDA-MB-468 after treatment with 2a (1 μM). Each histogram is representative of three replicates. Fluorescence was measured using the PE channel. Gated events were kept at 30,000 for each sample.

The treatment times adopted were to mimic the pneumatic injection method used when analyzing metabolic stress. However, the production of mtROS was evaluated in a time-dependent fashion, showing that at even a lower concentration of 1 μM there was initial increase in mtROS, followed by a steady increase with prolonged exposure (up to 24 hours) (FIG. 27). Time dependent analysis revealed that TNBCs were unable to alleviate the mtROS, thus signifying an increase in mitochondrial dysfunction.

Figure 28:
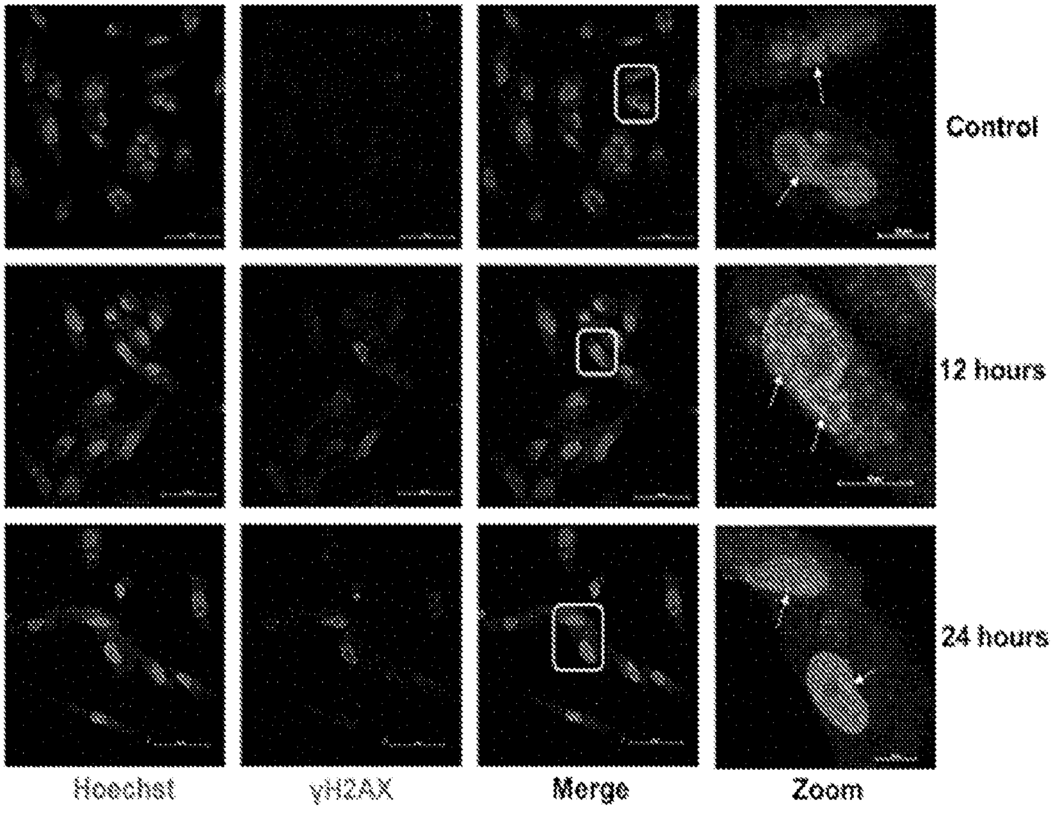
FIG. 28 includes results of confocal microscopy of MDA-MB-468 cells measuring increase in γH2AX foci at 12 and 24 hours of treatment with 2a. Left to right: Hoechst stain (nuclear counterstain), γH2AX (γH2AX primary with fluorescent secondary antibody), merge of Hoechst and γH2AX channels, and a zoomed view of individual cells from the merged panel. All images were taken using a 60× oil objective.

Although ROS is required for certain cell signaling pathways, the rapid increase will have harmful effects on mitochondrial function and overall cell health. These ROS species can directly interact with cellular components and induce deleterious effects including DNA damage, lipid peroxidation, and protein modifications. To analyze these downstream effects, the impact on γH2AX activation was assessed, which results from phosphorylation of the Ser-139 residue of the histone variant H2AX, in response to DNA damage. Given that these gold complexes are known to not directly interact with DNA and arrest cell cycle in the G1 phase, an increase of γH2AX was attributed to an increase in cellular ROS levels. With the use of immunocytochemistry, a persistent and significant increase in γH2AX levels was observed at both 12 hour and 24 hour time points upon exposure to the gold agent (5 μM) (FIG. 28).

Figure 29:
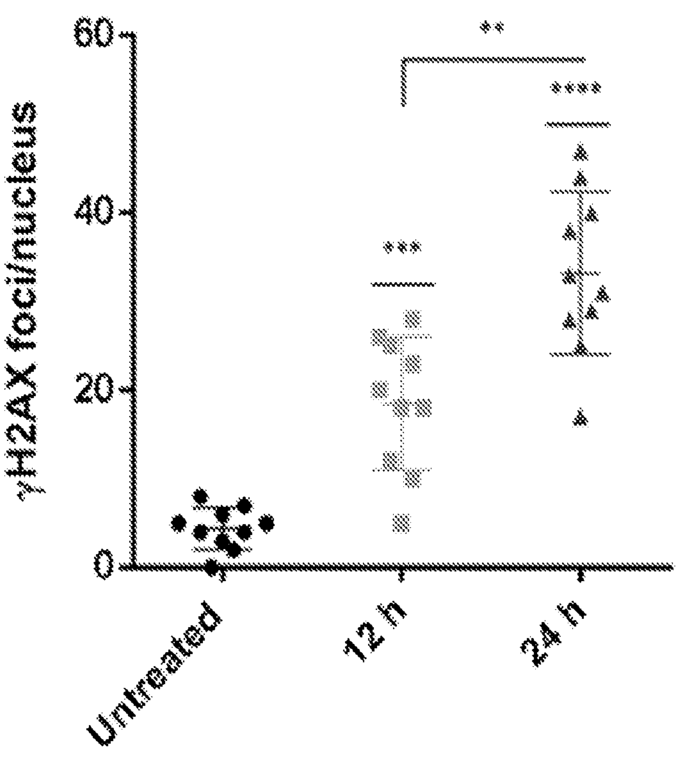
FIG. 29 includes results of measured γH2AX foci/nucleus from confocal microscopy images. 10 cells were chosen at random. Data are represented as the mean±s.d. Control (4.4±2.4 foci/nucleus), 12 hours (18.5±7.5 foci/nucleus) and 24 hours (33.2±9.2 foci/nucleus).  $p<0.01$, * $p<0.001$, **** $p<0.0001$, by a Student's two sided t test.

Images were taken using a 60× oil objective to visualize individual γH2AX foci within the nuclei. The cells were counterstained with Hoechst stain to show the overlay of γH2AX foci within the stained DNA. With the use of the Nikon-Elements software, a random section of nuclei (>10) were chosen for analysis and quantified. Prolonged exposure to the gold agent illustrated a significant increase between the 12-hour (18.5±7.5 foci/nucleus) and 24-hour (33.2±9.2 foci/nucleus) time points compared to the control (4.4±2.4 foci/nucleus) (FIG. 29). Given the rapid increase of non-specific ROS and specific mtROS, this result is not surprising.

Figure 30A:
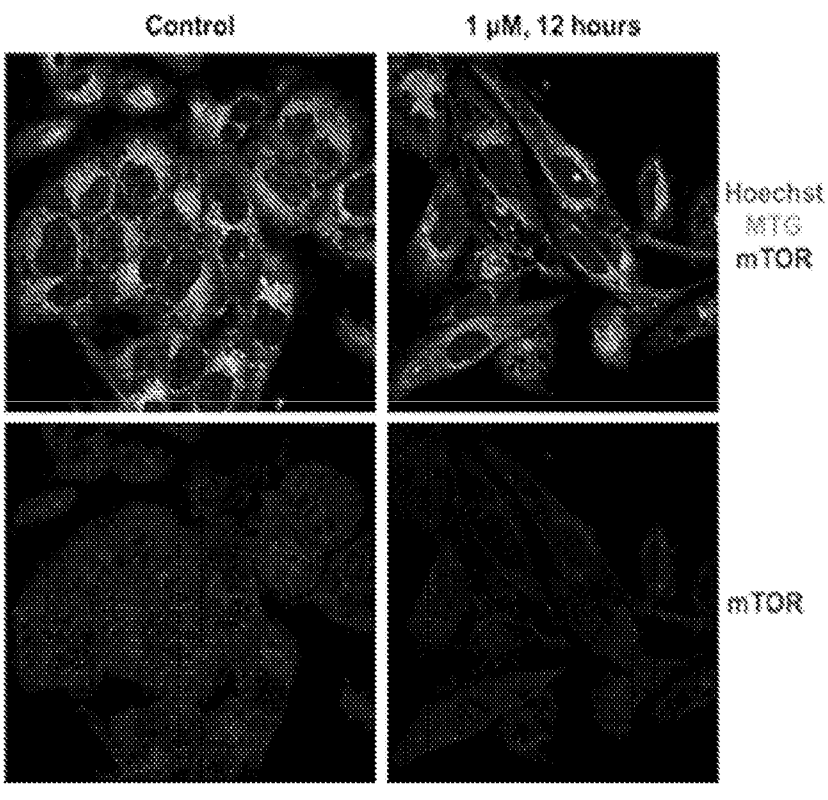
Figure 30B:
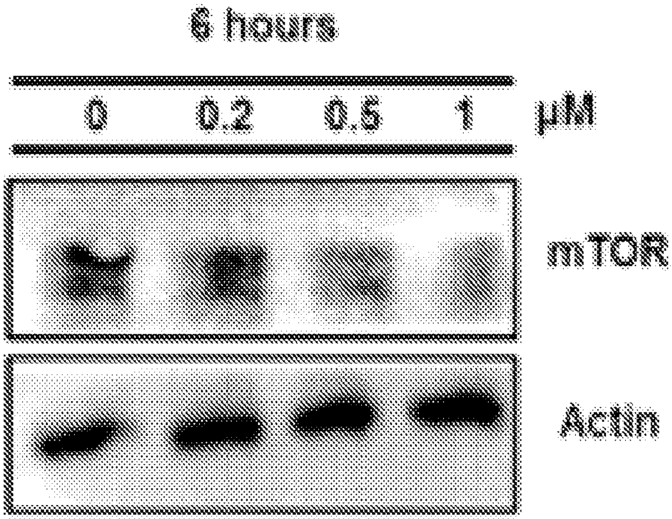

Next, oxidative stress was analyzed at the protein level by analyzing the loss of mTOR, a key regulatory protein in maintaining cell homeostasis and proliferation. Researchers have reported that loss of mTORC1 can be attributed to high levels of ROS and that ROS activates cytoplasmic ATM and AMPK, which both inhibit mTORC1. Therefore, it is worth investigating if exposure to the gold agent results in loss of this key regulatory protein. Using both confocal microscopy and immunoblotting, exposure to the gold agent was shown to result in a loss of mTOR. Confocal microscopy visually illustrated that MDA-MB-468 treated with the gold agent for 12 hours at 1 μM resulted in loss of mTOR (loss in red fluorescence) expression (FIG. 30A). Hoechst and MitoTracker Green FM were used as a counterstain. The loss of mTOR expression was confirmed by treating 4T1 in a concentration-dependent manner and analyzing protein content by immunoblotting (FIG. 30B). The loss of mTOR protein expression following exposure to AuDTC in a concentration-dependent manner was found to occur 6 hours after treatment. Altogether, the large effect of oxidative damage to the TNBCs illustrate significant changes in the mitochondrial environment. These drastic changes can be attributed to the alteration of bioenergetics and loss of a functional electron transport chain.

Example 52. Mitochondrial Specific Cytochrome C Release

Cytochrome c (Cyt c) is a prominent protein involved in cell regulation including the apoptotic pathway. Located in the mitochondrial intermembrane space, its classical function is to transfer electrons from the cytochrome c complex to cytochrome c oxidase which is located on the surface of the inner mitochondrial membrane. In recent years, researchers have found that cytochrome c can be released from the mitochondria upon exposure to apoptotic stimuli: depolarization of the MMP, ROS, and subsequent oxidative damage. Once released, cytochrome c can signal for caspase dependent apoptosis to promote cell death. Work by Korsmeyer gave insights into mechanistic implications of cytochrome c release which illustrate a BCL-2 regulated release. Further mechanistic insights show that opening of the mitochondrial permeability transition pore results in swelling of the mitochondrial matrix, rupture of the outer membrane, which then results in the release of the intermembrane components.

Figure 31:
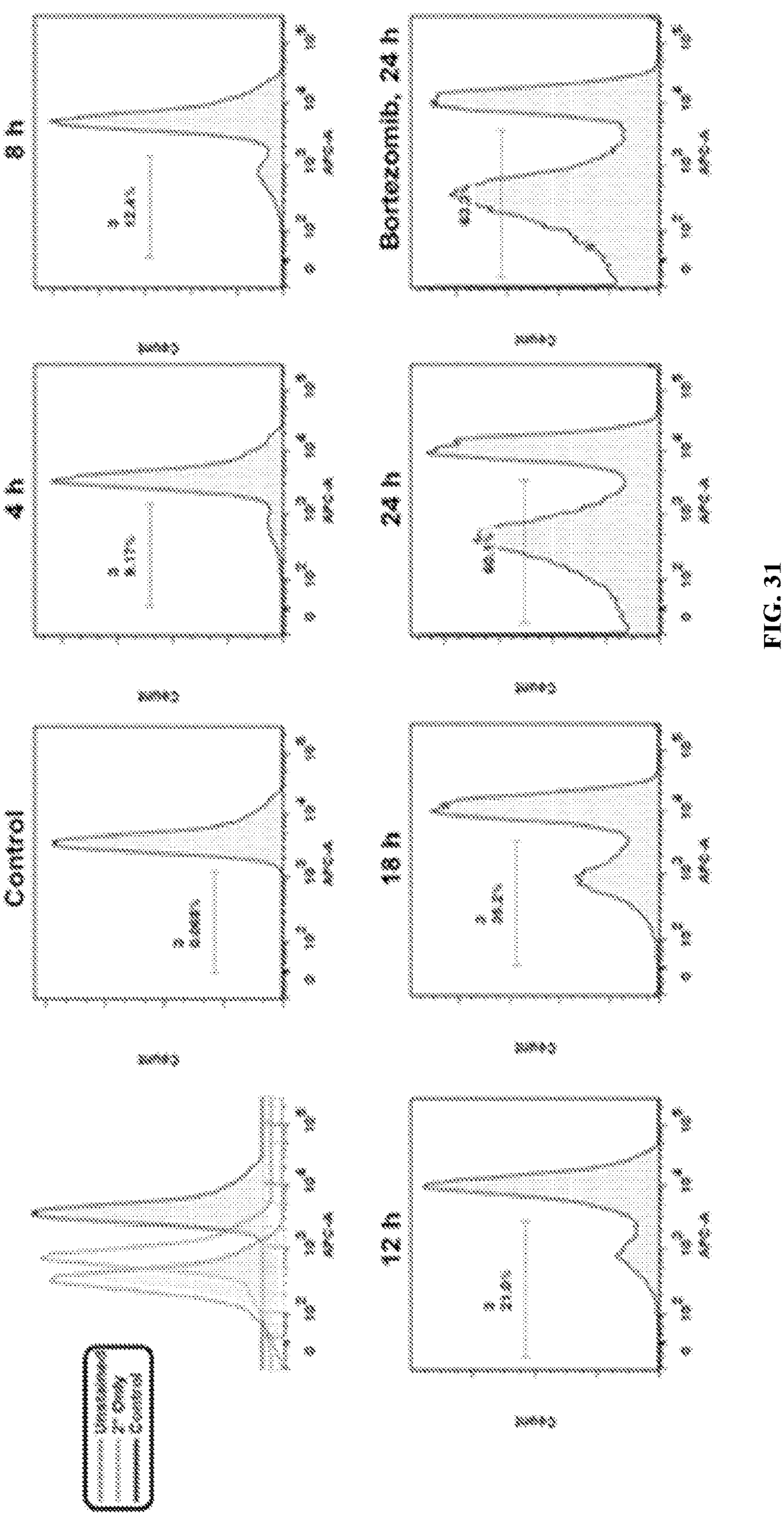
FIG. 31 includes results of mitochondrial specific cytochrome c release in MDA-MB-468 after treatment with 2a (1 μM). An unstained sample, and tagged secondary fluorescent antibody alone were used as controls. Time dependent cytochrome c release was measured using FACS (APC channel). Populations left of the control were considered to be positive for cytochrome c release. All histograms are representative of three replicates. Bortezomib was used as a positive control.
Figure 32:
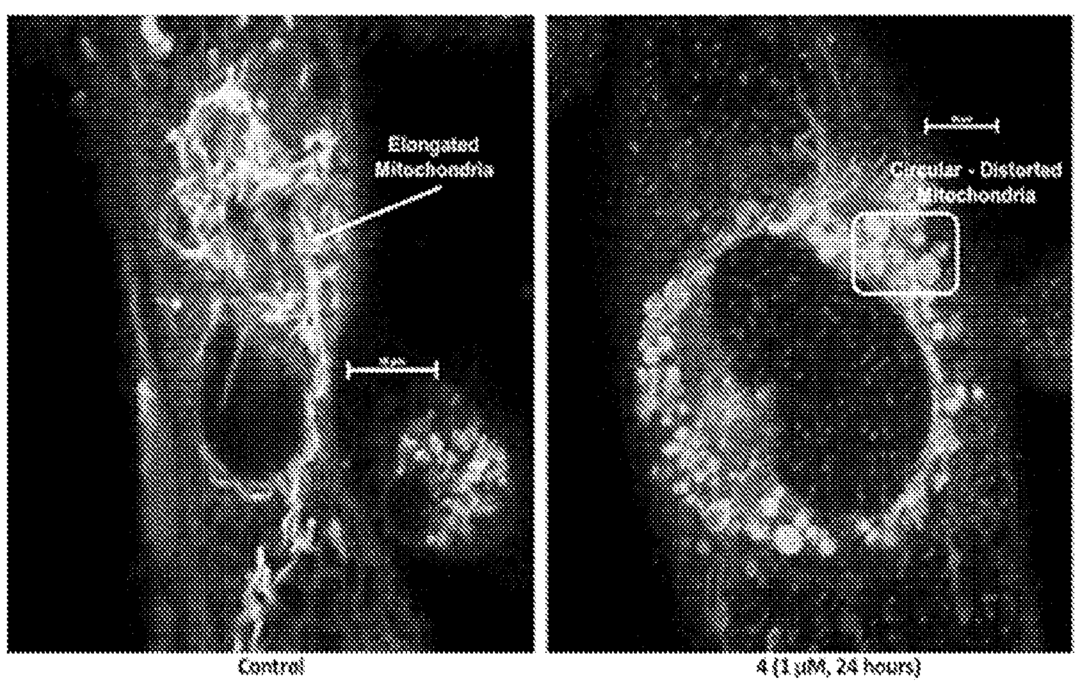
FIG. 32 includes results of confocal microscopy of mitochondrial cytochrome c release after exposure to 2a. Blue fluorescence (Hoechst stain for nuclear counter stain), green fluorescence (MitoTracker Green FM), and red fluorescence (cytochrome c primary antibody visualized with secondary fluorescent tagged antibody). Left panel, untreated MDA-MB-468 cells after plasma membrane permeabilization with digitonin. Right panel, treated MDA-MB-468 cells after permeabilization with digitonin.

It is also reasonable to suggest that loss in ETC function and stability would result in release of this protein as well. Given the findings, the release of mitochondrial specific cytochrome c was investigated in a time dependent manner. MDA-MB-468 cells were permeabilized with digitonin, a detergent which permeabilizes the plasma membrane, keeping healthy mitochondria intact. By doing so, cytosolic cytochrome c is released and therefore only mitochondrial related cytochrome c will be measured with immunohistochemistry. When MDA-MB-468 cells are exposed to 2a at 1 μM, a 9% release of mitochondrial cytochrome c was observed within 4 hours (FIG. 31). Time dependent analysis revealed an increase in release, resulting in >60% of mitochondrial cytochrome c being released in just 24 hours (FIG. 31). Bortezomib, a small molecule used to treat multiple myeloma and mantle cell lymphoma, was used as a positive control (FIG. 31). The release of cytochrome c was then visualized using confocal microscopy (FIG. 32). Using Hoechst as a counterstain, along with MitoTracker Green FM, a loss in colocalization of cytochrome c from the mitochondria was observed after the 24 hour treatment (FIG. 32, right panel) in comparison to the control (FIG. 32, left panel). Furthermore, upon analysis of the images, rounded, swollen mitochondria were observed with less branching in the 4 hour treatment sample when compared the vehicle control. This data suggests a loss in mitochondrial function and a shift towards a pro-fission state, which results in loss of membrane potential, loss of metabolic activity, and an overall increase in oxidative stress.[448] This rapid cytochrome c release may be a critical component for the onset of apoptosis and high in vitro cytotoxicity.

Example 53. MitoTEMPO Rescues Oxidative and Bioenergetic Stress

Characterization of chemotherapeutic effects in TNBCs points to widespread bioenergetics stress and oxidative damage. The effect on pre-treating these cells with MitoTEMPO, a mitochondrial targeting radical scavenger, as an antioxidant was analyzed next to see if these deleterious effects could be alleviated upon treatment with the gold agent 2a. Given the increased levels of mtROS and loss of ETC efficiency, MitoTEMPO was selected to alleviate mitochondrial based oxidative stress. Generally, TNBCs were pretreated with MitoTEMPO for 2 hours followed by treatment with the gold agent to see if oxidative stress could be mitigated.

Figure 33:
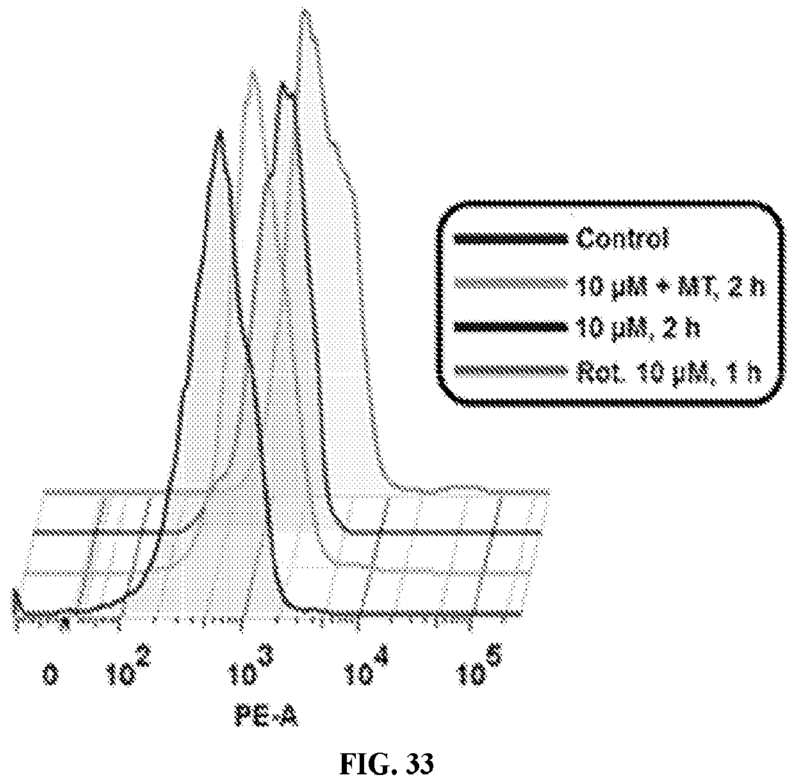
FIG. 33 includes results of mitochondrial specific ROS (mtROS) measured with MitoSOX via FACS (PE channel) in MDA-MB-468. Histograms are representative of three replicates. Red bar, control; orange bar, pretreatment with MitoTEMPO for 2 hours (1 μM) followed by treatment with 2a (10 μM, 2 hours); blue bar, treatment with 2a (10 μM, 2 hours); purple bar, a positive control rotenone (10 μM, 1 hour).

First, the effect of pre-treatment on mtROS production was examined using flow cytometry. Since MitoTEMPO is a specific scavenger for superoxide, the potential to alleviate mitochondrial oxidative damage was investigated by scavenging mtROS once produced. Pretreatment with MitoTEMPO resulted in 1.8-fold decrease in mtROS versus the non-pretreated group (FIG. 33). In this experiment, Rotenone, a mitochondrial complex I inhibitor, was used as a positive control. Having established that this pre-treatment condition resulted in loss of mtROS, the effect MitoTEMPO pretreatment had on alleviating other oxidative stresses was evaluated.

Figure 34:
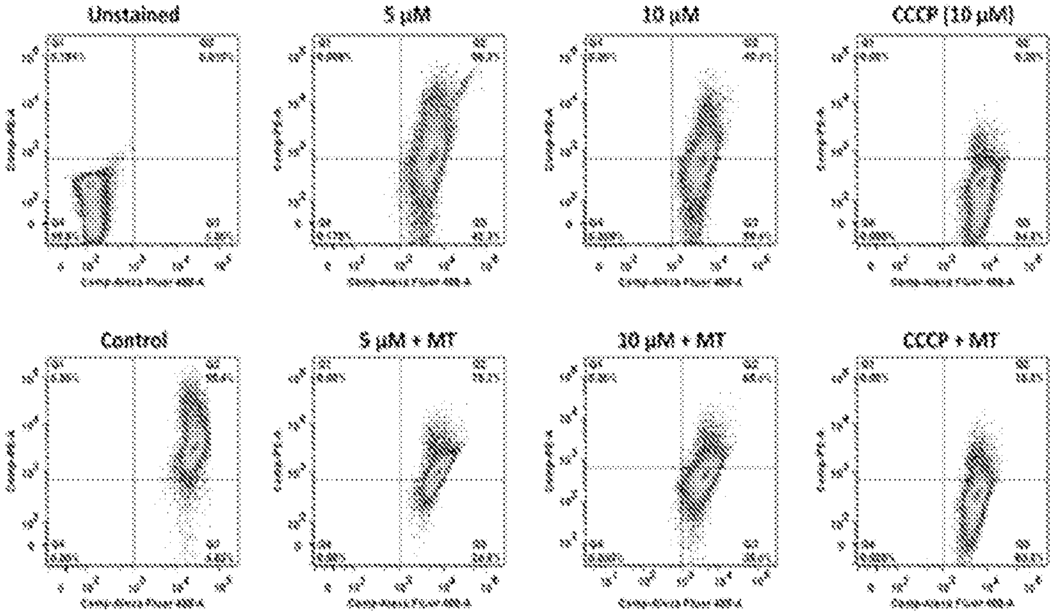
FIG. 34 includes results of mitochondrial membrane depolarization monitored by loss in PE (loss in J-aggregates) using FACS in MDA-MB-468. Plots are representative of 3 replicates. Unstained is shown for gating purposes. Cells were treated with 2a (5 and 10 μM, 90 minutes) and CCCP (10 μM, 90 minutes). Plots labelled with "MT" indicate pretreatment with MitoTEMPO (1 μM, 2 hours) prior to addition of 2a and CCCP. Gated events were kept at 30,000 for each sample.

Next, the effect of MMP was examined when pretreated with MitoTEMPO (1 μM, 2 hours) (FIG. 34). The same treatment times and conditions were used of the gold agent on MDA-MB-468 (5 and 10 μM) for 90 minutes (FIG. 34). At a concentration of 5 μM, an 18% decrease in MMP was observed, and at a concentration of 10 μM, a 24% decrease in MMP was observed. This rescue of MMP suggests that a significant portion of membrane depolarization is due to mtROS production. When CCCP was used as a control, only a small decrease from 95% to 84% was observed, suggesting that even though the gold agent and CCCP induce loss of MMP, it occurs through two distinct mechanisms (FIG. 34).

Figures 35A, 35B:
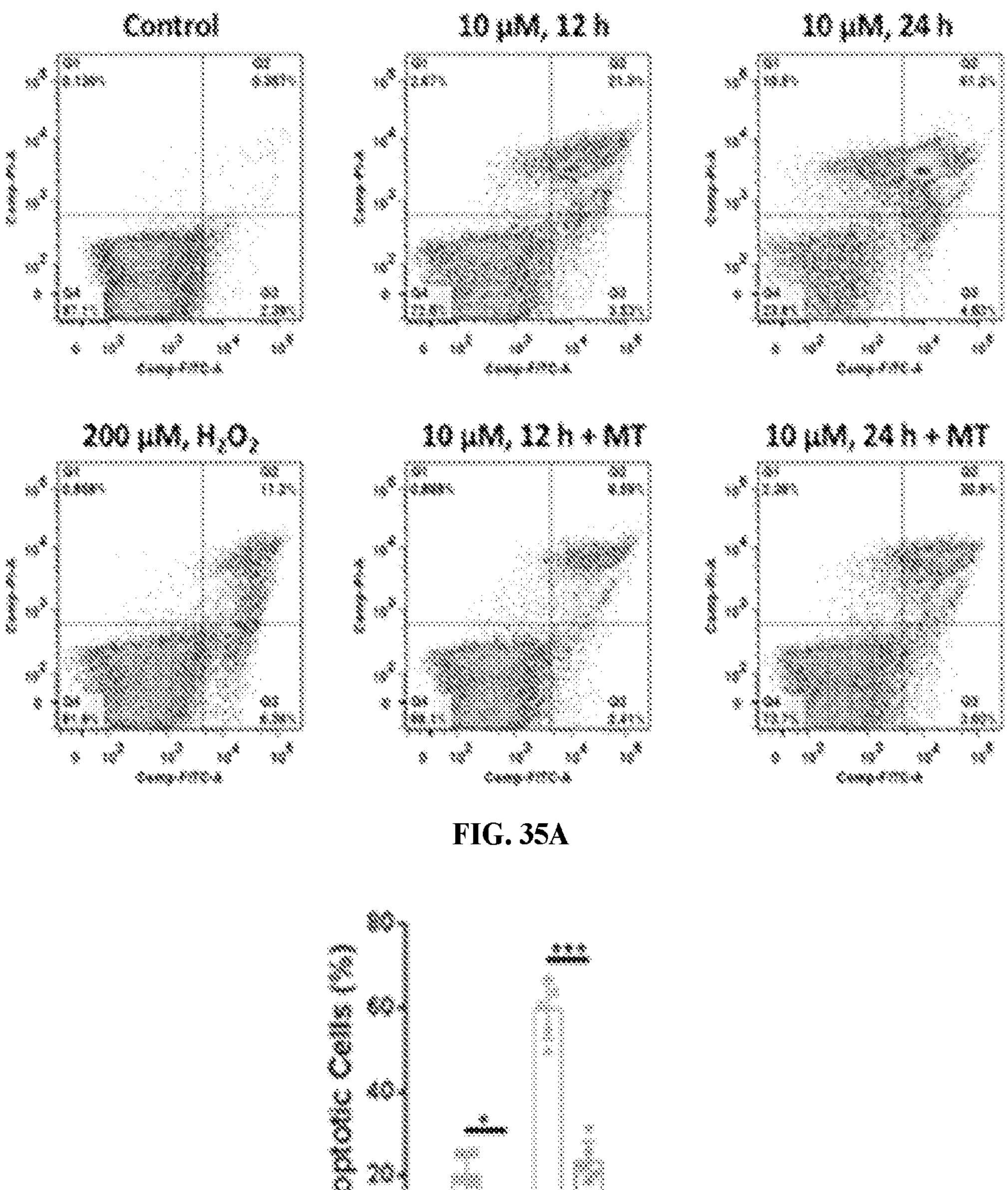
FIGS. 35A and 35B illustrate apoptosis of 2a in MDA-MB-468.

The extent to which apoptosis was rescued when pretreated with MitoTEMPO was analyzed (FIG. 35A-B). It was contemplated that a significant portion of apoptotic cells were signaled through the mtROS signaling pathway. MDA-MB-468 cells with MitoTEMPO were again pretreated for 2 hours at a concentration of 1 μM. Analysis revealed a significant decrease in apoptotic populations at both the 12 and 24 hour treatment conditions when exposed to the gold agent at 10 μM (FIG. 35A). This confirms that the mtROS is a critical factor in cell death. Pre-treatment with MitoTEMPO was able to alleviate apoptotic stress from a 12 hour incubation period (FIG. 35A-B).

Figure 36A:
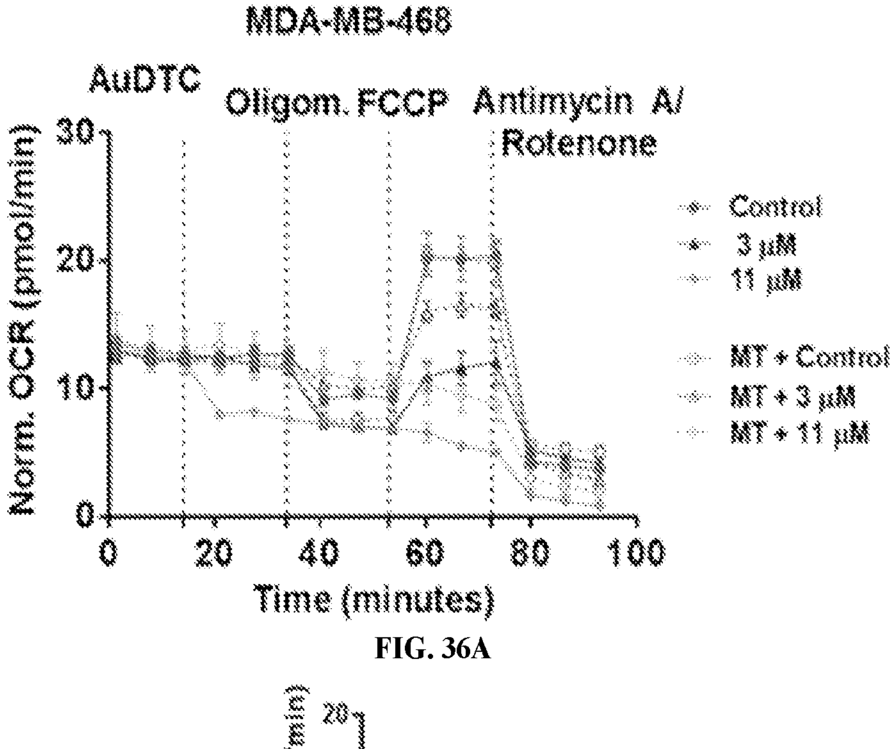
FIGS. 36A-36D include results of bioenergetics stress tests.
Figure 36B:
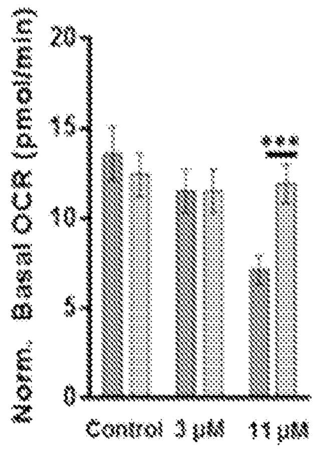
Figure 36C:
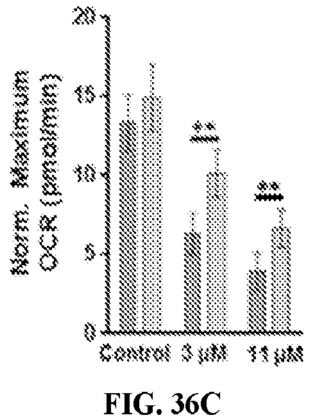
Figure 36D:
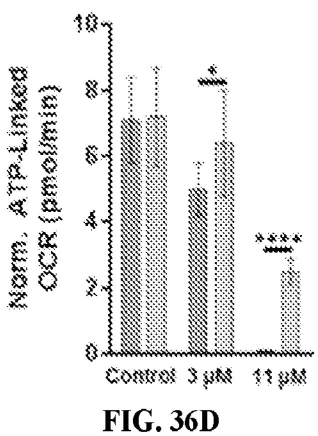

Finally, the effect pretreatment with MitoTEMPO had on total bioenergetic stress was analyzed. To do this, plated MDA-MB-468 cells were subjected with 2 hours of with MitoTEMPO pretreatment (1 μM, 2 hours). ADTC was pneumatically injected at higher concentrations to see if there was a pronounced effect in rescuing bioenergetic stress. Overall, MitoTEMPO was able to alleviate significant loss in OCR in comparison to the non-pretreated group (FIG. 36A). Even at an injection of 11 μM, basal OCR was rescued near to vehicle treated levels, with significant increase in OCR compared to the non-pretreated 11 μM (FIG. 36B). Furthermore, maximal OCR inhibition was significantly rescued by more than 35% in the 3 μM group and >20% in the 11 μM group, illustrating that the functional capacity of the cell could be rescued from mtROS scavenging (FIG. 36C). ATP-linked respiration was also significantly rescued in both pretreated groups, again illustrating the ability to rescue ETC function (FIG. 36D). These data represent a key dynamic of cell function upon exposure to AuDTC in that scavenging mtROS rescues bioenergetic health and ETC function. This provides a potential future template in clinical models, given that deleterious side effects of drug treatments can be mitigated with mtROS scavengers.

Example 54. Synthesis of dichloro(2-benzoylpyridine) gold(III)-alkyne ([C^N]-alkyne)

[2-benzoylpyridine]Au(III)$Cl_2$ (100 mg, 0.22 mmol) and o-2-propynylhydroxylamine hydrochloride (40 mg, 0.42 mmol) were suspended in DCM/MeOH (1:1) at a total volume of 6 mL and stirred at room temperature for 48 hours. The resulting mixture was transferred into a centrifuge tube and centrifuged briefly to separate the precipitate from the filtrate. The filtrate was removed by decanting and the precipitate was washed by resuspending it in equal volume of DCM/MeOH (1:1), centrifuged, and the filtrate decanted. The wash step was carefully done three times after which the precipitate was finally dissolved in DCM and dried under vacuum (40° C.) to afford an off-white, solid. Yield (46%, 52 mg). $^1H$ NMR (400 MHz, DMSO-$d_6$) δ=9.34 (d, J=6.3 Hz, 1H), 8.47 (td, J=7.8, 1.5 Hz, 1H), 8.32-8.27 (m, 1H), 7.97-7.89 (m, 1H), 7.54 (d, J=9.0 Hz, 1H), 7.41-7.27 (m, 3H), 5.02 (d, J=2.4 Hz, 2H), 3.67 (t, J=2.4 Hz, 1H). $^{13}C$ NMR (101 MHz, DMSO-$d_6$) δ=153.25, 143.68, 137.88, 133.77, 130.45, 129.16, 128.91, 128.23, 79.59, 79.37, 63.72.

Example 55. Synthesis of 4-alkyne

A suspension of [C^N]-alkyne (10 mg, 0.02 mmol) in MeOH (5 mL) was added dropwise a solution of sodium dimethyldithiocarbamate (4.1 mg, 0.024 mmol) in 2 mL of MeOH. The suspension slowly turned to a yellow, clear solution and was allowed to mix for 12 hours at room temperature. A saturated solution of $NaPF_6$ in DI $H_2O$ was prepared and added to the solution to precipitate a beige powder, which was vacuum filtered, washed with excess water and ether, and left to dry in air. Yield (79%, 10 mg). $^1H$ NMR (400 MHz, MeCN-$d_3$) δ=8.87 (d, J=4 Hz, 1H), 8.32 (t, J=8 Hz, 2H), 7.69 (q, J=10 Hz, 1H), 7.59 (d, J=8 Hz, 1H), 7.41 (q, J=9.0 Hz, 2H), 7.27 (d, J=8 Hz, 1H), 4.78 (s, 2H), 3.36 (d, J=4 Hz, 6H), 2.58 (t, J=10 Hz, 1H). $^{13}C$ NMR (101 MHz, MeCN-$d_3$) δ=153.25, 143.68, 137.88, 133.77, 130.45, 129.16, 128.91, 128.23, 79.59, 79.37, 63.72. $^{19}F$ NMR (376 MHz, MeCN-$d_3$) δ=−71.8, −73.2. $^{31}P$ NMR (162 MHz, MeCN-$d_3$) δ=−130.85, −135.24, −139.63, −144.02, −148.41, −157.20.

Example 56. In Vitro Click Chemistry and Colocalization

Figure 37:
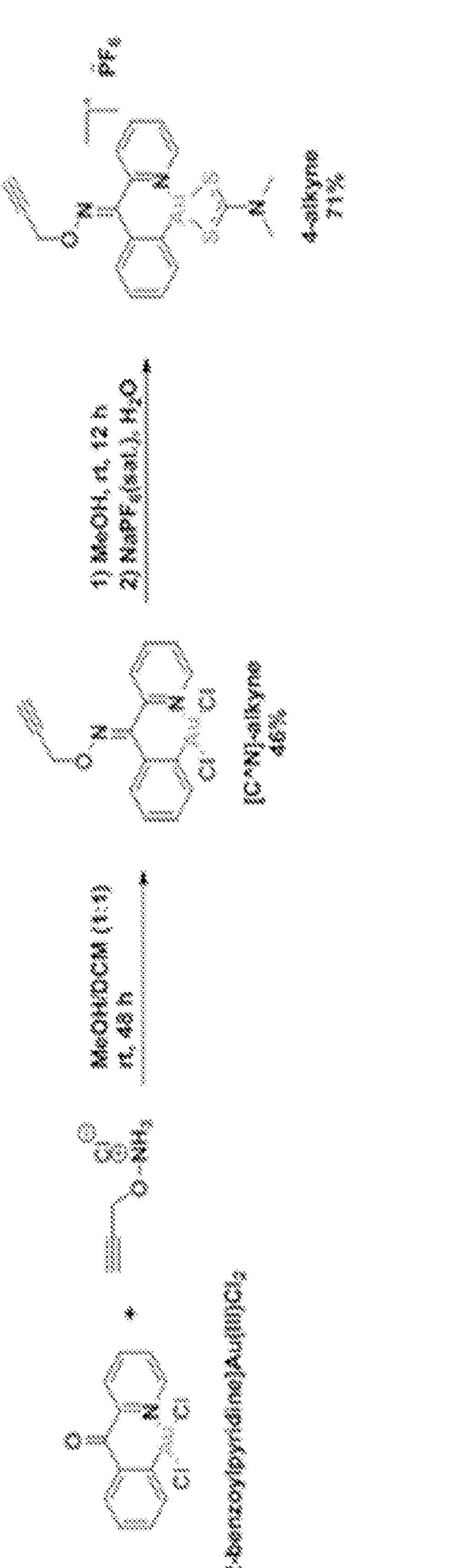
FIG. 37 includes synthetic methodology to achieve an alkyne-functionalized probe of 2a (4-alkye).
Figure 38:
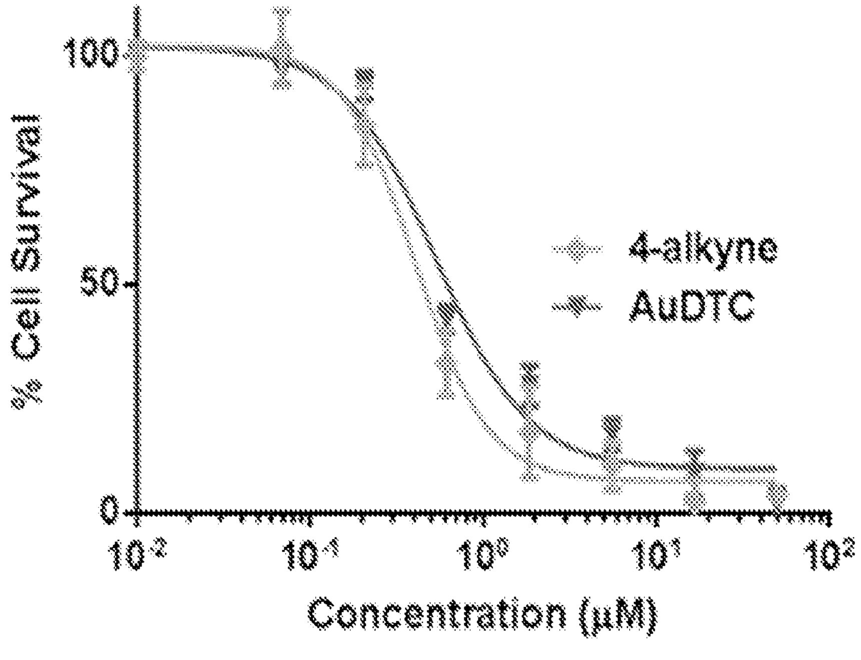
FIG. 38 includes cCell viability of 4-alkyne compared to 2a, in MDA-MB-231 over 72 hours. IC50 values are 0.53±0.04 for 4-alkyne and 0.77±0.12 for 2a. Data are plotted as the mean±s.e.m., (n=3).

To further elucidate the targeting modality of 2a, a synthetic probe was developed with a free alkyne attached to be used as a clickable probe. The 2-benzoylpyridine framework of the cyclometalated gold was chemically transformed by reacting with o-2-propynylhydroxylamine hydrochloride to form an alkoxy imine with an alkyne handle. Replacement of the labile chloride ligands with the sodium salt of dimethyldithiocarbamate provided an alkyne modified version of 2a (4-alkyne) (FIG. 37). In vitro cytotoxicity of 4-alkyne in MDA-MB-468 revealed no loss in efficacy compared to the original organometallic gold(III) compound (FIG. 38).

Figure 39:
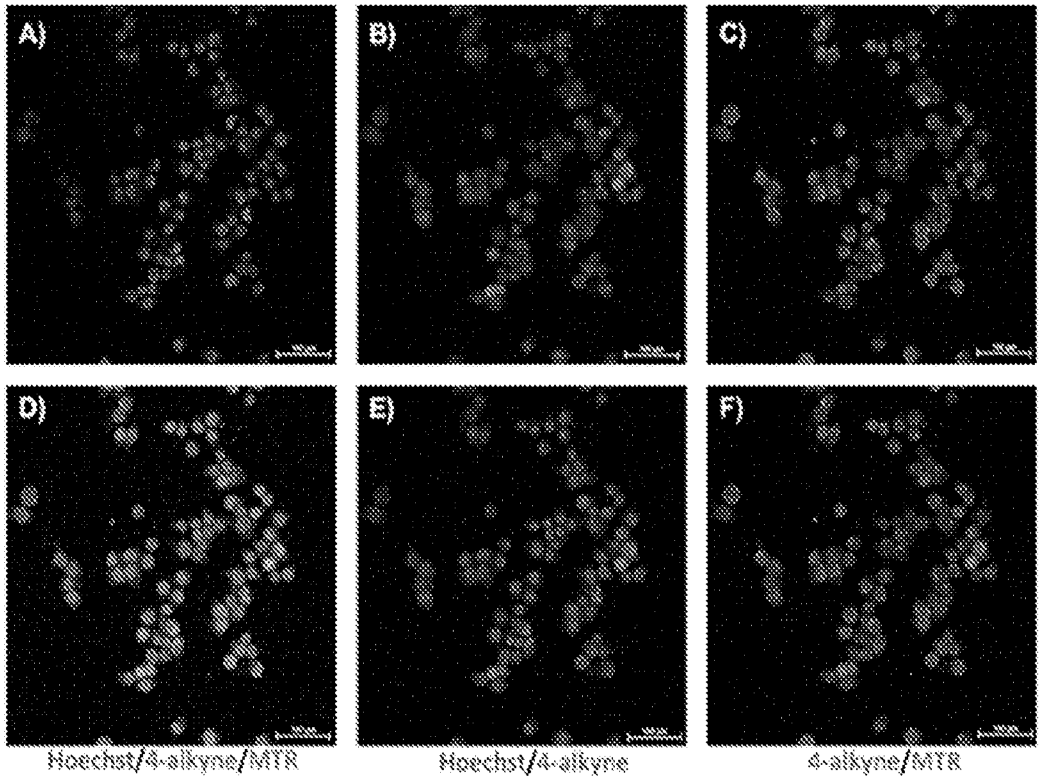
FIG. 39 includes click chemistry visualized with confocal microscopy in MDA-MB-468. Cells were treated for 50 μM for 1 hour. Panels: A) Hoechst as the nuclear counterstain, B) 4-alkyne-Alexa Fluor 488 azide adduct, C) MitoTracker Red CM-$H_2$XRos (MTR) alone, D) Merge of all three channels, E) Merge of Hoechst and 4-alkyne, F) Merge of 4-alkyne and MTR.

With this new tool in hand, in vitro click chemistry was performed with an azide fluorophore and counterstain with MitoTracker Red CM-$H_2$XRos (MTR) to see the correlation between the two dyes. For this study, Alexa488-azide was used as the click counterpart and MitoTracker Red CM-$H_2$XRos for mitochondrial tracking along with Hoechst as a nuclear counterstain (FIG. 39). Proper control experiments were performed by using Hoechst/MTR with only Alexa Fluor 488-azide without 4-alkyne, as well as Hoechst/MTR treated with 4-alkyne but no Alexa Fluor 488-azide to ensure that all recorded fluorescence was from the in situ generated click adduct. Treatment was performed at varying concentrations (2, 25, and 50 μM (FIG. 39, 50 μM is shown). In FIG. 39, panels A-C represent the individual laser channels. After treatment with 4-alkyne and subsequent click chemistry, the localization of 4-alkyne within the intracellular components was able to be clearly visualized via confocal microscopy. Panel D represents a merge of all three respective channels, showing a complete overview of fluorescence. Panel E illustrates only the nuclear counterstain along with the 4-alkyne-Alexa Fluor 488 adduct. This image shows little to no colocalization between 4-alkyne and the nucleus. Given that this compound does not directly interact with DNA, this is not surprising. Finally, FIG. 39, panel F represents the 4-alkyne-Alexa Fluor 488 adduct with the MTR stain. Beneficially, a large amount of orange to yellow fluorescence overlap was found, which is indicative of colocalization between the two fluorophores. This prompted a Pearson's Correlation to evaluate the extent of colocalization.

Figure 40A:
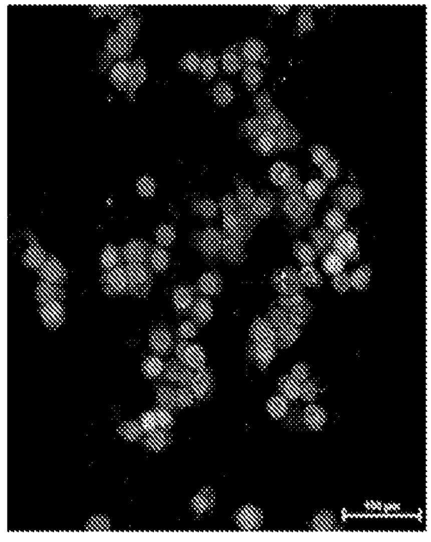
FIGS. 40A and 40B include results of colocalization of 4-alkyne and the MitoTracker Red dye.
Figure 40B:
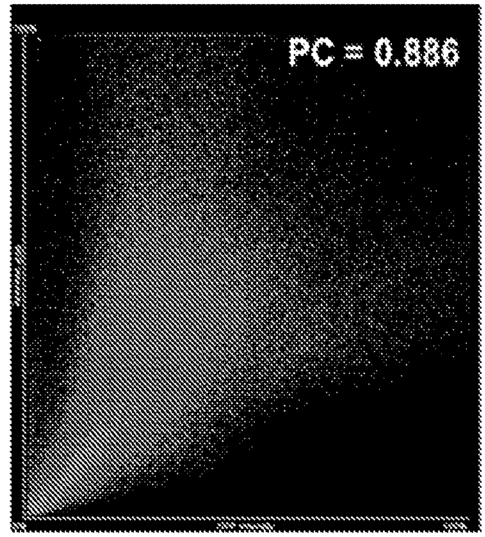

Colocalization studies revealed that a large amount of 4-alkyne was colocalized with the red fluorescence from the MTR dye (FIG. 40A). Subsequent evaluation with Pearson's coefficient gave a correlative value of 0.886 between the green and red channels (FIG. 40B). A higher magnification reveals loss in mitochondrial shape and size coupled with localization of 4-alkyne (data not shown). Comparison of the blue (Hoechst) and 4-alkyne (green) channels show no colocalization of the gold compound with the nucleus. The lack of colocalization within the nucleus suggests that all γH2AX observed is a result of oxidative DNA damage due to ROS production and dysfunctional ETC. Overall, this experimental design not only sets a premise for clickable gold agents that can be monitored in vitro, but also visual proof of interactions between 4-alkyne and the mitochondria. Combined with the aforementioned data, this helps validate that this class of gold agents selectively target the mitochondria.

All publications, patents, and patent applications mentioned in this specification are herein incorporated by reference to the same extent as if each individual publication, patent, or patent application was specifically and individually indicated to be incorporated by reference, including the references set forth in the following list:

REFERENCES

1. De Palma, M.; Hanahan, D., The biology of personalized cancer medicine: facing individual complexities underlying hallmark capabilities. *Mol Oncol.* 2012, 6 (2), 111-127.
2. Hanahan, D.; Weinberg, R. A., The Hallmarks of Cancer. *Cell* 2000, 100 (1), 57-70.
3. Hanahan, D. a. W., R. A., Biological Hallmarks of Cancer. In *Holland-Frei Cancer Medicine,* 2017; pp 1-10.
4. Hearn, J. M.; Romero-Canelón, I.; Munro, A. F.; Fu, Y.; Pizarro, A. M.; Garnett, M. J.; McDermott, U.; Carragher, N. O.; Sadler, P. J., Potent organo-osmium compound shifts metabolism in epithelial ovarian cancer cells. *PNAS* 2015, 112 (29), E3800-E3805.
5. Soldevila-Barreda, J. J.; Sadler, P. J., Approaches to the design of catalytic metallodrugs. *Curr. Opin. in Chem. Bio.* 2015, 25, 172-183.
6. Liu, Z.; Romero-Canelon, I.; Qamar, B.; Hearn, J. M.; Habtemariam, A.; Barry, N. P. E.; Pizarro, A. M.; Clarkson, G. J.; Sadler, P. J., The potent oxidant anticancer activity of organoiridium catalysts. *Angew. Chem. Int. Ed. Engl.* 2014, 53 (15), 3941-3946.
7. Vander Heiden, M. G.; Cantley, L. C.; Thompson, C. B., Understanding the Warburg effect: the metabolic requirements of cell proliferation. *Science* 2009, 324 (5930), 1029-1033.
8. Liberti, M. V.; Locasale, J. W., The Warburg Effect: How Does it Benefit Cancer Cells? *Trends. Biochem. Sci.* 2016, 41 (3), 211-218.
9. Hamilton, E.; Fennell, M.; Stafford, D. M., Modification of Tumour Glucose Metabolism for Therapeutic Benefit. *Acta Oncol.* 1995, 34 (3), 429-433.
10. Choi, S.-C.; Titov, A. A.; Abboud, G.; Seay, H. R.; Brusko, T. M.; Roopenian, D. C.; Salek-Ardakani, S.; Morel, L., Inhibition of glucose metabolism selectively targets autoreactive follicular helper T cells. *Nat. Comm.* 2018, 9 (1), 4369.

11. Ashton, T. M.; McKenna, W. G.; Kunz-Schughart, L. A.; Higgins, G. S., Oxidative Phosphorylation as an Emerging Target in Cancer Therapy. *Clin. Can. Res.* 2018, 24 (11), 2482.

12. Porporato, P. E.; Filigheddu, N.; Pedro, J. M. B.-S.; Kroemer, G.; Galluzzi, L., Mitochondrial metabolism and cancer. *Cell Res.* 2018, 28 (3), 265-280.

13. Chen, J.; Wang, Z.; Zou, T.; Cui, J.; Yin, J.; Zheng, W.; Jiang, W.; Zhou, H.; Liu, Z., Pharmacogenomics of platinum-based chemotherapy response in NSCLC: a genotyping study and a pooled analysis. *Oncotarget* 2016, 7 (34), 55741-55756.

14. Kelland, L., The resurgence of platinum-based cancer chemotherapy. *Nat. Rev. Cancer* 2007, 7 (8), 573-584.

15. Einhorn, L. H., Treatment of testicular cancer: a new and improved model. *Journal of Clin. Oncol.* 1990, 8 (11), 1777-1781.

16. Matsuo, K.; Lin, Y. G.; Roman, L. D.; Sood, A. K., Overcoming platinum resistance in ovarian carcinoma. *Expert Opin. Investig. Drugs* 2010, 19 (11), 1339-1354.

17. Pokhriyal, R.; Hariprasad, R.; Kumar, L.; Hariprasad, G., Chemotherapy Resistance in Advanced Ovarian Cancer Patients. *Biomark Cancer* 2019, 11, 1179299X19860815-1179299X19860815.

18. Mehmood, R. K., Review of Cisplatin and oxaliplatin in current immunogenic and monoclonal antibody treatments. *Oncol. Rev.* 2014, 8 (2), 256-256.

19. Romero-Canelón, I.; Sadler, P. J., Next-Generation Metal Anticancer Complexes: Multitargeting via Redox Modulation. *Inorg. Chem.* 2013, 52 (21), 12276-12291.

20. Hambley, T. W., Metal-Based Therapeutics. *Science* 2007, 318 (5855), 1392.

21. Felson, D. T.; Anderson, J. J.; Meenan, R. F., The comparative efficacy and toxicity of second-line drugs in rheumatoid arthritis results of two metaanalyses. *Arthritis & Rheum.* 1990, 33 (10), 1449-1461.

22. Chaffman, M.; Brogden, R. N.; Heel, R. C.; Speight, T. M.; Avery, G. S., Auranofin. A preliminary review of its pharmacological properties and therapeutic use in rheumatoid arthritis. *Drugs* 1984, 27 (5), 378-424.

23. Fiskus, W.; Saba, N.; Shen, M.; Ghias, M.; Liu, J.; Gupta, S. D.; Chauhan, L.; Rao, R.; Gunewardena, S.; Schorno, K.; Austin, C. P.; Maddocks, K.; Byrd, J.; Melnick, A.; Huang, P.; Wiestner, A.; Bhalla, K. N., Auranofin Induces Lethal Oxidative and Endoplasmic Reticulum Stress and Exerts Potent Preclinical Activity against Chronic Lymphocytic Leukemia. *Cancer Res.* 2014, 74 (9), 2520.

24. Barnard, P. J.; Berners-Price, S. J., Targeting the mitochondrial cell death pathway with gold compounds. *Coord. Chem. Rev.* 2007, 251 (13), 1889-1902.

25. Tong, K.-C.; Lok, C.-N.; Wan, P.-K.; Hu, D.; Fung, Y. M. E.; Chang, X.-Y.; Huang, S.; Jiang, H.; Che, C.-M., An anticancer gold(III)-activated porphyrin scaffold that covalently modifies protein cysteine thiols. *PNAS* 2020, 117 (3), 1321.

26. Pia Rigobello, M.; Messori, L.; Marcon, G.; Agostina Cinellu, M.; Bragadin, M.; Folda, A.; Scutari, G.; Bindoli, A., Gold complexes inhibit mitochondrial thioredoxin reductase: consequences on mitochondrial functions. *J. Inorg. Biochem.* 2004, 98 (10), 1634-1641.

27. Zou, T.; Lum, C. T.; Lok, C.-N.; Zhang, J.-J.; Che, C.-M., Chemical biology of anticancer gold(iii) and gold (i) complexes. *Chem. Soc. Rev.* 2015, 44 (24), 8786-8801.

28. Saggioro, D.; Rigobello, M. P.; Paloschi, L.; Folda, A.; Moggach, S. A.; Parsons, S.; Ronconi, L.; Fregona, D.; Bindoli, A., Gold(III)-Dithiocarbamato Complexes Induce Cancer Cell Death Triggered by Thioredoxin Redox System Inhibition and Activation of ERK Pathway. *Chem. Biol.* 2007, 14 (10), 1128-1139.

29. Sun, R. W.-Y.; Li, C. K.-L.; Ma, D.-L.; Yan, J. J.; Lok, C.-N.; Leung, C.-H.; Zhu, N.; Che, C.-M., Stable Anticancer Gold(III)—Porphyrin Complexes: Effects of Porphyrin Structure. *Chem. Eur. J.* 2010, 16 (10), 3097-3113.

30. Gamberi, T.; Magherini, F.; Fiaschi, T.; Landini, I.; Massai, L.; Valocchia, E.; Bianchi, L.; Bini, L.; Gabbiani, C.; Nobili, S.; Mini, E.; Messori, L.; Modesti, A., Proteomic analysis of the cytotoxic effects induced by the organogold(iii) complex Aubipyc in cisplatin-resistant A2780 ovarian cancer cells: further evidence for the glycolytic pathway implication. *Mol.* 2015, 11 (6), 1653-1667.

31. Shaik, N.; Martinez, A.; Augustin, I.; Giovinazzo, H.; Varela-Ramirez, A.; Sandi, M.; Aguilera, R. J.; Contel, M., Synthesis of Apoptosis-Inducing Iminophosphorane Organogold(III) Complexes and Study of Their Interactions with Biomolecular Targets. *Inorg. Chem.* 2009, 48 (4), 1577-1587.

32. Baker, M. V.; Barnard, P. J.; Berners-Price, S. J.; Brayshaw, S. K.; Hickey, J. L.; Skelton, B. W.; White, A. H., Cationic, linear Au(i) N-heterocyclic carbene complexes: synthesis, structure and anti-mitochondrial activity. *Dalton Trans.* 2006, (30), 3708-3715.

33. Mjos, K. D.; Orvig, C., Metallodrugs in Medicinal Inorganic Chemistry. *Chem. Rev.* 2014, 114 (8), 4540-4563.

34. Yeo, C. I.; Ooi, K. K.; Tiekink, E. R. T., Gold-Based Medicine: A Paradigm Shift in Anti-Cancer Therapy? *Molecules* 2018, 23 (6), 1410.

35. Alderden, R. A.; Hall, M. D.; Hambley, T. W., The Discovery and Development of Cisplatin. *J. Chem. Ed.* 2006, 83 (5), 728.

36. Milacic, V.; Chen, D.; Ronconi, L.; Landis-Piwowar, K. R.; Fregona, D.; Dou, Q. P., A Novel Anticancer Gold(III) Dithiocarbamate Compound Inhibits the Activity of a Purified 20S Proteasome and 26S Proteasome in Human Breast Cancer *Cell* Cultures and Xenografts. *Cancer Res.* 2006, 66 (21), 10478-10486.

37. Bruni, B.; Ferraroni, M.; Orioli, P.; Speroni, G., A Biologically Active Gold Complex: Trichloro[(2-pyridyl) methanol-N]gold(III). *Acta Cryst. Sec. C.* 1996, 52 (6), 1423-1424.

38. Calamai, P.; Guerri, A.; Messori, L.; Orioli, P.; Paolo Speroni, G., Structure and DNA binding properties of the gold(III) complex [AuCl2(esal)]. *Inorg. Chim. Acta* 1999, 285 (2), 309-312.

39. Kim, J. H.; Reeder, E.; Parkin, S.; Awuah, S. G., Gold(I/III)-Phosphine Complexes as Potent Antiproliferative Agents. *Sci. Rep.* 2019, 9 (1), 12335.

40. Srinivasa Reddy, T.; Privér, S. H.; Rao, V. V.; Mirzadeh, N.; Bhargava, S. K., Gold(i) and gold(iii) phosphine complexes: synthesis, anticancer activities towards 2D and 3D cancer models, and apoptosis inducing properties. *Dalton Trans.* 2018, 47 (43), 15312-15323.

41. Lima, J. C.; Rodríguez, L., Phosphine-Gold(I) Compounds as Anticancer Agents: General Description and Mechanisms of Action. *Anti-cancer Agents Med. Chem.* 2011, 11, 921-8.

42. Jürgens, S.; Scalcon, V.; Estrada-Ortiz, N.; Folda, A.; Tonolo, F.; Jandl, C.; Browne, D. L.; Rigobello, M. P.; Kan, F. E.; Casini, A., Exploring the C^N^C theme: Synthesis and biological properties of tridentate cyclometalated gold(III) complexes. *Bioorg. Med. Chem.* 2017, 25 (20), 5452-5460.

43. Frik, M.; Fernández-Gallardo, J.; Gonzalo, O.; Mangas-Sanjuan, V.; Gonzalez-Alvarez, M.; Serrano del Valle, A.; Hu, C.; Gonzalez-Alvárez, I.; Bermejo, M.; Marzo, I.; Contel, M., Cyclometalated Iminophosphorane Gold(III) and Platinum(II) Complexes. A Highly Permeable Cationic Platinum(II) Compound with Promising Anticancer Properties. *J. Med. Chem.* 2015, 58 (15), 5825-5841.

44. Carboni, S.; Zucca, A.; Stoccoro, S.; Maiore, L.; Arca, M.; Ortu, F.; Artner, C.; Keppler, B. K.; Meier-Menches, S. M.; Casini, A.; Cinellu, M. A., New Variations on the Theme of Gold(III) C^N^N Cyclometalated Complexes as Anticancer Agents: Synthesis and Biological Characterization. *Inorg. Chem.* 2018, 57 (23), 14852-14865.

45. Williams, M. R. M.; Bertrand, B.; Hughes, D. L.; Waller, Z. A. E.; Schmidt, C.; Ott, I.; O'Connell, M.; Searcey, M.; Bochmann, M., Cyclometallated Au(iii) dithiocarbamate complexes: synthesis, anticancer evaluation and mechanistic studies. *Metallomics* 2018, 10 (11), 1655-1666.

46. Gukathasan, S.; Parkin, S.; Awuah, S. G., Cyclometalated Gold(III) Complexes Bearing DACH Ligands. *Inorg. Chem.* 2019, 58 (14), 9326-9340.

47. Ronconi, L.; Giovagnini, L.; Marzano, C.; Bettio, F.; Graziani, R.; Pilloni, G.; Fregona, D., Gold Dithiocarbamate Derivatives as Potential Antineoplastic Agents: Design, Spectroscopic Properties, and In Vitro Antitumor Activity. *Inorg. Chem.* 2005, 44 (6), 1867-1881.

48. Milacic, V.; Chen, D.; Ronconi, L.; Landis-Piwowar, K. R.; Fregona, D.; Dou, Q. P., A Novel Anticancer Gold(III) Dithiocarbamate Compound Inhibits the Activity of a Purified 20S Proteasome and 26S Proteasome in Human Breast Cancer *Cell* Cultures and Xenografts. *Cancer Res.* 2006, 66 (21), 10478.

49. Altaf, M.; Monim-Ul-Mehboob, M.; Kawde, A-N.; Corona, G.; Larcher, R.; Ogasawara, M.; Casagrande, N.; Celegato, M.; Borghese, C.; Siddik, Z. H.; Aldinucci, D.; Isab, A. A., New bipyridine gold(III) dithiocarbamate-containing complexes exerted a potent anticancer activity against cisplatin-resistant cancer cells independent of p53 status. *Oncotarget* 2017, 8 (1), 490-505.

50. Cattaruzza, L.; Fregona, D.; Mongiat, M.; Ronconi, L.; Fassina, A.; Colombatti, A.; Aldinucci, D., Antitumor activity of gold(III)-dithiocarbamato derivatives on prostate cancer cells and xenografts. *Int. J. Cancer* 2011, 128 (1), 206-215.

51. Ronconi, L.; Marzano, C.; Zanello, P.; Corsini, M.; Miolo, G.; Macca, C.; Trevisan, A.; Fregona, D., Gold(III) Dithiocarbamate Derivatives for the Treatment of Cancer: Solution Chemistry, DNA Binding, and Hemolytic Properties. *J. Med. Chem.* 2006, 49 (5), 1648-1657.

52. Sulaiman, A. A. A.; Altaf, M.; Isab, A. A.; Alawad, A.; Altuwaijri, S.; Ahmad, S., Synthesis, Characterization, and in vitro Cytotoxicity of Gold(I) Complexes of 2-(Diphenylphosphanyl)ethylamine and Dithiocarbamates. *Z anorg. allg. Chem.e* 2016, 642 (24), 1454-1459.

53. Keter, F. K.; Guzei, I. A.; Nell, M.; Zyl, W. E. v.; Darkwa, J., Phosphinogold(I) Dithiocarbamate Complexes: Effect of the Nature of Phosphine Ligand on Anticancer Properties. *Inorg. Chem.* 2014, 53 (4), 2058-2067.

54. Kim, J. H.; Mertens, R. T.; Agarwal, A.; Parkin, S.; Berger, G.; Awuah, S. G., Direct intramolecular carbon (sp2)-nitrogen(sp2) reductive elimination from gold(iii). *Dalton Trans.* 2019, 48 (18), 6273-6282.

55. Ekennia, A. C.; Onwudiwe, D. C.; Ume, C.; Ebenso, E. E., Mixed Ligand Complexes of N-Methyl-N-phenyl Dithiocarbamate: Synthesis, Characterisation, Antifungal Activity, and Solvent Extraction Studies of the Ligand. *Bioinorg. Chem. Appl.* 2015, 2015, 913424-913424.

56. Xiong, R.-G.; Zuo, J.-L.; You, X.-Z., A Novel Dimeric Zinc Complex: Bis{μ-[(dimercaptomethylene)propanedinitrilato-S,S']}tetrakis(4-methylpyridine)dizinc(II)—Chloroform. *Inorg. Chem.* 1997, 36 (11), 2472-2474.

57. Hogarth, G., Metal-dithiocarbamate complexes: chemistry and biological activity. *Mini Rev. Med. Chem.* 2012, 12 (12), 1202-1215.

58. Makovec, T., Cisplatin and beyond: molecular mechanisms of action and drug resistance development in cancer chemotherapy. *Radiol. Oncol.* 2019, 53 (2), 148-158.

59. Rabik, C. A.; Dolan, M. E., Molecular mechanisms of resistance and toxicity associated with platinating agents. *Cancer. Treat. Rev.* 2007, 33 (1), 9-23.

60. Karavasilis, V.; Reid, A.; Sinha, R.; De Bono, J. S., CHAPTER 17—Cancer drug resistance. In *Cancer Drug Design and Discovery*, Neidle, S., Ed. Academic Press: New York, 2008; pp 405-423.

61. Kartalou, M.; Essigmann, J. M., Mechanisms of resistance to cisplatin. *Mutat. Res.* 2001, 478 (1), 23-43.

62. Barry, N. P. E.; Sadler, P. J., Exploration of the medical periodic table: towards new targets. *Chem. Comm.* 2013, 49 (45), 5106-5131.

63. Nobili, S.; Mini, E.; Landini, I.; Gabbiani, C.; Casini, A.; Messori, L., Gold compounds as anticancer agents: chemistry, cellular pharmacology, and preclinical studies. *Med. Res.* Rev. 2010, 30 (3), 550-580.

64. Nardon, C.; Boscutti, G.; Fregona, D., Beyond Platinums: Gold Complexes as Anticancer Agents. *Anticancer Res.* 2014, 34 (1), 487-492.

65. Lazarević, T.; Rilak, A.; Bugarčić, Ž. D., Platinum, palladium, gold and ruthenium complexes as anticancer agents: Current clinical uses, cytotoxicity studies and future perspectives. Eur. J. Med. Chem. 2017, 142, 8-31.

66. Mansfield, A. S.; Fields, A. P.; Jatoi, A.; Qi, Y.; Adjei, A. A.; Erlichman, C.; Molina, J. R., Phase I dose escalation study of the PKCt inhibitor aurothiomalate for advanced non-small-cell lung cancer, ovarian cancer, and pancreatic cancer. *Anticancer Drugs* 2013, 24 (10), 1079-1083.

67. Roder, C.; Thomson, M. J., Auranofin: repurposing an old drug for a golden new age. *Drugs R. D.* 2015, 15 (1), 13-20.

68. Giovagnini, L.; Ronconi, L.; Aldinucci, D.; Lorenzon, D.; Sitran, S.; Fregona, D., Synthesis, Characterization, and Comparative In Vitro Cytotoxicity Studies of Platinum(II), Palladium(II), and Gold(III) Methylsarcosinedithiocarbamate Complexes. *J. Med. Chem.* 2005, 48 (5), 1588-1595.

69. Magherini, F.; Fiaschi, T.; Valocchia, E.; Becatti, M.; Pratesi, A.; Marzo, T.; Massai, L.; Gabbiani, C.; Landini, I.; Nobili, S.; Mini, E.; Messori, L.; Modesti, A.; Gamberi, T. Antiproliferative effects of two gold(I)-N-heterocyclic carbene complexes in A2780 human ovarian cancer cells: a comparative proteomic study. *Oncotarget,* 2018, 28042-28068.

70. Goolsby, A. D.; Sawyer, D. T., Electrochemistry of gold(I) and its complexes in acetonitrile. *Anal. Chem.* 1968, 40 (13), 1978-1983.

71. Burke, L. D.; Nugent, P. F., The electrochemistry of gold: I the redox behaviour of the metal in aqueous media. *Gold Bulletin* 1997, 30 (2), 43-53.

72. Lo, H.-S.; Zhu, N.; Au, V. K.-M.; Yam, V. W.-W., Synthesis, characterization, photophysics and electrochemistry of polynuclear copper(I) and gold(I) alkynyl phosphine complexes. *Polyhedron* 2014, 83, 178-184.

73. Koelle, U.; Laguna, A., Electrochemistry of Au-complexes. *Inorg. Chim. Acta* 1999, 290 (1), 44-50.

74. Messori, L.; Abbate, F.; Marcon, G.; Orioli, P.; Fontani, M.; Mini, E.; Mazzei, T.; Carotti, S.; O'Connell, T.; Zanello, P., Gold(III) Complexes as Potential Antitumor Agents: Solution Chemistry and Cytotoxic Properties of Some Selected Gold(III) Compounds. *J. Med. Chem.* 2000, 43 (19), 3541-3548.

75. Hill, D. P.; Harper, A.; Malcolm, J.; McAndrews, M. S.; Mockus, S. M.; Patterson, S. E.; Reynolds, T.; Baker, E. J.; Bult, C. J.; Chesler, E. J.; Blake, J. A., Cisplatin-resistant triple-negative breast cancer subtypes: multiple mechanisms of resistance. *BMC Cancer* 2019, 19 (1), 1039.

76. Hill, D. P.; Harper, A.; Malcolm, J.; McAndrews, M. S.; Mockus, S. M.; Patterson, S. E.; Reynolds, T.; Baker, E. J.; Bult, C. J.; Chesler, E. J.; Blake, J. A., Cisplatin-resistant triple-negative breast cancer subtypes: multiple mechanisms of resistance. *BMC cancer* 2019, 19 (1), 1039-1039.

77. Housman, G.; Byler, S.; Heerboth, S.; Lapinska, K.; Longacre, M.; Snyder, N.; Sarkar, S., Drug resistance in cancer: an overview. *Cancers* (*Basel*) 2014, 6 (3), 1769-1792.

78. Consortium, T. G. O., The Gene Ontology project in 2008. *Nucleic Acids Res.* 2007, 36 D440-D444.

79. Ashburner, M.; Ball, C. A.; Blake, J. A.; Botstein, D.; Butler, H.; Cherry, J. M.; Davis, A. P.; Dolinski, K.; Dwight, S. S.; Eppig, J. T.; Harris, M. A.; Hill, D. P.; Issel-Tarver, L.; Kasarskis, A.; Lewis, S.; Matese, J. C.; Richardson, J. E.; Ringwald, M.; Rubin, G. M.; Sherlock, G., Gene ontology: tool for the unification of biology. The Gene Ontology Consortium. *Nat. Genet.* 2000, 25 (1), 25-29.

80. Kanehisa, M.; Goto, S., KEGG: Kyoto Encyclopedia of Genes and Genomes. *Nucleic Acids Res.* 2000, 28 (1), 27-30.

81. Kanehisa, M., Toward understanding the origin and evolution of cellular organisms. *Protein Sci.* 2019, 28 (11), 1947-1951.

82. Kanehisa, M.; Sato, Y.; Furumichi, M.; Morishima, K.; Tanabe, M., New approach for understanding genome variations in KEGG. *Nucleic Acids Res.* 2018, 47 (D1), D590-D595.

83. Guha, M.; Srinivasan, S.; Raman, P.; Jiang, Y.; Kaufman, B. A.; Taylor, D.; Dong, D.; Chakrabarti, R.; Picard, M.; Carstens, R. P.; Kijima, Y.; Feldman, M.; Avadhani, N. G., Aggressive triple negative breast cancers have unique molecular signature on the basis of mitochondrial genetic and functional defects. *Biochim. Biophys. Acta Mol. Basis Dis.* 2018, 1864 (4 Pt A), 1060-1071.

84. Pelicano, H.; Zhang, W.; Liu, J.; Hammoudi, N.; Dai, J.; Xu, R.-H.; Pusztai, L.; Huang, P., Mitochondrial dysfunction in some triple-negative breast cancer cell lines: role of mTOR pathway and therapeutic potential. *Breast Cancer Res.* 2014, 16 (5), 434-434.

85. Smiley, S. T.; Reers, M.; Mottola-Hartshorn, C.; Lin, M.; Chen, A.; Smith, T. W.; Steele, G. D., Jr.; Chen, L. B., Intracellular heterogeneity in mitochondrial membrane potentials revealed by a J-aggregate-forming lipophilic cation JC-1. *PNAS* 1991, 88 (9), 3671-3675.

86. Green, D. R.; Reed, J. C., Mitochondria and Apoptosis. *Science* 1998, 281 (5381), 1309-1312.

87. Divakaruni, A. S.; Paradyse, A.; Ferrick, D. A.; Murphy, A. N.; Jastroch, M., Chapter Sixteen—Analysis and Interpretation of Microplate-Based Oxygen Consumption and pH Data. In *Methods in Enzymology*, Murphy, A. N.; Chan, D. C., Eds. Academic Press: 2014; Vol. 547, pp 309-354.

88. Letai, A., Apoptosis and Cancer. *Annual Review of Cancer Biology* 2017, 1 (1), 275-294.

89. Ichim, G.; Tait, S. W. G., A fate worse than death: apoptosis as an oncogenic process. *Nat. Rev. Cancer* 2016, 16 (8), 539-548.

90. Aubrey, B. J.; Kelly, G. L.; Janic, A.; Herold, M. J.; Strasser, A., How does p53 induce apoptosis and how does this relate to p53-mediated tumour suppression? *Cell Death & Differ.* 2018, 25 (1), 104-113.

91. Fridman, J. S.; Lowe, S. W., Control of apoptosis by p53. *Oncogene* 2003, 22 (56), 9030-9040.

92. Vermes, I.; Haanen, C.; Steffens-Nakken, H.; Reutellingsperger, C., A novel assay for apoptosis Flow cytometric detection of phosphatidylserine expression on early apoptotic cells using fluorescein labelled Annexin V. *J. Immunol. Methods* 1995, 184 (1), 39-51.

93. Vermes, I.; Haanen, C.; Reutelingsperger, C., Flow cytometry of apoptotic cell death. *J. Immunol. Methods* 2000, 243 (1), 167-190.

94. Wang, C.; Youle, R. J., The role of mitochondria in apoptosis. *Annu. Rev. Genet.* 2009, 43, 95-118.

95. Yadav, N.; Kumar, S.; Marlowe, T.; Chaudhary, A. K.; Kumar, R.; Wang, J.; O'Malley, J.; Boland, P. M.; Jayanthi, S.; Kumar, T. K. S.; Yadava, N.; Chandra, D., Oxidative phosphorylation-dependent regulation of cancer cell apoptosis in response to anticancer agents. *Cell Death Dis.* 2015, 6 (11), e1969-e1969.

96. Slee, E. A.; Adrain, C.; Martin, S. J., Executioner Caspase-3, -6, and -7 Perform Distinct, Non-redundant Roles during the Demolition Phase of Apoptosis. *J. Biol. Chem.* 2001, 276 (10), 7320-7326.

97. Julien, O.; Wells, J. A., Caspases and their substrates. *Cell Death & Differ.* 2017, 24 (8), 1380-1389.

98. Graziani, G.; Szabó, C., Clinical perspectives of PARP inhibitors. *Pharmacol. Res.* 2005, 52 (1), 109-118.

99. Lord, C. J.; Ashworth, A., PARP inhibitors: Synthetic lethality in the clinic. *Science* 2017, 355 (6330), 1152-1158.

100. Jiang, X.; Li, W.; Li, X.; Bai, H.; Zhang, Z., Current status and future prospects of PARP inhibitor clinical trials in ovarian cancer. *Cancer Manag. Res.* 2019, 11, 4371-4390.

101. Robson, M.; Im, S.-A.; Senkus, E.; Xu, B.; Domchek, S. M.; Masuda, N.; Delaloge, S.; Li, W.; Tung, N.; Armstrong, A.; Wu, W.; Goessl, C.; Runswick, S.; Conte, P., Olaparib for Metastatic Breast Cancer in Patients with a Germline BRCA Mutation. *N. Engl J. Med.* 2017, 377 (6), 523-533.

102. Farmer, H.; McCabe, N.; Lord, C. J.; Tuft, A. N. J.; Johnson, D. A.; Richardson, T. B.; Santarosa, M.; Dillon, K. J.; Hickson, I.; Knights, C.; Martin, N. M. B.; Jackson, S. P.; Smith, G. C. M.; Ashworth, A., Targeting the DNA repair defect in BRCA mutant cells as a therapeutic strategy. *Nature* 2005, 434 (7035), 917-921.

103. Diaz, G.; Liu, S.; Isola, R.; Diana, A.; Falchi, A. M., Mitochondrial localization of reactive oxygen species by dihydrofluorescein probes. *Histochem Cell Biol.* 2003, 120 (4), 319-325.

104. LeBel, C. P.; Ischiropoulos, H.; Bondy, S. C., Evaluation of the probe 2',7'-dichlorofluorescin as an indicator of reactive oxygen species formation and oxidative stress. *Chem. Res. Toxicol.* 1992, 5 (2), 227-231.

105. Sun, S.-Y., N-acetylcysteine, reactive oxygen species and beyond. *Cancer Biol. Ther.* 2010, 9 (2), 109-110.

106. Halasi, M.; Wang, M.; Chavan, T. S.; Gaponenko, V.; Hay, N.; Gartel, A. L., ROS inhibitor N-acetyl-L-cysteine antagonizes the activity of proteasome inhibitors. *Biochem. J.* 2013, 454 (2), 201-208.

107. Malinková, V.; Vyličil, J.; Kryštof, V., Cyclin-dependent kinase inhibitors for cancer therapy: a patent review (2009-2014). *Expert Opin. Ther. Pat.* 2015, 25 (9), 953-970.

108. Mariaule, G.; Belmont, P., Cyclin-dependent kinase inhibitors as marketed anticancer drugs: where are we now? A short survey. *Molecules* 2014, 19 (9), 14366-14382.

109. Fischer, P. M.; Gianella-Borradori, A., CDK inhibitors in clinical development for the treatment of cancer. *Expert Opin. Investig. Drugs* 2003, 12 (6), 955-970.

110. Guha, M., Cyclin-dependent kinase inhibitors move into Phase III. *Nat. Rev. Drug Discov.* 2012, 11 (12), 892-894.

111. Sorenson, C. M.; Eastman, A., Mechanism ofcis-Diamminedichloroplatinum(II)-induced Cytotoxicity: Role of G2 Arrest and DNA Double-Strand Breaks. *Cancer Res.* 1988, 48 (16), 4484-4488.

112. Finkel, T.; Hwang, P. M., The Krebs cycle meets the cell cycle: Mitochondria and the G1S transition. *PNAS* 2009, 106 (29), 11825-11826.

113. Mandal, S.; Guptan, P.; Owusu-Ansah, E.; Banerjee, U., Mitochondrial Regulation of *Cell* Cycle Progression during Development as Revealed by the tenured Mutation in *Drosophila. Dev. Cell* 2005, 9 (6), 843-854.

114. Du, X.; Fu, X.; Yao, K.; Lan, Z.; Xu, H.; Cui, Q.; Yang, E., Bcl-2 delays cell cycle through mitochondrial ATP and ROS. *Cell Cycle* 2017, 16 (7), 707-713.

115. Nyamen, L. D.; Rajasekhar Pullabhotla, V. S. R.; Nejo, A. A.; Ndifon, P. T.; Warner, J. H.; Revaprasadu, N., Synthesis of anisotropic PbS nanoparticles using heterocyclic dithiocarbamate complexes. Dalton Trans. 2012, 41 (27), 8297-8302.

116. Bolzati, C.; Cavazza-Ceccato, M.; Agostini, S.; Refosco, F.; Yamamichi, Y.; Tokunaga, S.; Carta, D.; Salvarese, N.; Bernardini, D.; Bandoli, G., Biological In Vitro and In Vivo Studies of a Series of New Asymmetrical Cationic [99mTc(N)(DTC-Ln)(PNP)]+ Complex (DTC-Ln=Alicyclic Dithiocarbamate and PNP=Diphosphinoamine). Bioconjugate Chem. 2010, 21 (5), 928-939.

117. Parkin, S.; Hope, H., Macromolecular Cryocrystallography: Cooling, Mounting, Storage and Transportation of Crystals. J. Appl. Cryst. 1998, 31 (6), 945-953.

118. Hope, H., x-ray crystallography—a fast, first-resort analytical tool. Prog. Inorg. Chem. Vol 41 1994, 41, 1-19.

119. Bruker, "APEX2" Bruker-AXS. Madison, Wis. USA, 2006.

120. Krause, L.; Herbst-Irmer, R.; Sheldrick, G. M.; Stalke, D., Comparison of silver and molybdenum microfocus X-ray sources for single-crystal structure determination. J. Appl. Cryst. 2015, 48 (Pt 1), 3-10.

121. Sheldrick, G. M., SADABS, Program for bruker area detector absorption correction. University of Gottingen, Gottingen, 1997.

122. Sheldrick, G. M., Crystal structure refinement with SHELXL. Acta Cryst. C Struct. Chem. 2015, 71 (Pt 1), 3-8.

123. Sheldrick, G. M., SHELXT—integrated space-group and crystal-structure determination. Acta Cryst. A. Found. Adv. 2015, 71 (Pt 1), 3-8.

124. Sheldrick, G., A short history of SHELX. Acta Cryst. Sec. A. 2008, 64 (1), 112-122.

125. Spek, A. L., Structure validation in chemical crystallography. Acta Cryst. D. Bio. Cryst. 2009, 65 (Pt 2), 148-55.

126. Parkin, S., Expansion of scalar validation criteria to three dimensions: the R tensor. Erratum. Acta Cryst. A. 2000, 56 (Pt 3), 317.

127. van Oosterwijk, J. G.; Li, C.; Yang, X.; Opferman, J. T.; Sherr, C. J., Small mitochondrial Arf (smArf) protein corrects p53-independent developmental defects of Arf tumor suppressor-deficient mice. PNAS 2017, 114 (28), 7420-7425.

128. Wang, G.; McCain, M. L.; Yang, L.; He, A.; Pasqualini, F. S.; Agarwal, A.; Yuan, H.; Jiang, D.; Zhang, D.; Zangi, L.; Geva, J.; Roberts, A. E.; Ma, Q.; Ding, J.; Chen, J.; Wang, D.-Z.; Li, K.; Wang, J.; Wanders, R. J. A.; Kulik, W.; Vaz, F. M.; Laflamme, M. A.; Murry, C. E.; Chien, K. R.; Kelley, R. I.; Church, G. M.; Parker, K. K.; Pu, W. T., Modeling the mitochondrial cardiomyopathy of Barth syndrome with induced pluripotent stem cell and heart-on-chip technologies. Nat. Med. 2014, 20 (6), 616-623.

It will be understood that various details of the presently disclosed subject matter can be changed without departing from the scope of the subject matter disclosed herein. Furthermore, the foregoing description is for the purpose of illustration only, and not for the purpose of limitation.

What is claimed is:

1. A compound having the formula (I) or a pharmaceutically acceptable salt thereof:

(I)

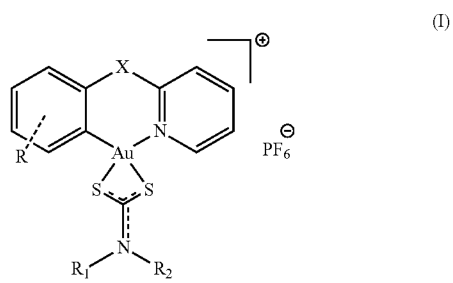

wherein,

X is selected from the group consisting of $CH_2$, C═O, C═NO-alkynyl, NH, O, S, CH-phenyl, CH-benzyl, CH-thiophenyl, CH-furyl, and CH-pyridyl,

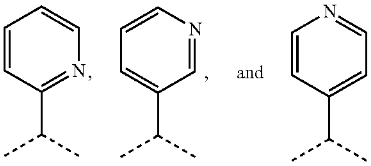

R is selected from the group consisting of H, phenyl optionally substituted with halo or methoxy, benzyl, thiophenyl, furyl, pyridyl, $C_1$-$C_6$ alkyl, $CF_3$, $NO_2$, F, Br, Cl, COH, COOH, CN, $OCH_3$, OH, —C═C, alkynyl, and $NH_2$;

$R_1$ and $R_2$ are independently selected from the group consisting of $C_1$-$C_6$ alkyl,

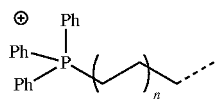

with one or more counterions, including

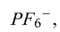

and

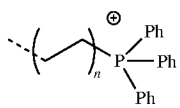

with one or more counterions, including

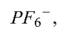

wherein n is 2, 4, 6, 8, 10, 12, or 16, or, $R_1$ and $R_2$, taken together with the N to which they are bound, form a piperidine or piperazine that is optionally substituted with Z; and Z is phenyl optionally substituted with halo or methoxy.

2. The compound of claim 1, having the following formula or pharmaceutically acceptable salt thereof:

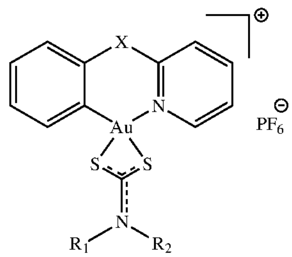

wherein,

X is selected from the group consisting of $CH_2$, C═O, C═NO-alkynyl, NH, O, S, CH-phenyl, CH-benzyl, CH-thiophenyl, CH-furyl, and CH-pyridyl,

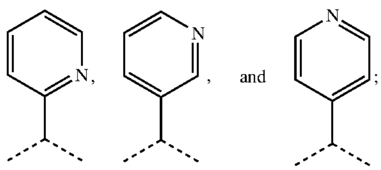

$R_1$ and $R_2$ are independently selected from the group consisting of $C_1$-$C_6$ alkyl and

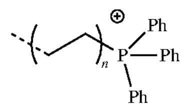

with one or more counterions, including

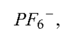

wherein n is 2, 4, 6, 8, 10, 12, or 16, or, $R_1$ and $R_2$, taken together with the N to which they are bound, form a piperidine or piperazine that is optionally substituted with Z; and Z is phenyl optionally substituted with halo or methoxy.

3. The compound of claim 1, having the following formula or pharmaceutically acceptable salt thereof:

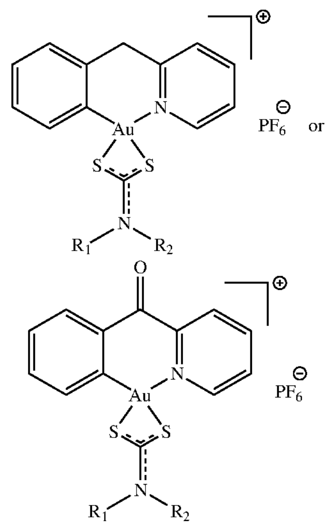

wherein, $R_1$ and $R_2$ are independently selected from the group consisting of $C_1$-$C_6$ alkyl and

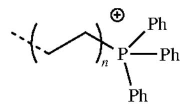

with one or more counterions, including

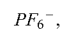

wherein n is 2, 4, 6, 8, 10, 12, or 16, or, $R_1$ and $R_2$, taken together with the N to which they are bound, form a piperidine or piperazine that is optionally substituted with Z; and Z is phenyl optionally substituted with halo or methoxy.

4. The compound of claim 1, having the following formula or pharmaceutically acceptable salt thereof:

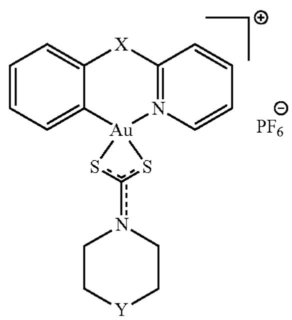

wherein,

X is selected from the group consisting of $CH_2$, C═O, C═NO-alkynyl, NH, O, S, CH-phenyl, CH-benzyl, CH-thiophenyl, CH-furyl, and CH-pyridyl,

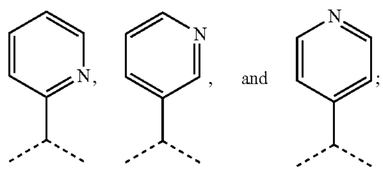

and

Y is $CH_2$ or NH.

5. The compound of claim 1, having the following formula or pharmaceutically acceptable salt thereof:

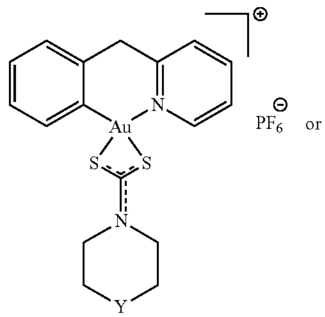

or

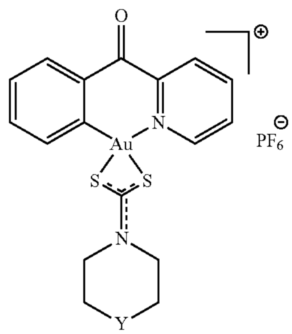

wherein Y is $CH_2$ or NH.

6. The compound of claim 1, having the following formula or pharmaceutically acceptable salt thereof:

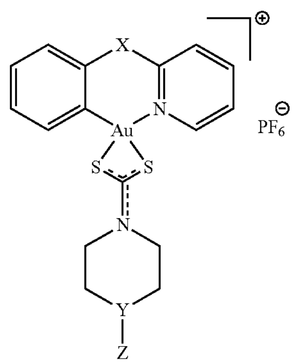

wherein,

X is selected from the group consisting of CH-phenyl, CH-benzyl, CH-thiophenyl, CH-furyl, and CH-pyridyl,

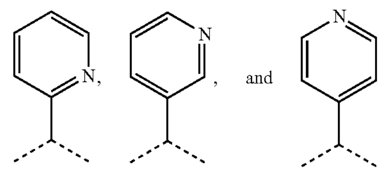

Y is CH or N; and

Z is phenyl optionally substituted with halo or methoxy.

7. The compound of claim 1, having the following formula or pharmaceutically acceptable salt thereof:

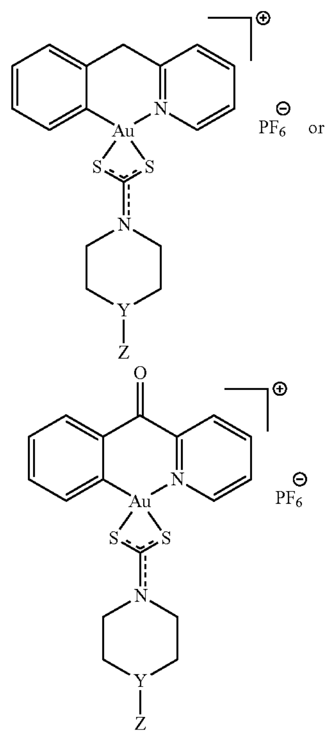

wherein Y is CH or N, and Z is phenyl optionally substituted with halo or methoxy.

8. The compound of claim 1, having the following formula or pharmaceutically acceptable salt thereof:

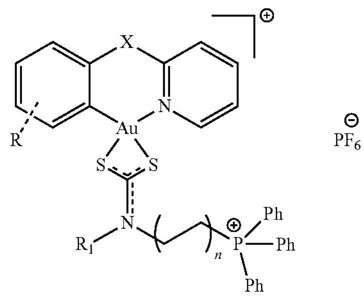

wherein,

X is selected from the group consisting of $CH_2$, C═O, C═NO-alkynyl, NH, O, S, CH-phenyl, CH-benzyl, CH-thiophenyl, CH-furyl, and CH-pyridyl,

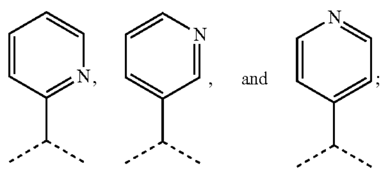

R is selected from the group consisting of H, phenyl optionally substituted with halo or methoxy, benzyl, thiophenyl, furyl, pyridyl, $C_1$-$C_6$ alkyl, $CF_3$, $NO_2$, F, Br, Cl, COH, COOH, CN, $OCH_3$, OH, —C═C, alkynyl, and $NH_2$;

$R_1$ is selected from the group consisting of $C_1$-$C_6$ alkyl,

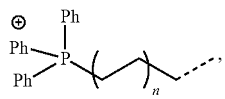

and

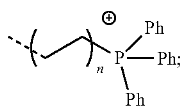

and n is 2, 4, 6, 8, 10, 12, or 16.

9. The compound of claim 1, having the following formula or pharmaceutically acceptable salt thereof:

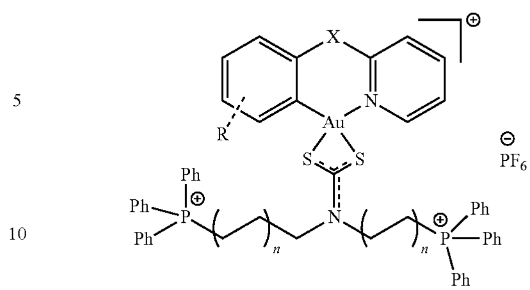

wherein,

X is selected from the group consisting of $CH_2$, C═O, C═NO-alkynyl, NH, O, S, CH-phenyl, CH-benzyl, CH-thiophenyl, CH-furyl, and CH-pyridyl,

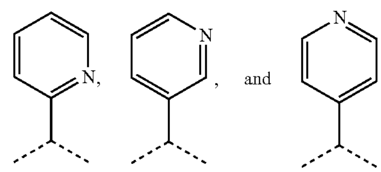

R is selected from the group consisting of H, phenyl optionally substituted with halo or methoxy, benzyl, thiophenyl, furyl, pyridyl, $C_1$-$C_6$ alkyl, $CF_3$, $NO_2$, F, Br, Cl, COH, COOH, CN, $OCH_3$, OH, —C═C, alkynyl, and $NH_2$; and each n is independently selected from 2, 4, 6, 8, 10, 12, or 16.

10. The compound of claim 1, wherein X is:

(a) selected from the group consisting of $CH_2$ and C═O;

(b) selected from the group consisting of CH-phenyl, CH-benzyl, CH-thiophenyl, CH-furyl, and CH-pyridyl;

(c) selected from the group consisting of

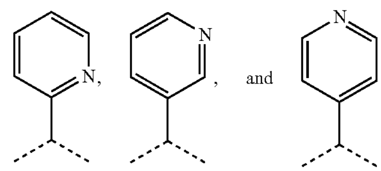

(d) X is C═NO-alkynyl.

11. The compound of claim 1, wherein R is:

(a) selected from the group consisting of phenyl optionally substituted with halo or methoxy, benzyl, thiophenyl, furyl, and pyridyl;

(b) alkyl including 1, 2, 3, 4, 5, or 6 carbon atoms; or (c) selected from the group consisting of —$CF_3$, $NO_2$, —F, —Br, —Cl, —COH, —COOH, CN;

—$OCH_3$, —OH, —C═C, -alkynyl, and —$NH_2$.

12. The compound of claim 1, wherein $R_1$ is:

(a) alkyl including 1-6 carbon atoms;

(b)

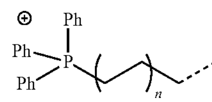

with one or more counterions, including

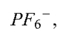

wherein n is 2, 4, 6, 8, 10, 12, or 16; or (c) methyl or ethyl.

13. The compound of claim 1, wherein $R_2$ is:

(a) alkyl including 1-6 carbon atoms;

(b)

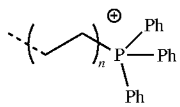

with one or more counterions, including

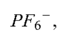

wherein n is 2, 4, 6, 8, 10, 12, or 16; or (c) methyl or ethyl.

14. The compound of claim 1, wherein $R_1$ and $R_2$, taken together with the N to which they are bound, form a piperidine or piperazine that is not substituted.

15. The compound of claim 1, wherein $R_1$ and $R_2$, taken together with the N to which they are bound, form a piperidine or piperazine that is substituted with Z.

16. The compound of claim 1, wherein

R is phenyl (Ph), benzyl (Bz), thiophenyl, furyl, or pyridyl; and

Z is phenyl optionally substituted with halo or methoxy.

17. A pharmaceutical composition comprising an effective amount of the compound of claim 1 and a pharmaceutically-acceptable carrier.

18. A method of killing a breast, ovarian, lung, or leukemia cancer cell, comprising: contacting a cancer cell with an effective amount of the compound of claim 1.

19. The method of claim 18, wherein the cancer cell is in a subject.

20. A method of treating breast, ovarian, lung, or leukemia cancer, comprising: administering to a subject in need thereof an effective amount of the compound of claim 1.

* * * * *